US007909929B2

(12) United States Patent
Kimura et al.

(10) Patent No.: US 7,909,929 B2
(45) Date of Patent: Mar. 22, 2011

(54) DISPERSOID HAVING METAL-OXYGEN BONDS, METAL OXIDE FILM, AND MONOMOLECULAR FILM

(75) Inventors: Nobuo Kimura, Ichihara (JP); Yoshitaka Fujita, Ichihara (JP); Norifumi Nakamoto, Ichihara (JP); Motoyuki Toki, Kyoto (JP); Akiji Higuchi, Kyoto (JP); Kazuo Ono, Ichihara (JP); Tomoya Hidaka, Ichihara (JP); Hiroyuki Takeda, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 894 days.

(21) Appl. No.: 10/533,580

(22) PCT Filed: Nov. 12, 2003

(86) PCT No.: PCT/JP03/14367
§ 371 (c)(1),
(2), (4) Date: Dec. 30, 2005

(87) PCT Pub. No.: WO2004/043853
PCT Pub. Date: May 27, 2004

(65) Prior Publication Data
US 2006/0239902 A1 Oct. 26, 2006

(30) Foreign Application Priority Data

Nov. 13, 2002 (JP) ................. 2002-329097
Nov. 14, 2002 (JP) ................. 2002-330837
Jan. 31, 2003 (JP) ................. 2003-024148
Mar. 4, 2003 (JP) ................. 2003-057173
Jun. 24, 2003 (JP) ................. 2003-179243

(51) Int. Cl.
   *C01G 23/047* (2006.01)
(52) U.S. Cl. ............ 106/287.19; 106/286.4; 106/285.5; 106/286.6; 106/287.1; 106/287.17; 106/287.34; 516/83; 516/34; 516/36
(58) Field of Classification Search .............. None
See application file for complete search history.

(56) References Cited

U.S. PATENT DOCUMENTS

| 4,801,399 | A | * | 1/1989 | Clark et al. ............... 516/98 |
| 5,904,989 | A | * | 5/1999 | Hanggi et al. ............. 428/457 |
| 6,143,063 | A | * | 11/2000 | Hayashi et al. ......... 106/287.18 |
| 6,235,260 | B1 | * | 5/2001 | Toki et al. ............... 423/594.9 |
| 2001/0041216 | A1 | * | 11/2001 | Sakamaki et al. ......... 427/100 |
| 2002/0007006 | A1 | * | 1/2002 | Kanamori et al. ......... 524/588 |
| 2004/0106697 | A1 | * | 6/2004 | Lortz et al. .............. 523/160 |
| 2004/0197254 | A1 | * | 10/2004 | Toki et al. ............... 423/267 |

FOREIGN PATENT DOCUMENTS

| EP | 0 237 081 A2 | 9/1987 |
| EP | 0 940 368 A1 | 9/1999 |
| EP | 1 422 197 A1 | 5/2004 |
| JP | 51-125487 A | 11/1976 |
| JP | 54-41965 A | 4/1979 |
| JP | 57-136601 A | 8/1982 |
| JP | 58-127914 A | 7/1983 |
| JP | 60-199016 A | 10/1985 |
| JP | 60-217229 A | 10/1985 |
| JP | A-62-216915 | 9/1987 |
| JP | 62-236818 A | 10/1987 |
| JP | 62-255901 A | 11/1987 |
| JP | 62-267316 A | 11/1987 |
| JP | 63-46213 A | 2/1988 |
| JP | 63-130614 A | 6/1988 |
| JP | 63-130615 A | 6/1988 |
| JP | 63-245421 A | 10/1988 |
| JP | 63-265201 A | 11/1988 |
| JP | 64-26622 A | 1/1989 |
| JP | 64-45611 A | 2/1989 |
| JP | 64-54021 A | 3/1989 |
| JP | 1-96208 A | 4/1989 |
| JP | 64-90167 A | 4/1989 |
| JP | 64-90168 A | 4/1989 |
| JP | 64-90169 A | 4/1989 |
| JP | 64-90170 A | 4/1989 |
| JP | 1-129032 A | 5/1989 |
| JP | 1-152019 A | 6/1989 |
| JP | 1-163012 A | 6/1989 |

(Continued)

OTHER PUBLICATIONS

Fisher-Scientific on-line catalog, MSDS.*
Handbook of Chemistry and Physics. 51$^{st}$ Edition, 1970-1971, p. C-290 and C-455.*
Korean Office Action dated Dec. 21, 2006 issued for Korean Patent Application 2005-7008272.
Patent Abstracts of Japan English translation of JP 11-319547 published Nov. 24, 1999.
Nov. 29, 2010 Supplementary European Search Report issued in European Application No. 03772702.1.

*Primary Examiner* — Jennifer C McNeil
*Assistant Examiner* — Vera Katz
(74) *Attorney, Agent, or Firm* — Oliff & Berridge, PLC

(57) ABSTRACT

The invention provides dispersoids having metal-oxygen groups which are suitable for the production of metal oxide thin-films at a low temperature of 200° C. or below and for the production of homogeneous organic-inorganic hybrid materials. The invention also provides metal oxide thin-films and organic-inorganic hybrid materials endowed with various capabilities, particularly organic-inorganic hybrid materials having a high refractive index and high transparency. Use is made of a dispersoid having metal-oxygen bonds which is obtained by mixing a metal compound having at least three hydrolyzable groups with at least 0.5 mole but less than 2 moles of water per mole of the metal compound in an organic solvent, in the absence of an acid, a base and/or a dispersion stabilizer, and at a temperature at or below the temperature at which the metal compound begins to hydrolyze, then raising the temperature to at least the temperature at which hydrolysis begins.

14 Claims, 9 Drawing Sheets

FOREIGN PATENT DOCUMENTS

| | | |
|---|---|---|
| JP | 1-213601 A | 8/1989 |
| JP | 1-230407 A | 9/1989 |
| JP | 1-295201 A | 11/1989 |
| JP | 1-295202 A | 11/1989 |
| JP | 1-302202 A | 12/1989 |
| JP | 1-311118 A | 12/1989 |
| JP | 2-802 A | 1/1990 |
| JP | 2-36216 A | 2/1990 |
| JP | 2-58517 A | 2/1990 |
| JP | 2-153302 A | 6/1990 |
| JP | 2-167330 A | 6/1990 |
| JP | 2-270859 A | 11/1990 |
| JP | 3-81320 A | 4/1991 |
| JP | 3-84021 A | 4/1991 |
| JP | 3-84031 A | 4/1991 |
| JP | 3-124722 A | 5/1991 |
| JP | 3-236386 A | 10/1991 |
| JP | 3-281312 A | 12/1991 |
| JP | 4-78801 A | 3/1992 |
| JP | 4-117353 A | 4/1992 |
| JP | 4-117354 A | 4/1992 |
| JP | 4-159275 A | 6/1992 |
| JP | 4-256558 A | 9/1992 |
| JP | 5-805 | 1/1993 |
| JP | 5-78441 A | 3/1993 |
| JP | 5-80201 A | 4/1993 |
| JP | 5-93801 A | 4/1993 |
| JP | 5-148340 A | 6/1993 |
| JP | 5-208950 A | 8/1993 |
| JP | 5-222562 | 8/1993 |
| JP | 5-273401 A | 10/1993 |
| JP | 5-297201 A | 11/1993 |
| JP | 5-320301 A | 12/1993 |
| JP | 6-65193 A | 3/1994 |
| JP | 6-72989 A | 3/1994 |
| JP | 6-122748 A | 5/1994 |
| JP | 6-192250 A | 7/1994 |
| JP | 6-256342 A | 9/1994 |
| JP | 6-256459 A | 9/1994 |
| JP | 6-313801 A | 11/1994 |
| JP | 7-63902 A | 3/1995 |
| JP | 7-104101 A | 4/1995 |
| JP | 7-118263 A | 5/1995 |
| JP | 7-118357 A | 5/1995 |
| JP | 7-118390 A | 5/1995 |
| JP | 7-165859 A | 6/1995 |
| JP | 7-228659 A | 8/1995 |
| JP | 7-242722 A | 9/1995 |
| JP | 7-247335 A | 9/1995 |
| JP | 7-252207 A | 10/1995 |
| JP | 7-252341 A | 10/1995 |
| JP | 7-316250 A | 12/1995 |
| JP | 7-324118 A | 12/1995 |
| JP | 8-3267 A | 1/1996 |
| JP | 8-73732 A | 3/1996 |
| JP | 8-92345 A | 4/1996 |
| JP | 9-71580 A | 3/1997 |
| JP | 9-110979 A | 4/1997 |
| JP | 9-208438 A | 8/1997 |
| JP | 9-208651 A | 8/1997 |
| JP | 9-255781 A | 9/1997 |
| JP | 10-120419 | 5/1998 |
| JP | 10-298769 | 11/1998 |
| JP | 10-298769 A * | 11/1998 |
| JP | 10-298769 A | 11/1998 |
| JP | 11-140070 A | 5/1999 |
| JP | 11-180977 A | 7/1999 |
| JP | 11-183702 A | 7/1999 |
| JP | 11-189592 A | 7/1999 |
| JP | 11-319547 | 11/1999 |
| JP | 2000-53421 A | 2/2000 |
| JP | 2000-351610 | 12/2000 |
| JP | 2001-342018 A | 12/2001 |
| KP | 1999-0077817 | 10/1999 |
| WO | WO-89/10575 | 11/1989 |
| WO | WO03-014022 * | 2/2003 |

* cited by examiner

Raman SPECTRA

UV ABSORPTION BY TITANIA SOLS

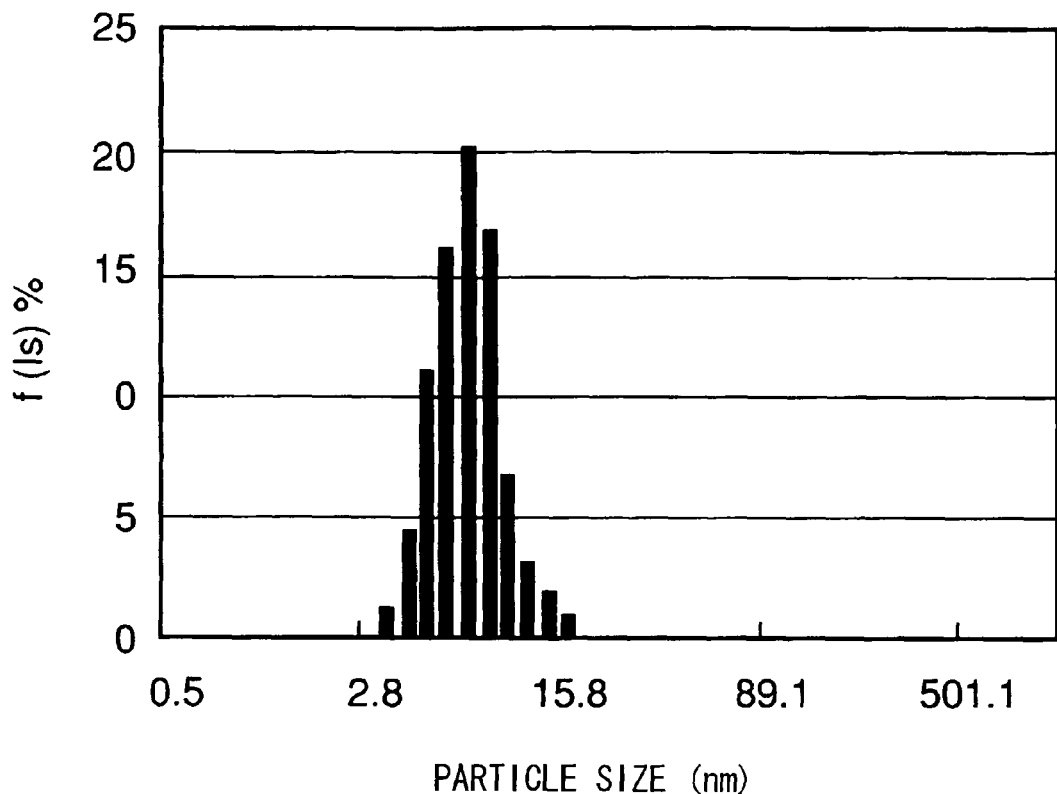

DISPERSOID HAVING METAL-OXYGEN BONDS, METAL OXIDE FILM, AND MONOMOLECULAR FILM

CROSS-REFERENCE TO PRIOR APPLICATION

This is a U.S. National Phase application under 35 U.S.C. §371 of International Patent Application No. PCT/JP2003/014367 filed Nov. 12, 2003, and claims the benefit of Japanese Patent Application Nos. 2002-329097 filed Nov. 13, 2002; 2002-330837 filed Nov. 14, 2002; 2003-024148 filed Jan. 31, 2003; 2003-057173 filed Mar. 4, 2003; and 2003-179243 filed Jun. 24, 2003 and which are incorporated by reference herein. The International Application was published in Japanese on May 27, 2004 as WO 2004/043853 A1 under PCT Article 21(2).

TECHNICAL FIELD

The present invention relates to dispersoids having metal-oxygen bonds, metal oxide films produced from such dispersoids, and organic-inorganic hybrid materials in which the inorganic component is or includes such a dispersoid.

BACKGROUND ART

Metal oxide sols are useful as metal oxide film-forming materials, as the inorganic component in organic-inorganic hybrid materials, and in other applications. Several methods of preparation are known.

One specific example, described in JP A 10-298769, is a method of preparing a metal oxide precursor sol by hydrolyzing and polymerizing one or more metal compound, which method is characterized by carrying out the addition of water to the metal compound at a temperature of −20° C. or below.

JP A 1-129032 describes a method for preparing an organic solvent-soluble high-molecular-weight ladder-type polytitanoxane by hydrolyzing titanium tetraalkoxide using 1.0 to 1.7 moles of water per mole of the titanium tetraalkoxide at a temperature of 20 to 90° C. The object of this method is to provide a high-molecular-weight ladder-type polytitanoxane which, in spite of being a high-molecular-weight compound, dissolves in organic solvents and forms a dense thin-film.

JP A 2001-342018 describes a method for preparing a metal oxide precursor solution which involves adding an alcohol solution containing 0.1 to 2.0 moles of water to 1 mole of a metallic salt partially hydrolyzed by the addition of water and the application of heat, then heating so as to hydrolyze the metallic salt and form a metal hydroxide, followed by dehydrative condensation then concentration.

DISCLOSURE OF THE INVENTION

However, the sol particles thus obtained agglomerate, resulting in a large particle size, and thus fail to provide a satisfactory performance when rendered into a metal oxide film or even when prepared as a hybrid with an organic component.

Moreover, in sols obtained by hydrolyzing a metal alkoxide using an acid or base, dehydrative condensation, distilling off the solvent, water and acid or base, and bulk polymerization, complete removal of the water and the acid or base used is difficult and what remains of these has an effect on the polymerization reaction. Particularly when solution polymerization is carried out in an organic solvent, stabilizing the presence of metal alkoxide hydrolysates within the solution requires the use of an acid, base or dispersion stabilizer. Unfortunately, these inhibit polymerization or adversely affect the physical properties of the product. Furthermore, the above-mentioned inorganic-organic hybrids made with a titanium oxide gel generally tend to have a lower transmittance that inorganic-organic hybrids made with other metal oxide gels, which suggests that the titanium oxide agglomerates in the concentration stage following hydrolysis and dehydrative condensation.

By using a method which involves adding a multidentate compound to stabilize the metal alkoxide and thus hold down the rate of metal alkoxide hydrolysis, a homogeneous film-forming sol can easily be prepared. However, much organic matter resistant to high-temperature degradation is also present in the sol or gel film, and so heat treatment at an elevated temperature of about 500° C. is required to remove such organic matter. Moreover, the residual presence of much organic matter in the gel film results in a greater weight loss by the film when it is heat treated. In other words, the removal of organic matter from the gel film causes numerous pores to form in the film, creating defects in the resulting metal oxide thin-film that prevent the mechanical, optical, electrical and other properties of the metal oxides from being fully achieved. These thin-films can be densified to eliminate pores in the film, but doing so requires excessive energy. In addition, as noted above, methods which use metallic salts are basically thermal degradation processes, and lead to many problems with film quality following heat treatment.

It is therefore an object of the invention to provide fine dispersoids which can be stably dispersed in an organic solvent even in the absence of an acid, base or dispersion stabilizer, are capable of producing metal oxide films that are dense and have a smooth surface, and are capable of producing organic-inorganic hybrid materials that are transparent and homogeneous.

We have conducted extensive investigations, as a result of which we have discovered that the above-described problems can be resolved by adding a given amount of water at a low temperature to a metal compound having hydrolyzable groups, diluting the water to be added in a specific solvent system, even at room temperature, and adding the water in divided amounts at a low temperature.

Accordingly, the present invention provides the following:
(1) A dispersoid having metal-oxygen bonds which is obtained by mixing a metal compound having at least three hydrolyzable groups with a given amount of water in the absence of at least one selected from the group consisting of an acid, a base and a dispersion stabilizer and at a given temperature, which dispersoid is characterized in that the given amount of water is at least 1.0 mole but less than 2.0 moles per mole of the metal compound, and the given temperature is a temperature below 0° C.;
(2) A dispersoid having metal-oxygen bonds which is obtained by mixing a metal compound having at least three hydrolyzable groups with a given amount of water in the absence of at least one selected from the group consisting of an acid, a base and a dispersion stabilizer and at a given temperature, which dispersoid is characterized in that the given amount of water is at least 0.5 mole but less than 1.0 mole per mole of the metal compound, and the given temperature is a temperature below 0° C.;
(3) The dispersoid having metal-oxygen bonds of (1) or (2) above which is characterized in that the given temperature is a temperature of −20° C. or below;
(4) The dispersoid having metal-oxygen bonds of (1) or (2) above which is characterized in that the given temperature is at or below the temperature at which the metal compound begins to hydrolyze;

(5) The dispersoid having metal-oxygen bonds of (1) or (2) above which is characterized in that the given temperature is a temperature in a range of −50 to −100° C.;

(6) The dispersoid having metal-oxygen bonds of any one of (1) to (5) above which is characterized by using an organic solvent in the step in which the metal compound and the given amount of water are mixed;

(7) The dispersoid having metal-oxygen bonds of any one of (1) to (6) above which is characterized in that the step in which the metal compound and the given amount of water are mixed is a step in which the given amount of water is added to the metal compound;

(8) The dispersoid having metal-oxygen bonds of (7) above which is characterized in that the step in which the given amount of water is added to the metal compound is a step in which the given amount of water is added to an organic solvent solution of the metal compound;

(9) The dispersoid having metal-oxygen bonds of any one of (6) to (8) above which is characterized in that the organic solvent is a hydrocarbon solvent or an ether solvent;

(10) The dispersoid having metal-oxygen bonds of any one of (1) to (9) above which is characterized in that the given amount of water is a solution diluted with a water-soluble organic solvent;

(11) The dispersoid having metal-oxygen bonds of (10) above which is characterized in that the water-soluble organic solvent is an alcohol solvent;

(12) The dispersoid having metal-oxygen bonds of any one of (1) to (11) above which is characterized by being obtained by, following mixture of the metal compound and the water at the given temperature, raising the temperature to the given temperature or above;

(13) A dispersoid having metal-oxygen bonds obtained by mixing, in the absence of at least one selected from the group consisting of an acid, a base and a dispersion stabilizer and at a given temperature, a partial hydrolysate that is prepared by hydrolyzing a metal compound having at least three hydrolyzable groups in the absence of an acid, a base and/or an dispersion stabilizer and that can be stably dispersed without aggregation in an organic solvent with an amount of water equal to at least 0.5 mole but less than 2 moles per mole of the metal compound minus the amount of water used to prepare the partial hydrolysate, which dispersoid is characterized in that the given temperature is a temperature below 0° C.;

(14) The dispersoid having metal-oxygen bonds of (13) above which is characterized in that the given temperature is a temperature of −20° C. or below;

(15) The dispersoid having metal-oxygen bonds of (13) or (14) above which is characterized in that the given temperature is at or below the temperature at which the metal compound begins to hydrolyze;

(16) The dispersoid having metal-oxygen bonds of (13) or (14) above which is characterized in that the given temperature is a temperature in a range of −50 to −100° C.;

(17) The dispersoid having metal-oxygen bonds of any one of (13) to (16) above which is characterized by using an organic solvent in the step in which the partial hydrolysate and the given amount of water are mixed;

(18) The dispersoid having metal-oxygen bonds of any one of (13) to (17) above which is characterized in that the step in which the partial hydrolysate and the given amount of water are mixed is a step in which the given amount of water is added to the partial hydrolysate;

(19) The dispersoid having metal-oxygen bonds of (18) above which is characterized in that the step in which the given amount of water is added to the partial hydrolysate is a step in which the given amount of water is added to an organic solvent solution of the partial hydrolysate;

(20) The dispersoid having metal-oxygen bonds of any one of (17) to (19) above which is characterized in that the organic solvent is a hydrocarbon solvent or an ether solvent;

(21) The dispersoid having metal-oxygen bonds of any one of (13) to (20) above which is characterized in that the given amount of water is a solution diluted with a water-soluble organic solvent;

(22) The dispersoid having metal-oxygen bonds of (21) above which is characterized in that the water-soluble organic solvent is an alcohol solvent;

(23) The dispersoid having metal-oxygen bonds of any one of (13) to (22) above which is characterized by being obtained by, following mixture of the partial hydrolysate and the water at the given temperature, raising the temperature to the given temperature or above;

(24) A dispersoid having metal-oxygen bonds which is obtained by mixing a metal compound having at least three hydrolyzable groups with a given amount of water in the absence of at least one selected from the group consisting of an acid, a base and a dispersion stabilizer and at a given temperature, which dispersoid is characterized in that the given amount of water is a solution diluted with a hydrocarbon solvent and an alcohol solvent, the diluted solution is added to the metal compound, and the given temperature is room temperature;

(25) The dispersoid having metal-oxygen bonds of (24) above which is characterized in that the given amount of water is at least 0.5 mole but less than 2.0 moles per mole of the metal compound;

(26) The dispersoid having metal-oxygen bonds of (24) or (25) above which is characterized in that the water in the diluted solution has a concentration that is from 40% to 1% of the saturation solubility of water in a mixed solvent of the hydrocarbon solvent and the alcohol solvent;

(27) A dispersoid having metal-oxygen bonds which is obtained by the addition, to a metal compound having least three hydrolyzable groups, of at least 0.5 mole but less than 2 moles of water per mole of the metal compound, which dispersoid is characterized by having steps in which the water is added in a some of divided portions at a given temperature, which steps include at least one step in which the given temperature is a temperature below 0° C.;

(28) A dispersoid having metal-oxygen bonds which is obtained by the addition, to a metal compound having least three hydrolyzable groups, of at least 0.5 mole but less than 2 moles of water per mole of the metal compound, which dispersoid is characterized by having steps in which the water is added in a some of divided portions, at least 0.5 mole but less than 1 mole of the water per mole of the metal compound being added in a first water addition step;

(29) The dispersoid having metal-oxygen bonds of (28) above which is characterized by having, after the first water addition step, a step in which the rest of the required amount of water is added at a given temperature, the given temperature being a temperature below 0° C.;

(30) The dispersoid having metal-oxygen bonds of (27) or (29) above which is characterized in that the given temperature is a temperature of −20° C. or below;

(31) The dispersoid having metal-oxygen bonds of (27) or (29) above which is characterized in that the given temperature is at or below the temperature at which the metal compound begins to hydrolyze;

(32) The dispersoid having metal-oxygen bonds of (27) or (29) above which is characterized in that the given temperature is in a range of −50 to −100° C.;

(33) The dispersoid having metal-oxygen bonds of any one of (27) to (32) above which is characterized in that, following the step in which the water is added at the given temperature, the temperature is raised to the given temperature or above;

(34) A dispersoid having metal-oxygen bonds which is characterized by being obtained by concentrating a solution of the dispersoid having metal-oxygen bonds of any one of (1) to (33) above;

(35) The dispersoid having metal-oxygen bonds of any one of (1) to (34) above which is characterized in that the metal compound is a compound of formula (I)

$$R_a MX_b \quad (I)$$

(wherein M is a metal atom, X is a hydrolyzable group, R is a hydrogen atom or an organic group which may have a hydrolyzable group capable of forming a bond with the metal atom through an oxygen atom, and a+b=m, where m is the valence of the metal atom);

(36) The dispersoid having metal-oxygen bonds of (35) above which is characterized in that X in formula (I) is an alkoxy group;

(37) The dispersoid having metal-oxygen bonds of any one of (1) to (36) above which is characterized in that the metal is one or more selected from the group consisting of titanium, zirconium, aluminum, silicon, germanium, indium, tin, tantalum, zinc, tungsten and lead;

(38) The dispersoid having metal-oxygen bonds of any one of (1) to (37) above which is characterized by being a dispersoid which stably disperses without aggregation in an organic solvent in the absence of at least one selected from the group consisting of an acid, a base and a dispersion stabilizer;

(39) The dispersoid having metal-oxygen bonds of any one of (1) to (38) above which is characterized in that a solution containing the dispersoid is optically transparent;

(40) The dispersoid having metal-oxygen bonds of any one of (1) to (39) above which is characterized by having an average particle size, when dispersed in an organic solvent, in a range of 1 to 20 nm;

(41) The dispersoid having metal-oxygen bonds of (40) above which is characterized by being monodisperse with a particle size distribution in a range of 0 to 50 nm;

(42) The dispersoid having metal-oxygen bonds of (40) or (41) above which is characterized in that the organic solvent is an ether solvent or a hydrocarbon solvent;

(43) A dispersoid having metal-oxygen bonds which is characterized by dispersing stably without aggregation in an organic solvent in the absence of at least one selected from the group consisting of an acid, a base and a dispersion stabilizer, and by having an average particle size in a range of 1 to 20 nm;

(44) The dispersoid having metal-oxygen bonds of (43) above which is characterized by being monodisperse with a particle size distribution in a range of 0 to 50 nm;

(45) The dispersoid having metal-oxygen bonds of (43) or (44) above which is characterized in that the organic solvent is an ether solvent or a hydrocarbon solvent;

(46) A metal oxide film which is characterized by being produced from the dispersoid of any one of (1) to (45) above;

(47) A metal oxide film which is characterized by being produced by coating or spraying a solution containing the dispersoid of any one of (1) to (45) above, then heating at a temperature of 200° C. or below;

(48) A metal oxide film which is characterized by being produced by coating or spraying a solution containing a dispersoid according to any one of (1) to (45) above and fine metal oxide crystals derived from the dispersoid, then heating at a temperature of 200° C. or below;

(49) The metal oxide film of (47) or (48) above which is characterized by being produced by, additionally, exposure to ultraviolet light having a wavelength of 360 nm or less;

(50) The metal oxide film of any one of (46) to (49) above which is characterized by having a smooth film surface;

(51) The metal oxide film of any one of (46) to (49) above which is characterized in that the film surface has an average roughness of 10 nm or less;

(52) The metal oxide film of any one of (46) to (49) above which is characterized in that the film surface has an average roughness of 5 nm or less;

(53) The metal oxide film of any one of (46) to (49) above which is characterized by being formed on a plastic substrate and having a carbon content, expressed as an atomic ratio, of 10% or less;

(54) A metal oxide film which is characterized by being formed by coating or spraying, and by having a smooth film surface;

(55) The metal oxide film of (54) above which is characterized by being formed by drying at 200° C. or below;

(56) The metal oxide film of (54) or (55) above which is characterized in that the film surface has an average roughness of 10 nm or less;

(57) The metal oxide film of (54) or (55) above which is characterized in that the film surface has an average roughness of 5 nm or less;

(58) A metal oxide film which is characterized by being formed on a plastic substrate and by having a carbon content, expressed as an atomic ratio, of 10% or less;

(59) An organic-inorganic hybrid material characterized by containing at least one selected from the group consisting of a dispersoid having metal-oxygen bonds according to any one of (1) to (30) above, an inorganic structural portion derived from the dispersoid, and an inorganic polymer obtained from the dispersoid as the starting material;

(60) The organic-inorganic hybrid material of (59) above which is characterized in that the organic component is at least one selected from the group consisting of acrylic resins, polythiourethane resins and resins obtained from epithio group-bearing compounds;

(61) The organic-inorganic hybrid material of (59) or (60) above which is characterized by being produced by polymerizing an organic monomer in the presence of a dispersoid having metal-oxygen bonds according to any one of (1) to (45) above;

(62) An optical material which is characterized by containing an organic-inorganic hybrid material of any one of (59) to (61) above.

(63) An optical product which is characterized by being made of the optical material of (62) above;

(64) The optical product of (63) above which is characterized by being a plastic lens;

(65) A monomolecular film which is characterized by being obtained by forming a metal oxide film having a smooth surface on a substrate, then contacting the metal oxide film with a metallic surfactant having at least one hydrolyzable group;

(66) The monomolecular film of (65) above which is characterized in that the metal oxide film having a smooth surface is a metal oxide film according to any one of (46) to (59) above;

(67) A monomolecular film characterized by being obtained by using a dispersoid having metal-oxygen bonds that is stably dispersed without aggregation in an organic solvent in the absence of at least one selected from the group consisting of an acid, a base and a dispersion stabilizer, or using a solution containing the dispersoid, to form a metal oxide film on a substrate, then contacting the metal oxide film with a metallic surfactant having at least one hydrolyzable group;

(68) The monomolecular film of (67) above which is characterized in that the dispersoid having metal-oxygen bonds that is stably dispersed without aggregation in an organic solvent in the absence of at least one selected from the group consisting of an acid, a base and a dispersion stabilizer is a dispersoid according to any one of (1) to (45) above;

(69) The monomolecular film of any one of (65) to 68) above which is characterized in that the metallic surfactant is a compound of formula (II)

$$R^1_n MY_{m-n} \quad (II)$$

(wherein $R^1$ is a monovalent hydrocarbon group, a monovalent hydrocarbon group having a substituent, a monovalent halogenated hydrocarbon group, a monovalent hydrocarbon group which includes a linkage or a monovalent halogenated hydrocarbon group which includes a linkage, M is at least one type of metal atom selected from the group consisting of silicon, germanium, tin, titanium and zirconium atoms, Y is a hydrolyzable group, the letter n is any integer from 1 to (m-1), and the letter m is the valence of M; with the proviso that if n is 2 or more, each $R^1$ may be like or unlike, and if (m-n) is 2 or more, each Y may be like or unlike); and

(70) The monomolecular film of (69) above which is characterized in that the compound of formula (II) is a compound of formula (III)

$$CF_3-(CF_3)_p-R^2_q-MZ_r Y_{m-r-1} \quad (III)$$

(wherein $R^2$ is an alkylene group, a vinylene group, an ethynylene group, an arylene group or a divalent functional group containing a silicon atom and/or an oxygen atom, Z is a hydrogen atom, an alkyl group, an alkoxy group, a fluoroalkyl group or a fluoroalkoxy group, Y, M and m are as defined above, the letter p is 0 or an integer, the letter q is 0 or 1, and the letter r is 0 or any integer from 1 to (m-2)).

The present invention relates to dispersoids which have metal-oxygen bonds and share some common characteristics. Methods for producing these dispersoids are specified above in each of above items (1), (2), (13), (24), (27) and (28). Below, dispersoids according to above items (1) and (2) are described as Dispersoid I, dispersoids according to above item (13) are described as Dispersoid II, dispersoids according to above item (24) are described as Dispersoid III, and dispersoids according to above items (27) and (28) are described as Dispersoid IV. For features that are common to all the dispersoids, the description provided in the explanation of one type of dispersoid applies to the other types as well. Shared characteristics are summarized following the separate explanations given for each type of dispersoid.

(I) Dispersoid I

Dispersoid I of the present invention is a dispersoid having metal-oxygen bonds which is obtained by mixing a metal compound having at least three hydrolyzable groups with a given amount of water in the absence of at least one selected from the group consisting of an acid, a base and a dispersion stabilizer and at a given temperature, and which is characterized in that the given amount of water is either at least 1.0 mole but less than 2.0 moles, or at least 0.5 mole but less than 1.0 mole, per mole of the metal compound, and the given temperature is a temperature below 0° C.

Here, "dispersoid" refers to fine particles dispersed in a dispersion system. Specific examples include colloidal particles and nanometer size particles composed of several polycondensed molecules.

The acid or base used in this specification is not subject to any particular limitation, provided it functions as either a deflocculant which re-disperses precipitate that arises from coagulation or, as subsequently described, a catalyst for the hydrolysis or dehydrative condensation of the metal compound having at least three hydrolyzable groups to produce a dispersoid of colloidal particles, nanoparticles or the like, and also functions as a dispersant for the dispersoid that has formed. Specific examples of the acid include mineral acids such as hydrochloric acid, nitric acid, boric acid, tetrafluoroboric acid and carbonic acid; and organic acids such as acetic acid, formic acid, oxalic acid, trifluoroacetic acid, p-toluenesulfonic acid and methanesulfonic acid. Additional examples also include photoacid generators which generate acids upon irradiation with light, such as diphenyliodonium hexafluorophosphate and triphenylphosphonium hexafluorophosphate. Specific examples of the base include triethanolamine, triethylamine, 1,8-diazabicyclo[5.4.0]undec-7-ene, ammonia and phosphine.

In the specification, "dispersion stabilizer" refers to a component which is added in order to disperse the dispersoid in the dispersing medium as stably as possible, including coagulation-preventing agents such as deflocculants, protective colloids and surfactants. Specific types of compounds having such an effect include chelating compounds, preferably those which having at least one carboxyl group on the molecular backbone and have a strong metal-chelating ability. Illustrative examples of such compounds include polycarboxylic acids such as glycolic acid, gluconic acid, lactic acid, tartaric acid, citric acid, malic acid and succinic acid, hydroxycarboxylic acids, and also pyrophosphoric acid and tripolyphosphoric acid. Illustrative examples of multidentate compounds similarly having a strong metal atom-chelating ability include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione and 5-methylhexanedione. Other examples include aliphatic amines, hydrostearic acid compounds and polyester amines such as Surpass 3000, 9000, 17000, 20000 and 24000 (all products available from Zeneca) and Disperbyk-161, Disperbyk-162, Disperbyk-163, and Disperbyk-164 (all products of Byk Chemie GmbH); and also the silicone compounds mentioned in JP A 9-208438 and JP A 2000-53421, such as dimethylpolysiloxane-methyl(polysiloxyalkylene)siloxane copolymers, trimethylsiloxysilicate, carboxy-modified silicone oils and amine-modified silicones.

No particular limitation is imposed on the metal compound having at least three hydrolyzable groups used in the invention, provided it is a metal atom-containing compound having on the molecule at least three hydrolyzable groups which are bonded to the metal atom in any manner, be it directly or through linkages such as carbon chains.

"Hydrolyzable group" refers to a functional group which hydrolyzes on contact with water or a functional group capable of forming a bond with the metal atom through an oxygen atom, either in the presence or absence of water. Specific examples include halogen atoms, amino groups, alkoxy groups, ester groups, carboxyl groups, phosphoryl groups, isocyanate groups and cyano groups. Given that the hydrolyzable groups here are functional groups whose purpose, after coming into contact with water and hydrolyzing, is to make the metal compound condense with other active groups or self-polycondense, although the hydroxyl group is not a hydrolyzable group in the strictest sense, it is similar in nature and is therefore regarded as a hydrolyzable group in the present specification. ("Hydrolyzable group" is used in the same sense throughout the specification.)

The metal compound is at least one metal compound having at least three hydrolyzable groups, but may include other metal compounds, such as compounds having two hydrolyzable groups.

Specific examples of the metal compound include the compounds of formula (I).

In formula (I), M is a metal atom, and preferably a metal atom capable of synthesizing a metal alkoxide or a metal carboxylate; i.e., a metal atom with a valence of 3 to 5 from group III, IV or V of the periodic table. Specific examples include metal atoms such as silicon, germanium, tin, lead, titanium, zirconium, hafnium, boron, aluminum, gallium, indium, thallium, scandium, yttrium, lanthanum, antimony, bismuth, vanadium, niobium, tantalum, lanthanoid metals and actinoid metals. Preferred examples include titanium, zirconium, aluminum, silicon, germanium, indium, tin, tantalum, zinc, tungsten and lead.

R represents a hydrogen atom or an organic group which may have a hydrolyzable group capable of forming a bond with the metal atom through an oxygen atom. Exemplary hydrolyzable groups include functional groups similar to the hydrolyzable groups mentioned above. Specific examples of R include alkyl groups with 1 to 12 carbons, such as methyl, ethyl and propyl; halogenated alkyl groups with 1 to 12 carbons, such as chloromethyl, chloroethyl, chloropropyl, bromopropyl, bromooctyl and trifluoropropyl; epoxyalkyl groups with 1 to 12 carbons, such as glycidoxypropyl and epoxycyclohexylethyl; aminoalkyl groups with 1 to 12 carbons, such as aminopropyl and aminobutyl; aromatic groups with 6 to 12 carbons, such as phenyl and benzyl; and photosensitive groups with 2 to 12 carbons, such as vinyl, allyl, acryloxypropyl and methacryloxypropyl.

In formula (I), X represents a hydrolyzable group bonded to the metal atom M. Specific examples include alkoxy groups such as methoxy, ethoxy, propoxy, butoxy and pentoxy, aminohydroxy groups, aminohydroxy groups, enoxy groups, amino groups, carbamoyl groups, halogen atoms such as chlorine and bromine, and hydroxyl. Alkoxy groups are especially preferred.

In formula (I), a+b=m, where m is the valence of the metal atom. The presence of three or more hydrolyzable groups on the molecule is exemplified by cases where the letter b represents 3 or more, and cases where the letter b represents 2 or less and there are one or more R moieties having a hydrolyzable group.

Provided it is a compound which satisfies the condition that it have at least three hydrolyzable groups, the metal compound furnished for hydrolysis does not need to be a single molecular compound represented by formula (I). For example, the metal compound may be an oligomer obtained by using a similar method to hydrolyze and polycondense a compound of formula (I).

Specific examples of the metal compound of formula (I) include methyltrimethoxysilane, methyltriethoxysilane, ethyltrimethoxysilane, ethyltriethoxysilane, propyltrimethoxysilane, propyltriethoxysilane, tetramethoxysilane, tetraethoxysilane, tetrapropoxysilane, germanium tetramethoxide, germanium tetraethoxide, titanium tetrapropoxide, titanium tetrabutoxide, zirconium tetrapropoxide, zirconium tetrabutoxide, aluminum triethoxide, aluminum tripropoxide, aluminum tributoxide, tetrachlorosilane, tetrabromosilane, dimethyldichlorosilane, tetrakis(diethylamino) silane, 4-aminobutyltriethoxysilane, 3-aminopropyltriethoxysilane, 3-aminopropyltrimethoxysilane, benzyltrichlorosilane, benzyltriethoxysilane, t-butylphenyldichlorosilane, 2-chloroethyltriethoxysilane, 3-chloropropyltrichlorosilane, 8-bromooctyltrichlorosilane, 3-bromopropyltrichlorosilane, (3,3,3-trifluoropropyl)dichlorosilane, (3,3,3-trifluoropropyl)trichlorosilane, chloromethyltrichlorosilane, β-(3,4-epoxycyclohexyl)ethyltrimethoxysilane, (3-glycidoxypropyl)methyldiethoxysilane, 3-glycidoxypropyltrimethoxysilane, allyltrichlorosilane, allyltriethoxysilane, vinylmethyldiacetoxysilane, vinylmethylbis(methylethylketoximine)silane, 3-methacryloxypropyltrimethoxysilane, 3-methacryloxypropyltrimethoxysilane, 3-acryloxypropyltrichlorosilane and 3-acryloxypropyltrimethoxysilane. Especially preferred metal alkoxides include tetramethoxysilane, tetraethoxysilane, titanium tetrapropoxide, zirconium tetrapropoxide and zirconium tetrabutoxide.

These metal compounds may be used singly or as combinations of two or more thereof.

Additional examples of suitable metal compounds include double alkoxides obtained by a reaction between metal alkoxides of two or more of the above elements, and double alkoxides obtained by reacting one or more metal alkoxide with one or more metal salt. The use of such double alkoxides in combinations thereof is also possible.

Exemplary double alkoxides that can be obtained by a reaction between two or more metal alkoxides include double alkoxides obtained by reacting an alkali metal or alkaline earth metal alkoxide with a transition metal alkoxide, and double alkoxides in the form of complex salts obtained by combination with a group 3B element. Specific examples include $BaTi(OR')_6$, $SrTi(OR')_6$, $BaZr(OR')_6$, $SrZr(OR')_6$, $LiNb(OR')_6$, $LiTa(OR')_6$ and combinations thereof, as well as $LiVO(OR')_4$ and $MgAl_2(OR')_8$. Additional examples include the following products of reactions with silicon alkoxides and silicon alkoxide polycondensation products: $(R'O)_3SiOAl(OR'')_2$, $(R'O)_3SiOTi(OR'')_3$, $(R'O)_3SiOZr(OR'')_3$, $(R'O)_3SiOB(OR'')_2$, $(R'O)_3SiONb(OR'')_4$ and $(R'O)_3SiOTa(OR'')_4$. Here, R' and R" represent alkyl groups. Exemplary double alkoxides that can be obtained by reacting one or more metal alkoxide with one or more metal salt include compounds obtained by reacting a metal salt such as a hydrochloride, nitrate, sulfate, acetate, formate or oxalate with an alkoxide.

Examples of the water used include common tap water, distilled water and ion-exchanged water. Of these, distilled water or ion-exchanged water is preferred. Ion-exchanged water having an electric conductivity of 2 μs/cm or less is especially preferred.

The amount of water used is in a range of from at least 0.5 mole to less than 2 moles per mole of the metal compound. At less than 0.5 mole, hydrolysis or polycondensation will not proceed uniformly, as a result of which some metal compound of formula (I), for example, will remain unreacted, making it impossible to form a homogeneous and dense film. On the other hand, at more than 2 moles, gelation or particle aggregation will occur during hydrolysis or polycondensation, also making it impossible to form a homogeneous and dense film.

The water is preferably used after dilution with an organic solvent. The organic solvent is preferably one having a solidification point of 0° C. or below, and also preferably one which has no reactivity with the metal compound when mixed under the conditions of the invention. Exemplary organic solvents include alcohols, aliphatic hydrocarbons, aromatic hydrocarbons, halogenated hydrocarbons, ketones, esters, ethers, ketone ethers, ketone esters and ester ethers. Specific examples include methanol, ethanol, propanol, butanol, pentanol, hexanol, heptanol, octanol, nonanol, benzyl alcohol, methyl cyclohexanol, ethanediol, propanediol, butanediol, pentanediol, hexylene glycol, octylene glycol, hexanetriol, 3,5,5-trimethyl-1-hexanol, butyl formate, pentyl formate, methyl acetate, ethyl acetate, propyl acetate, butyl acetate, pentyl acetate, hexyl acetate, benzyl acetate, 3-methoxybutyl acetate, 2-ethylbutyl acetate, 2-ethylhexyl acetate, methyl propionate, ethyl propionate, butyl propionate, pentyl propionate, dimethyl ketone, methyl ethyl ketone, pentanone, hexanone, methyl isobutyl ketone, heptanone, diisobutyl ketone, acetonitrile, diethyl ether, dipropyl ether, diisopropyl ether, dibutyl ether, dihexyl ether, anisole, tetrahydrofuran, tetrahydropyran, dimethoxyethane, diethoxyethane, dibutoxyethane, diethylene glycol dimethyl ether, diethylene glycol diethyl ether, diethylene glycol dibutyl ether, methyral, acetal, heptane, hexane, heptane, octane, nonane, decane, dodecane, toluene, xylene, ethylbenzene, cumene, mesitylene, tetralin, butylbenzene, cymene, diethylbenzene, pentylbenzene, dipentylbenzene, cyclopentane, cyclohexane, methylcyclohexane, ethylcyclohexane, decalin, chloromethane, dichloromethane, trichloromethane, tetrachloromethane, chloroethane, dichloroethane, trichloroethane, tetrachloroethane, pentachloroethane, chloropropane, dichloropropane, trichloropropane, chlorobutane, chloropentane, chlorobenzene, dichlorobenzene, chlorotoluene, bromomethane, bromoethane, bromopropane, bromobenzene and chlorobromomethane. Of these, alcohols, esters and hydrocarbons are preferred. Butanol, pentanol, hexanol, trimethylhexanol, methyl acetate, propyl acetate, butyl acetate, pentane, hexane, xylene and toluene are especially preferred. The above organic solvents may be used singly or as combinations of two or more thereof. When the water and the organic solvent are uniformly dissolved and mixed, the resulting mixture may be used directly as is. If the water and the organic solvent do not mix uniformly, they may be used after uniform dispersion by a suitable method such as agitation or ultrasonic processing. The amount of organic solvent used for dilution is preferably in a range of 2 to 100 parts by weight per part by weight of water.

Dispersoid I is obtained by mixing the above-described metal compound with a given amount of water in the absence of at least one selected from the group consisting of an acid, a base and a dispersion stabilizer, and at a given temperature. The method of mixing the metal compound and the given amount of water is not subject to any particular limitation. Exemplary methods include adding the water to the metal compound under stirring, adding the metal compound to the water under stirring, and adding the metal compound and the water at the same time to a vessel equipped with an agitator. Mixing may be carried out without using a solvent, although mixing with the use of an organic solvent is preferable for efficient production of the target dispersoid I.

The organic solvent used is an organic substance which is preferably capable of dispersing the target dispersoid I ultimately obtained. Specific examples include alcohols such as methanol, ethanol and isopropyl alcohol; chlorinated solvents such as methylene chloride and chloroform; hydrocarbons such as hexane, cyclohexane, benzene, toluene, xylene and chlorobenzene; ethers such as tetrahydrofuran, diethyl ether and dioxane; ketones such as acetone, methyl ethyl ketone and methyl isobutyl ketone; aprotic polar solvents such as dimethylformamide, dimethylsulfoxide and N-methylpyrrolidone; and the silicones such as methylpolysiloxane, octamethylcyclotetrasiloxane, decamethylcyclopentanesiloxane and methylphenylpolysiloxane which are used as dispersion media for the titanium dioxide dispersions described in JP A 9-208438. As described subsequently, to add water and carry out the reaction at a low temperature, a solvent which does not solidify at low temperature is preferred. Illustrative examples include lower alcohols, ethers, and hydrocarbons such as toluene. These solvents may be used singly or as mixtures of two or more thereof.

When an organic solvent is used, examples of methods that may be used to prepare the dispersoid I of the invention include adding water or water diluted with an organic solvent to an organic solvent solution of the metal compound, adding water diluted with an organic solvent to the metal compound, and adding the metal compound or the metal compound diluted with an organic solvent to the water diluted with an organic solvent. The amount of organic solvent used to dilute the metal compound is preferably 10 to 5,000 parts by weight, and more preferably 100 to 3,000 parts by weight, per 100 parts by weight of the metal compound. At less than 10 parts by weight, the fine particles that form grow in a bonded state, which may make the particle size difficult to control. On the other hand, at more than 5,000 parts by weight, the solution is too dilute, which may make formation of the fine particles difficult. The amount of organic solvent used to dilute the water is as described above. If only either of the metal compound and the water is to be diluted with an organic solvent prior to use, dilution is not limited within the above range and may be carried out with a larger amount of organic solvent.

The given temperature during mixture of the metal compound and the water is a temperature below 0° C., although a temperature of −20° C. or below is preferred, and a temperature in a range of −50 to −100° C. is especially preferred. A temperature at or below the temperature at which the metal compound begins to hydrolyze is also preferred. The given temperature need not always be fixed, and may fluctuate, provided it does so within the specified temperature range.

Here, "temperature at which the metal compound begins to hydrolyze" refers to the lower limit temperature at which hydrolysis proceeds when the metal compound and the water come into contact. Any suitable method may be used to measure the temperature at which the metal compound begins to hydrolyze. Examples include the method described in JP A 1-230407, and a method in which the $^1$H-NMR spectrum is measured during a rise in temperature from a low-temperature state so as to determine signal changes for the hydrolyzable groups on the metal compound. When water is added to the metal compound at the given temperature, it is preferable to add water or a water-containing organic solvent solution of a similar given temperature.

No particular limitation is imposed on the method of addition, provided the temperature is maintained at the given temperature. Exemplary methods of addition include continuous dropwise addition, dropwise addition of a fixed amount at fixed intervals, and pouring into the liquid.

It is advantageous for Dispersoid I of the invention to be prepared by carrying out the above-described water addition step at the given temperature, then raising the temperature to or above the given temperature. No particular limitation is imposed on the temperature to which the system is raised. When a solvent is used, the temperature may be raised up to the solvent refluxing temperature.

(II) Dispersoid II

Dispersoid II of the present invention is a dispersoid having metal-oxygen bonds obtained by mixing, in the absence of at least one selected from the group consisting of an acid, a base and a dispersion stabilizer and at a given temperature, a partial hydrolysate that is prepared by hydrolyzing a metal compound having at least three hydrolyzable groups in the absence of an acid, base and/or dispersion stabilizer and can be stably dispersed without aggregation in an organic solvent with an amount of water equal to at least 0.5 mole but less than 2 moles per mole of the metal compound minus the amount of water used to prepare the partial hydrolysate, which dispersoid is characterized in that the given temperature is a temperature below 0° C.

The partial hydrolysate is not subject to any particular limitation, provided it is of a nature that stably disperses in the organic solvent without aggregation. A specific example is the polytitanoxane described as Comparative Specimen C-2 in JP A 1-129032. No particular limitation is imposed on the method of preparation, although it is preferable to use a method like that for preparing the inventive dispersoid.

"Stably dispersed without aggregation" refers herein to a state where the dispersoid having metal-oxygen bonds has not coagulated and heterogeneously separated, and preferably refers to a transparent and homogeneous state. Here, "transparent" refers to a state of high transmittance to visible light. Specifically, it refers to a state of preferably 80 to 100% transmittance, expressed as the spectral transmittance measured at a dispersoid concentration of 0.5 wt % (oxide basis), at a quartz cell light path length of 1 cm, using the organic solvent as the control, and at a light wavelength of 550 nm. "Stably dispersed without aggregation" is used in the same sense throughout the specification.

Dispersoid II of the invention is obtained by mixing the partial hydrolysate and water at a temperature of 0° C. or below, preferably a temperature of −20° C. or below, and more preferably a temperature in a range of −50 to −100° C. A temperature at or below the temperature at which the metal compound begins to hydrolyze is also preferred. Other details, including those concerning the metal compound, the water, and the mixing method used, are the same as described above for Dispersoid I.

(III) Dispersoid III

Dispersoid III of the present invention is a dispersoid having metal-oxygen bonds which is obtained by mixing a metal compound having at least three hydrolyzable groups with a given amount of water in the absence of an acid, a base and/or a dispersion stabilizer and at a given temperature, which dispersoid is characterized in that the given amount of water is a solution diluted with a hydrocarbon solvent and an alcohol solvent, the diluted solution is added to the metal compound, and the given temperature is room temperature.

Dispersoid III of the invention can be obtained by the direct addition of an aqueous solution to the metal compound, although the use of an organic solvent is preferable for better control of the reaction. The organic solvent used is exemplified by the same solvents and the same amount as those mentioned above for Dispersoid I.

Illustrative examples of hydrocarbon solvents that may be used to dilute the water include aliphatic hydrocarbons such as hexane and cyclohexane, and aromatic hydrocarbons such as benzene, toluene and xylene. An aromatic hydrocarbon is preferred, and toluene or xylene is especially preferred.

Examples of alcohol solvents include methanol, ethanol and isopropyl alcohol. Isopropyl alcohol is preferred.

The mixing ratio of the hydrocarbon solvent and the alcohol solvent is not subject to any particular limitation, although a mixing ratio in a range of 2:8 to 8:2 is preferred, and a mixing ratio in a range of 4:6 to 6:4 is especially preferred.

No particular limitation is imposed on the amount of water added, although it is advantageous to add at least 0.5 mole but less than 5 moles, preferably at least 0.5 mole but less than 2 moles, and most preferably at least 1.0 mole but less than 2 moles, of water per mole of the metal compound. The concentration of water added, based on the combined amount of hydrocarbon solvent, alcohol solvent and water, is preferably 1 to 15 wt %, more preferably 1 to 10 wt %, and even more preferably 1 to 5 wt %. It is desirable for the water to be in a uniformly dissolved state. The concentration of water added, is preferably from 40% to 1%, more preferably from 30% to 10%, and even more preferably from 25% to 15%, of the saturation solubility of water in a mixed solvent of the hydrocarbon solvent and the alcohol solvent.

Addition of the mixture of hydrocarbon solvent, alcohol solvent and water to the metal compound is carried out at room temperature. After aging for a fixed period of time, hydrolysis and dehydrative condensation reactions can be carried out at from room temperature to the refluxing temperature of the solvent used.

Other details are the same as described above for Dispersoids I and II.

(IV) Dispersoid IV

Dispersoid IV of the present invention is a dispersoid having metal-oxygen bonds which is obtained by the addition, to a metal compound having least three hydrolyzable groups, of at least 0.5 mole but less than 2 moles of water per mole of the metal compound, which dispersoid is characterized by having steps in which the water is added in a some of divided portions at a given temperature, which steps include at least one step in which the given temperature is a temperature below 0° C.

That is, the method of preparing this dispersoid of the invention includes the following three essential features:
(i) adding, to the metal compound having at least three hydrolyzable groups, a total of at least 0.5 mole but less than 2 moles of water per mole of the metal compound;
(ii) adding the water in two or more divided portions;
(iii) at least one of the steps in which the water is added in a some of divided portions is a step in which the water is added at a temperature below 0° C.

"Added in a some of divided portions" refers herein to, for example, addition under varying addition conditions, addition under the same addition conditions but in differing amounts, and addition under the same addition conditions and in the same addition amounts but at fixed intervals; that is, any addition other than one where the required amount of water is added under certain fixed conditions without extended intervals during addition. No particular limitation is imposed, provided the number of portions is two or more. However, taking into account the reaction operations, it is preferable for the water added to be divided into two portions, with at least one portion of water being added at a temperature below 0° C. The amount of water added at one time is not subject to any particular limitation, provided the combined amount of water is at least 0.5 mole but less than 2.0 moles per mole of the metal compound, although it is preferable in particular for the amount added at first to be at least 0.5 mole but less than 1 mole per mole of the metal compound. The temperature of addition is not subject to any particular limitation, provided the steps in which water is added in a some of divided portions include at least one step in which water is added at a temperature below 0° C. However, it is desirable that, following the first water addition step, the rest of the required amount of water is added at preferably a temperature below 0° C., and more preferably a temperature of −20° C. or below; also preferred are a temperature at or below the temperature at which the metal compound beings to hydrolyze, and a temperature in a range of −50 to −100° C.

In the preparation of the dispersoid, it is preferable that, following each step in which water is added at the given temperature, the temperature be raised to the given temperature or above. Although no particular limitation is imposed on the level to which the temperature is raised, when an organic solvent is used, it is preferable to raise the temperature to the refluxing temperature of the organic solvent.

The water addition step can be carried out in the presence of at least one selected from the group consisting of an acid, a base and a dispersion stabilizer, although it is preferably carried out in the absence of these.

Other details are the same as described above for Dispersoids I to III.

(V) Qualities Shared by Dispersoids I to IV

Dispersoids I to IV prepared as described above are characterized by being stably dispersed in an organic solvent even when the weight concentration of the dispersoid (metal oxide basis) in the organic solvent solution is at least 1.2 times, and preferably at least 1.4 times as much as the weight concentration of the metal compound (metal oxide basis) prior to hydrolysis. As a result, even when a solution of the dispersoid having metal-oxygen bonds dispersed to a high concentration in the organic solvent is placed in a yet higher concentration state by driving off the organic solvent at a temperature of at least room temperature but preferably not more than 80° C., the dispersoid particles do not coagulate and re-addition of the organic solvent yields a homogeneous and transparent dispersion. "High-concentration" here includes a solvent-free state. Depending on the metal, the state at this time may be a solid state, liquid state or gelled state, or may be a state that represents a mixture thereof.

Dispersoids I to IV of the invention are also characterized by being dispersoids which are stably dispersed, without aggregation, in an organic solvent and in the absence of at least one selected from the group consisting of an acid, a base and a dispersion stabilizer. "Stably dispersed without aggregation" refers herein to a state where the dispersoid having metal-oxygen bonds has not coagulated and heterogeneously separated within the organic solvent, and preferably refers herein to a transparent and homogeneous state. Here, "transparent" signifies a state of high transmittance to visible light, and specifically a state of preferably 80 to 100% transmittance, expressed as the spectral transmittance measured at a dispersoid concentration of 0.5 wt % (oxide basis), at a quartz cell light path length of 1 cm, using the organic solvent as the control, and at a light wavelength of 550 nm.

The organic solvent used for dispersing Dispersoids I to IV of the invention is not subject to any particular limitation provided it is a liquid organic substance and can disperse the dispersoid. Specific examples include alcohols such as methanol, ethanol and isopropyl alcohol; chlorinated solvents such as methylene chloride and chloroform; hydrocarbons such as hexane, cyclohexane, benzene, toluene, xylene and chlorobenzene; ethers such as tetrahydrofuran, diethyl ether and dioxane; ketones such as acetone, methyl ethyl ketone and methyl isobutyl ketone; aprotic polar solvents such as dimethylformamide, dimethylsulfoxide and N-methylpyrrolidone; and the silicones mentioned in JP A 9-208438, such as methylpolysiloxane, octamethylcyclotetrasiloxane, decamethylcyclopentanesiloxane and methylphenylpolysiloxane, which are used as dispersion media for titanium dioxide dispersions. As explained later in the specification, a solvent which does not solidify at low temperatures is preferred for adding water and carrying out the reaction at a low temperature. Illustrative examples of such solvents include lower alcohols, ethers, and hydrocarbons such as toluene. These solvents may be used singly or as mixtures of two or more thereof.

The Dispersoids I to IV of the invention are additionally characterized by having a particle size in a range of 1 to 100 nm, and also in a range of 1 to 50 nm and a range of 1 to 20 nm. The particle size distribution is characterized by being monodisperse with a particle size in a range of 0 to 50 nm.

(VI) Metal Oxide Film

A metal oxide film can be produced from a dispersoid having metal-oxygen bonds prepared as described above and/or an inorganic polymer obtained using the dispersoid as the starting material.

When a metal oxide film is formed, the dispersoid can be used after dilution with a suitable solvent, followed by removal of the solvent by distillation to give a solvent-free state. Alternatively, following removal of the solvent by distillation, the dispersoid can be re-dissolved or re-dispersed in a different solvent and used.

In the dispersoid of the invention, it is possible to carry out hydrolysis and polycondensation reactions on the hydrolyzable group-bearing metal compound in a high concentration without adding a dispersion stabilizer such as a multidentate compound to stabilize the hydrolysate, thereby enabling a high-concentration dispersion which contains no unnecessary organic matter such as multidentate compounds to be obtained. When this dispersion is used, products such as gel films, gel fibers and bulk gel having a low organic matter content can thus be obtained. When the organic matter from these gel products is removed such as by heat treatment, microstructural breakdown and the number of residual pores in the resulting body can be reduced.

The method of producing metal oxide thin films is characterized by coating a solution containing the dispersoid, then drying at a temperature of 200° C. or below.

The concentration of the dispersoid in the dispersoid-containing solution varies with the coating method and the desired film thickness, but is not subject to an particular limitation provided it is a concentration capable of being coated onto a substrate. A concentration within a range of 5 to 50 wt %, based on the oxide, is preferred.

The solvent used in the solution is exemplified by solvents similar to the above-mentioned solvents used for dispersing the dispersoid. It is especially preferable to use the same solvent as was used to disperse the dispersoid, although a different solvent may be used provided it is a solvent which does not affect the dispersibility of the dispersoid.

If necessary, other ingredients may be added to the dispersoid-containing solution. Specific examples of other ingredients include inorganic binders such as silicon compounds (e.g., water glass, colloidal silica, polyorganosiloxane), phosphates (e.g., zinc phosphate, aluminum phosphate), biphosphates, cements, limes, gypsums, enamel frits, glazes for glass lining, and plasters; and organic binders such as fluoropolymers, silicone polymers, acrylic resins, epoxy resins, polyester resins, melamine resins, urethane resins and alkyd resins. These binders may be used singly or as combinations of two or more thereof. Inorganic binders, fluoropolymers and silicone polymers are especially preferred from the standpoint of bond strength. Cements that may be used include Portland cements such as high early-strength cement, normal cement, moderate heat cement, sulfate-resisting cement, white cement, oil well cement and geothermal cement; blended cements such as fly ash cement, highly sulfated slag cement, Portland pozzolan cement and Portland blast-furnace slag cement; and alumina cement. Plasters that may be used include gypsum plaster, lime plaster and dolomite plaster. Fluoropolymers that may be used include crystalline fluororesins such as polyvinyl fluoride, polyvinylidene fluoride, polytrifluoroethylene, polytetrafluoroethylene, polytetrafluoroethylene-polyhexafluoropropylene copolymers, ethylene-polytetrafluoroethylene copolymers, ethylene-chlorotrifluoroethylene copolymers and tetrafluoroethyleneperfluoroalkyl vinyl ether copolymers; noncrystalline fluororesins such as perfluorocyclopolymers, vinyl ether-fluoroolefin copolymers and vinyl ester-fluoroolefin copolymers; and various fluororubbers. Fluororubbers composed primarily of vinyl ether-fluoroolefin copolymers and vinyl ester-fluoroolefin copolymers are especially preferred because they undergo little degradation or deterioration and are easy to handle. Silicone polymers that may be used include linear silicone resins, acrylic-modified silicone resins, acrylic-silicone resins, epoxy-silicone resins, and various silicone rubbers.

The relative amounts of the above-described dispersoid and the foregoing other ingredients, expressed as the weight ratio of the dispersoid to the combined amount of both the dispersoid and the other ingredients is 5 to 98%, preferably 20 to 98%, more preferably 50 to 98%, and even more preferably 70 to 98%. If necessary, other ingredients such as heat stabilizers, antioxidants, ultraviolet absorbers, antistatic agents, colorants, surfactants, crosslinking agents, dispersants and fillers may also be included in the dispersoid-containing solution. Crosslinking agents that may be used include ordinary crosslinking agents such as isocyanate- or melamine-based crosslinking agents. Dispersants that may be used include coupling agents.

Any suitable known method may be used to coat the above-described dispersoid-containing solution onto a substrate, including spin coating, dip coating, spray coating, roll coating and screen printing. Roll coating is preferred for carrying out mass production inexpensively. Especially preferred methods are those which use a bar or a roller-type coating device. Screen printing and offset printing are also advantageous in that they enable patterning to be carried out during coating. The coating weight varies with the intended use of the resulting thin film, although the coating weight of active ingredients other than the solvent is generally from 0.1 to 10 ml/m$^2$, preferably from 0.2 to 7 ml/m$^2$, and more preferably from 0.4 to 5 ml/m$^2$.

The substrate may be an object made of an inorganic material such as ceramic or glass, an object made of an organic material such as plastic, rubber, wood or paper, or an object made of a metal material such as a metal (e.g., aluminum) or metal alloy (e.g., steel). No particular limitation is imposed on the size or shape of the substrate. For example, the substrate may be a flat plate, a three-dimensional object or a film. Even a painted object may be used for this purpose. Of these, a plastic film is preferred. Illustrative examples of plastic films that may be used include cellulose triacetate, cellulose diacetate, nitrocellulose, polystyrene, polyethylene terephthalate, polyethylene naphthalate, syndiotactic polystyrene, polyethylene-coated paper, polyethersulfone, polyarylate, polyvinylidene fluoride and Teflon (registered trademark). These substrates may be provided with a polyvinylidene chloride-type polymer-containing waterproofing layer so as to enhance dimensional stability; i.e., the stability to dimensional changes from changes in temperature and humidity. In addition, an organic and/or inorganic compound thin film may be provided as a gas barrier. Illustrative examples of organic thin films include polyvinyl alcohol and poly(ethylene-co-vinyl alcohol). Illustrative examples of inorganic compounds include silica, alumina, talc, vermiculite, kaolinite, mica and synthetic mica. Various organic and/or inorganic additives may also included in the substrate to confer other capabilities as well.

Heating of the applied film is carried out together with drying of the solvent, the purpose being to effect, for example, hydrolysis and dehydrative condensation of the dispersoid. It is desirable for heating after coating to be carried out at a low temperature of 200° C. or below so as not to damage the substrate. Heating is carried out at preferably 20 to 100° C., and more preferably 30 to 80° C. The heating time is not subject to any particular limitation, although it is generally suitable to carry out heating for a period of from 1 minute to 120 hours.

In the practice of the invention, if the metal oxide film that has formed is required to have mechanical strength, a protective film may be formed thereon. A common protective film-forming coating solution, such as a silica film-forming coating solution which contains an alkoxysilane hydrolysate, may be used to form this protective coat.

In the practice of the invention, for a metal oxide film that requires crystallization, it is preferable to add fine seed crystals of the target metal oxide to the coating solution containing the dispersoid having metal-oxygen bonds. The addition ratio of the fine metal oxide crystals is preferably 10 to 90 wt %, and more preferably 10 to 80 wt %, of the sol weight when the sol has formed from the dispersoid. As mentioned later in the specification, in the practice of the invention, there are cases where the metal oxide crystallizes upon exposure to light. In such cases, adding seed crystals will further accelerate crystallization of the metal oxide. The seed crystals may be of any size, although a sphere equivalent diameter of 0.1 μm or less is preferable from the standpoint of light transmittance.

The seed crystals added are not limited to crystals of the same metal oxide and may instead be ones suitable for heteroepitaxy because they have, for example, the same crystal form and/or a similar lattice constant. For example, indium oxide may be used as the seed crystals when forming an ITO film.

The seed crystals used may be commercially available product or synthesized crystals. If the metal oxide film is to be a ITO film, the seed crystals may be a commercial product made by, for example, Mitsubishi Materials Corporation or Sumitomo Metal Mining Co., Ltd. Examples of methods for synthesizing the seed crystals include sol-gel methods, hydrothermal synthesis, and ordinary sintering. Detailed descriptions of sol-gel methods appear in, for example, "Science of the Sol-Gel Process" [Zoru-geru hō no kagaku] by Sumio Sakka (Agne Shofusha, 1988); "Thin-Film Coating Technology Using the Sol-Gel Process" [Zoru-geru hō ni yoru hakumaku kōtingu gijutsu] (Gijutsu Joho Kyokai, 1994); and "The Sol-Gel Process: Today and Tomorrow" [Zoru-geru ho no genjō to tenbō], edited by Masayuki Yamane (Sol-Gel Process Report Publication Committee of the Association of Technical Information Services (ATIS), 1992).

The film-forming method of the invention is preferably one which involves light irradiation during and/or after heating of the applied film. The light source used to irradiate the applied film with ultraviolet light or visible light may be any which emits light having a wavelength of 150 to 700 nm. Illustrative examples include ultrahigh-pressure mercury vapor lamps, high-pressure mercury vapor lamps, low-pressure mercury vapor lamps, xenon lamps, halogen lamps and sodium lamps. Ultrahigh-pressure mercury vapor lamps, high-pressure mercury vapor lamps, low-pressure mercury vapor lamps and xenon lamps are preferred. A transparent, electrically conductive pattern can be formed by using a photomask with the light source. A laser oscillator may also be used. Examples of suitable laser oscillators include excimer lasers, argon lasers, helium neon lasers, semiconductor lasers, YAG lasers, carbon dioxide lasers and dye lasers. When laser light is employed, metal oxide does not form in non-irradiated areas, and so patterning is possible without the use of a process such as screen printing at the time of coating. Use can also be made of synchrotron light.

These apparatuses can be selected according to the desired wavelength of irradiation. When reaction of the dispersoid-containing coating solution is carried out, the metal oxide that forms is sometimes accompanied by residual metal hydroxide. Given the absorption by metal-OH bonds that occurs in such cases, it is desirable to use an apparatus which emits light that includes ultraviolet radiation having a wavelength of 400 nm or less. Also, if the dehydration reaction proceeds to the point where a metalloxane network forms, the metal-oxygen-metal bonds absorb at a shorter wavelength than metal-OH bonds, but crystallization of the metal oxide will proceed with the irradiation of light having a wavelength capable of activating the metal-oxygen-metal bonds. The irradiation time is not subject to any particular limitation, although irradiation is generally carried out for a period of from 1 minute to 120 hours.

In the practice of the invention, the light irradiation process may be carried out in any atmosphere, although irradiation in a somewhat reducing atmosphere is preferred. In a somewhat reducing atmosphere, the greater degree of oxygen deficiency is thought to inhibit increases in carrier density and/or adsorption of the oxygen molecules to the grain boundaries.

A high-boiling, low-molecular-weight solvent which decomposes under light irradiation may be used. Examples of such solvents include isophorone and benzyl acetate.

If light irradiation is carried out, substances such as photodegradable resins may also be added to this dispersion-containing solution. Illustrative examples include poly(m-ethyl vinyl ketone), poly(vinyl phenyl ketone), polysulfone, diazonium salts such as the polycondensate of p-diazodiphenylamine and paraformaldehyde, quinonediazides such as the isobutyl ester of 1,2-naphthoquinone-2-diazido-5-sulfonic acid, and poly(methyl methacrylate), poly(phenyl methylsilane) and poly(methyl isopropenyl ketone). It is desirable to use these resins in an amount of 0 to 1,000 parts by weight per 100 parts by weight of the metal compound. Moreover, when light irradiation is carried out, if the wavelength of the irradiated light differs from the absorption wavelength of the dispersoid differ, it is desirable to add a photosensitizer.

Even though it has been formed by the simple operation of merely coating or spraying, followed by heat treatment at a low temperature of 200° C. or below, the metal oxide film obtained as described above is characterized by having a smooth film surface. The film surface is characterized by having an average roughness, which is a value indicating smoothness, of 10 nm or less, and preferably 5 nm or less. Because it can be heat treated at a low temperature, even when the metal oxide film has been formed on a plastic substrate, the film is characterized by having a carbon content, expressed as an atomic ratio, of 10% or less.

(VII) Organic-Inorganic Hybrid Material

The organic-inorganic hybrid material of the invention is characterized by containing at least one selected from the group consisting of a dispersoid having metal-oxygen bonds prepared as described above, an inorganic structural portion derived from the dispersoid, and an inorganic polymer obtained from the dispersoid as the starting material.

The organic component is not subject to any particular limitation. Any suitable resin, such as an addition polymer, polyadduct or polycondensate may be used. Specific examples are listed below.

Examples of acrylic resins include those obtained by polymerization from the following monomers as the starting materials: monofunctional methacrylic acid esters such as methyl methacrylate, ethyl methacrylate, n-butyl methacrylate, hexyl methacrylate, benzyl methacrylate, phenyl methacrylate, cyclohexyl methacrylate, isobornyl methacrylate, adamantyl methacrylate, tricyclo[5.2.1.0]decanyl methacrylate and 3,3,3-trifluoroethyl methacrylate; polyfunctional methacrylic acid esters such as ethylene glycol dimethacrylate, diethylene glycol dimethacrylate, triethylene glycol dimethylacrylate, tripropylene dimethacrylate, 1,4-butanediol dimethacrylate, 1,6-hexanediol dimethacrylate, trimethylolpropane trimethacrylate, pentaerythritol trimethacrylate, glycerol dimethacrylate, 2,2-bis[4-(methacryloxy)phenyl]propane and 2,2-bis[4-(methacryloxyethoxy)phenyl]propane. Monofunctional acrylic acid esters such as methyl acrylate, ethyl acrylate, n-butyl acrylate, hexyl acrylate, cyclohexyl acrylate, benzyl acrylate, phenyl acrylate, isobornyl acrylate, tricyclo[5.2.1.0]decanyl acrylate and 3,3,3-trifluoroethyl acrylate; and polyfunctional acrylic acid esters such as ethylene glycol diacrylate, triethylene glycol diacrylate, 1,6-hexanediol diacrylate, trimethylolpropane triacrylate and pentaerythritol triacrylate. Monomers that are copolymerizable with the above acrylic or methacrylic compounds include styrene, ring-substituted styrenes such as methylstyrene, dimethylstyrene, chlorostyrene, dichlorostyrene, bromostyrene, p-chloromethylstyrene and divinylbenzene; as well as α-methylstyrene, acrylonitrile, methacrylonitrile, maleic anhydride and N-substituted maleimide. Copolymers of these latter monomers with the above acrylic or methacrylic compounds also are considered herein as acrylic resins.

Organic monomers which are radical- or cationic-polymerizable are preferred, and organic monomers having at least one type of bond selected from among amide bonds, imide bonds, urethane bonds and urea bonds are especially preferred. Of such organic monomers, specific examples of radical-polymerizable organic monomers include (meth)acrylamide, (meth)acrylamide derivatives, (meth)acryloylmorpholine, N-vinylpyrrolidone, urethane (meth)acrylate, and the addition products of aminoalkyl (meth)acrylates and isocyanate. Here, (meth)acrylamide stand for both methacrylamide and acrylamide, and (meth)acrylate stands for both methacrylate and acrylate.

Of the above organic monomers, exemplary cation-polymerizable monomers are compounds having an epoxy ring, a vinyl ether bond or an ortho-spiro ring as a polymerization functional group. Specific examples include ethylene glycol diglycidyl ether, propylene glycol diglycidyl ether and hydrogenated bisphenol A diglycidyl ether.

Optional organic monomers may be used together with the above essential organic monomer to modify the resulting polymer. Such optional organic monomers may or may not have amide bonds, urethane bonds and urea bonds. However, the mode of polymerization for these optional organic monomers must be the same as for the above-described essential monomers (i.e., radical polymerization, cationic polymerization).

"Poly(thio)urethane resins" refers herein to polythiourethane or polyurethane resins obtained by reacting a polyisocyanate compound with a polythio compound or a polyhydroxy compound.

The polyisocyanate compound is not subject to any particular limitation. Specific examples include the following:
(i) alicyclic isocyanate compounds such as hydrogenated 2,6-tolylene diisocyanate, hydrogenated m- and p-phenylene diisocyanate, hydrogenated 2,4-tolylene diisocyanate, hydrogenated diphenylmethane diisocyanate, hydrogenated m-xylylene diisocyanate, hydrogenated p-xylylene diisocyanate, isophorone diisocyanate, hydrogenated 1,3-bis(isocyanatomethyl)benzene and norbornane diisocyanate;

(ii) aromatic ring-bearing isocyanate compounds such as m- and p-phenylene diisocyanate, 2,4-tolylene diisocyanate, 2,6-tolylene diisocyanate, 4,4'-diphenylmethane diisocyanate, m- and p-xylylene diisocyanate, m- and p-tetramethylxylylene diisocyanate, 2,6-naphthalene diisocyanate, 1,5-naphthalene diisocyanate and 1,3-bis(isocyanatomethyl)benzene (preferred examples include 2,4- and 2,6-tolylene diisocyanate, 4,4'-diphenylmethane diisocyanate, m-xylylene diisocyanate, m-tetramethylxylylene diisocyanate, 2,6-naphthalene diisocyanate and 1,3-bis(isocyanatomethyl)benzene);

(iii) isocyanate compounds without an alicyclic or aromatic ring, such as hexamethylene diisocyanate, octamethylene diisocyanate, 2,2,4-trimethylhexamethylene diisocyanate, tetramethylene diisocyanate, the biuret reaction product of hexamethylene diisocyanate, the trimer of hexamethylene diisocyanate, lysine diisocyanate, 2-isocyanatomethyl-2,6-diisocyanatocaproate, 1,6,11-undecane triisocyanate and triphenylmethane triisocyanate; and (iv) sulfur-containing isocyanate compounds such as diphenyl disulfide-4,4'-diisocyanate, 2,2'-dimethyldiphenyl disulfide-5,5'-diisocyanate, 3,3'-dimethyldiphenyl disulfide-5,5'-diisocyanate, 3,3'-dimethyldiphenyl disulfide-6,6'-diisocyanate, 4,4'-dimethyldiphenyl disulfide-5,5'-diisocyanate, 3,3'-dimethoxyphenyl disulfide-4,4'-diisocyanate, 4,4'-dimethoxydiphenyl disulfide-3,3'-diisocyanate, diphenyl sulfone-4,4'-diisocyanate, diphenyl sulfone-3,3'-diisocyanate, benzylidene sulfone-4,4'-diisocyanate, diphenylmethane sulfone-4,4'-diisocyanate, 4-methyldiphenylmethane sulfone-2,4'-diisocyanate, 4,4'-dimethoxydiphenyl sulfone-3,3'-diisocyanate, 3,3'-dimethoxy-4,4'-diisocyanatodibenzyl sulfone, 4,4'-dimethyldiphenyl sulfone-3,3'-diisocyanate, 4,4'-di-tert-butyldiphenyl sulfone-3,3'-diisocyanate, 4,4'-dimethoxybenzene ethylene disulfone-3,3'-diisocyanate, 4,4'-dichlorodiphenyl sulfone-3,3'-diisocyanate, 4-methyl-3-isocyanatobenzenesulfonyl-4'-isocyanate phenol ester, 4-methoxy-3-isocyanatobenzenesulfonyl-4'-isocyanate phenol ester, 4-methyl-3-isocyanatobenzenesulfonylanilide-3'-methyl-4'-isocyanate, dibenzenesulfonyl ethylenediamine-4,4'-diisocyanate, 4,4'-dimethoxybenzenesulfonyl ethylenediamine-3,3'-diisocyanate, 4-methyl-3-isocyanatobenzenesulfonylanilide-4-methyl-3'-isocyanate, thiophene-2,5-diisocyanate, thiophene-2,5-diisocyanatomethyl, 1,4-dithian-2,5-diisocyanate, 1,4-dithian-2,5-diisocyanatomethyl, 1,4-dithian-2-isocyanatomethyl-5-isocyanatopropyl, 1,3-dithiolan-4,5-diisocyanate, 1,3-dithiolan-4,5-diisocyanatomethyl, 1,3-dithiolan-2-methyl-4,5-diisocyanatomethyl, 1,3-dithiolan-2,2-diisocyanatoethyl, tetrahydrothiophene-2,5-diisocyanate, tetrahydrothiophene-2,5-diisocyanatomethyl, tetrahydrothiophene-2,5-diisocyanatoethyl and tetrahydrothiophene-3,4-diisocyanatomethyl.

Specific examples of polythiol compounds include the following:

(i) aliphatic thiols such as methanedithiol, 1,2-ethanediol, 1,1-propanedithiol, 1,2-propanedithiol, 1,3-propanedithiol, 2,2-propanediol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol (2-mercaptoacetate), 2,3-dimercapto-1-propanol (3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethylthio)-3-mercaptopropane and tetramethylolmethanetetrakis(3-mercaptopropionate);

(ii) aromatic thiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,4,5-tetrakis(mercaptomethoxy)benzene, 1,2,3,4-tetrakis(mercaptomethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobiphenyl, 2,5-toluenedithiol, 3,4-toluenedithiol, 1,4-naphthalenedithiol, 1,5-naphthalenedithiol, 2,6-naphthalenedithiol, 2,7-napthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol and 2,4-di(p-mercaptophenyl)pentane;

(iii) halogen substituted aromatic thiols, including chlorine-substituted and bromine—substituted compounds such as 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene;

(iv) aromatic thiols containing sulfur atoms as well as mercapto groups, such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris (mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene and 1,2,3,5-tetrakis(mercaptoethylthio)benzene and 1,2,4,5-tetrakis(mercaptoethylthio)benzene, as well as ring-alkylated compounds thereof;

(v) aliphatic thiols containing sulfur atoms as well as mercapto groups, such as bis(mercaptomethyl) sulfide, bis(mercaptoethyl) sulfide, bis(mercaptopropyl) sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, bis(mercaptomethyl) disulfide, bis(mercaptoethyl) disulfide and bis(mercaptopropyl) disulfide, and the thioglycolic acid and mercaptopropionic acid esters thereof; hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), thioglycolic acid bis(2-mercaptoethyl ester), thiodipropionic acid bis(2-mercaptoethyl ester), 4,4'-thiodibutyric acid bis(2-mercaptoethyl ester), dithiodiglycolic acid bis(2-mercaptoethyl ester), dithiodipropionic acid bis(2-mercaptoethyl ester), 4,4'-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester), dithiodipropionic acid (2,3-dimercaptopropyl ester), 4-mercaptomethyl-3,6-dithiaoctane-1,8-dithiol, bis(mercaptomethyl)-3,6,9-trithia-1,11-undecanedithiol and bis(1,3-dimercapto-2-propyl) sulfide; and (vi) heterocyclic compounds containing sulfur atoms as well as mercapto groups, such as 3,4-thiophenedithiol, tetrahydrothiophene-2,5-dimercaptomethyl, 2,5-dimercapto-1,3,4-thiadiazole, 2,5-dimercapto-1,4-dithiane, 2,5-dimercaptomethyl-1,4-dithiane, 1,4-dithian-2,5-diol bis(2-mercaptoacetate) and 1,4-dithian-2,5-diol bis(3-mercaptopropionate).

Specific examples of polyhydroxy compounds include the following:

(i) aliphatic polyols such as ethylene glycol, diethylene glycol, propylene glycol, dipropylene glycol, butylene glycol, neopentyl glycol, glycerol, trimethylolethane, trimethylolpropane, butanetriol, 1,2-methylglucoside, pentaerythritol, dipentaerythritol, tripentaerythritol, triethylene glycol, polyethylene glycol, tris(2-hydroxyethyl)isocyanurate, cyclobutanediol, cyclopentanediol, cyclohexanediol, cycloheptanediol, cyclooctanediol, bicyclo[4.3.0]nonanediol, dicyclohexanediol, tricyclo[5.3.1.1]dodecanediol, spiro[3.4]octanediol and butylcyclohexanediol;

(ii) aromatic polyols such as dihydroxynaphthalene, trihydroxynaphthalene, tetrahydroxynaphthalene, dihydroxybenzene, benzenetriol, trihydroxyphenanthrene, bisphenol A, bisphenol F, xylylene glycol and tetrabromobisphenol A;

(iii) addition reaction products of the polyhydroxy compounds in (i) or (ii) above with an alkylene oxide such as ethylene oxide or propylene oxide; and (iv) sulfur-bearing polyols such as bis[4-(hydroxyethoxy)phenyl] sulfide, bis[4-(2-hydroxypropyl)phenyl] sulfide, bis[4-(2,3-dihydroxypropoxy)phenyl] sulfide, bis[4-(4-hydroxycyclohexyloxy)phenyl] sulfide, bis[2-methyl-4-(hydroxyethoxy)-6-butylphenyl] sulfide, and compounds obtained by adding to these compounds an average of three or fewer molecules of ethylene oxide and/or propylene oxide per hydroxyl group; di-(2-hydroxyethyl) sulfide, 1,2-bis-(2-hydroxyethylmercapto)ethane, bis(2-hydroxyethyl) disulfide, 1,4-dithian-2,5-diol, bis(2,3-dihydroxypropyl) sulfide, tetrakis(4-hydroxy-2-thiabutyl)methane, bis(4-hydroxyphenyl) sulfone (trade name: Bisphenol S), tetrabromobisphenol S, tetramethylbisphenol S, 4,4'-thiobis(6-tert-butyl-3-methylphenol) and 1,3-bis(2-hydroxyethylthioethyl)cyclohexane.

The use of poly(thio)urethane resins as lens substrates is already known to the art. Specific examples of publications that disclose such use include the following: JP A 58-127914, JP A 57-136601, JP A 01-163012, JP A 03-236386, JP A 03-281312, JP A 04-159275, JP A 05-148340, JP A 06-065193, JP A 06-256459, JP A 06-313801, JP A 06-192250, JP A 07-063902, JP A 07-104101, JP A 07-118263, JP A 07-118390, JP A 07-316250, JP A 60-199016, JP A 60-217229, JP A 62-236818, JP A 62-255901, JP A 62-267316, JP A 63-130615, JP A 63-130614, JP A 63-046213, JP A 63-245421, JP A 63-265201, JP A 01-090167, JP A 01-090168, JP A 01-090169, JP A 01-090170, JP A 01-096208, JP A 01-152019, JP A 01-045611, JP A 01-213601, JP A 01-026622, JP A 01-054021, JP A 01-311118, JP A 01-295201, JP A 01-302202, JP A 02-153302, JP A 01-295202, JP A 02-802, JP A 02-036216, JP A 02-058517, JP A 02-167330, JP A 02-270859, JP A 03-84031, JP A 03-084021, JP A 03-124722, JP A 04-78801, JP A 04-117353, JP A 04-117354, JP A 04-256558, JP A 05-78441, JP A 05-273401, JP A 05-093801 JP A 05-080201, JP A 05-297201, JP A 05-320301, JP A 05-208950, JP A 06-072989, JP A 06-256342, JP A 06-122748, JP A 07-165859, JP A 07-118357, JP A 07-242722, JP A 07-247335, JP A 07-252341, JP A 08-73732, JP A 08-092345, JP A 07-228659, JP A 08-3267, JP A 07-252207, JP A 07-324118 and JP A 09-208651. The polyisocyanate compounds, polythiol compounds and polyhydroxy compounds disclosed in these publications can be used as the starting monomers for preparing what are referred to herein as poly(thio)urethane resins.

Resins composed primarily of diethylene glycol bis(allyl carbonate) are exemplified by homopolymers of diethylene glycol bis(allyl carbonate) and copolymers obtained by reacting diethylene glycol bis(allyl carbonate) with a copolymerizable monomer.

Examples of monomers that are copolymerizable with diethylene glycol bis(allyl carbonate) include monofunctional methacrylic acid esters such as methyl methacrylate, ethyl methacrylate, n-butyl methacrylate, ethylhexyl methacrylate, benzyl methacrylate, phenyl methacrylate, cyclohexyl methacrylate, isobornyl methacrylate and adamantyl methacrylate; polyfunctional methacrylic acid esters such as ethylene glycol dimethacrylate, diethylene glycol dimethacrylate, triethylene glycol dimethacrylate, tripropylene glycol dimethacrylate, 1,4-butanediol dimethacrylate, 1,6-hexanediol dimethacrylate, trimethylolpropane trimethacrylate, pentaerythritol trimethacrylate, glycerol dimethacrylate, 2,2-bis[4-(methacryloxy)phenyl]propane and 2,2-bis[4-(methacryloxyethoxy)phenyl]propane; and acrylic acid esters such as methyl acrylate, ethyl acrylate, n-butyl acrylate, ethylhexyl acrylate, cyclohexyl acrylate, benzyl acrylate, phenyl acrylate, isobornyl acrylate, ethylene glycol diacrylate, triethylene glycol diacrylate, 1,6-hexanediol diacrylate, trimethylolpropane triacrylate, pentaerythritol triacrylate, 2,2-bis[4-(acryloxy)phenyl]propane and 2,2-bis[4-(acryloxyethoxy)phenyl]propane. Additional examples include styrene, ring-substituted styrenes such as methylstyrene, dimethylstyrene, chlorostyrene, dichlorostyrene, bromostyrene, p-chloromethylstyrene and divinylbenzene; and also α-methylstyrene, acrylonitrile, methacrylonitrile, maleic anhydride, N-substituted maleimide, diallyl phthalate, diallyl isophthalate and diallyl terephthalate.

Examples of copolymers of diethylene glycol bis(allyl carbonate) and other monomers are mentioned in, for example, JP A 54-41965, JP A 51-125487 and JP A 01-503809.

"Resins obtained from epithio group-bearing compounds" refers herein to resins obtained by polymerizing, as the starting material, an epithio group-bearing monomer or a monomer mixture containing such a monomer. Specific examples of epithio group-bearing monomers include the following:
(i) episulfide compounds having an alicyclic skeleton, such as 1,3- and 1,4-bis(β-epithiopropylthio)cyclohexane, 1,3- and 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane and bis[4-(β-epithiopropylthio)cyclohexyl] sulfide;
(ii) episulfide compounds having an aromatic skeleton, such as 1,3- and 1,4-bis(β-epithiopropylthio)benzene, 1,3- and 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfine and 4,4-bis(β-epithiopropylthio)biphenyl;
(iii) episulfide compounds having a dithiane ring skeleton, such as 2,5-bis(β-epithiopropylthiomethyl)-1,4-dithiane, 2,5-bis(β-epithiopropylthioethylthiomethyl)-1,4-dithiane, 2,5-bis(β-epithiopropylthioethyl)-1,4-dithiane and 2,3,5-tri(β-epithiopropylthioethyl)-1,4-dithiane; and
(iv) epithio compounds having an aliphatic skeleton, such as 2-(2-β-epithiopropylthioethylthio)-1,3-bis(β-epithiopropylthio)propane, 1,2-bis[(2-β-epithiopropylthioethyl)thio]-3-(β-epithiopropylthio)propane, tetrakis(β-epithiopropylthiomethyl)methane, 1,1,1-tris(β-epithiopropylthiomethyl)propane, bis-(β-epithiopropyl) sulfide, and bis-(β-epithiopropyl) disulfide.

The use of resins obtainable from epithio group-bearing compounds as lens substrates is already known to the art. Specific examples include those disclosed in the following publications: JP A 09-071580, JP A 09-110979, JP A 09-255781, JP A 03-081320, JPA 11-140070, JPA 11-183702, JPA 11-189592, JPA 11-180977, and JPA 01-810575.

Other examples include radical polymers having a (thio) urethane structure on the molecule, such as radical polymers prepared from monomers obtained by reacting a linear alkane compound of 3 to 6 carbons having at least two mercapto groups on the molecule with a compound having at least one isocyanate group and at least one (meth)acryloyl group on the molecule. Here, (meth)acryloyl group stands for both acryloyl group and methacryloyl group.

Examples of the linear alkaline compound of 3 to 6 carbons having at least two mercapto groups on the molecule which serves as one of the starting materials in the preparation of radical polymerizable compounds having a thiourethane bond include 1,2,3-trimercaptopropane, 1,2,3-trimercaptobutane, 1,2,4-trimercaptobutane, 1,2,3,4-tetramercaptobutane, 1,2,3-trimercaptopentane, 1,2,4-trimercaptopentane, 1,2,3,4-tetramercaptopentane, 1,2,3-trimercaptohexane, 1,2,4-trimercaptohexane, 1,2,5-trimercaptohexane, 2,3,4-trimercaptohexane, 2,3,5-trimercaptohexane, 3,4,5-trimercaptohexane, 1,2,3,4-tetramercaptohexane, 1,2,3,5-tetramercaptohexane, 1,2,4,5-tetramercaptohexane, 2,3,4,5-tetramercaptohexane and 1,2,3,4,5-pentamercaptohexane. Of these, 1,2,3-trimercaptopropane is especially preferred for its ready availability and for the performance of the resulting optical material.

Examples of the compound having one isocyanate group and at least one (meth)acryloyl group which serves as the other starting material include acryloyl isocyanate, methacryloyl isocyanate, 2-isocyanatoethyl acrylate, 2-isocyanatoethyl methacrylate, 2-isocyanatopropyl acrylate and 2-isocyanatopropyl methacrylate. Of these, 2-isocyanatoethyl methacrylate is especially preferred for its ready availability and for the performance of the resulting optical material. The above are all examples of compounds having one isocyanate group and one (meth)acryloyl group, but use can also be made of compounds having two or more isocyanate group or two or more (meth)acryloyl groups.

If a compound other than the above polymerizable compounds, such as a radical-polymerizable organic monomer, is employed to suitably enhance the physical properties of the above-described organic-inorganic hybrid material for use as an optical material, one or more radical-polymerizable compound which has a radical-polymerizable group and is copolymerizable with the above compounds may be included. Illustrative examples of such radical-polymerizable compounds include methyl (meth)acrylate, ethyl (meth)acrylate, propyl (meth)acrylate, butyl (meth)acrylate, 2-ethylhexyl (meth)acrylate, benzyl (meth)acrylate, butoxyethyl (meth)acrylate, cyclohexyl (meth)acrylate, 2-hydroxyethyl (meth)acrylate, glycidyl (meth)acrylate, phenoxyethyl (meth)acrylate, ethylene glycol di(meth)acrylate, diethylene glycol di(meth)acrylate, triethylene glycol di(meth)acrylate, tetraethylene diglycol di(meth)acrylate, polyethylene glycol di(meth)acrylate, neopentyl glycol di(meth)acrylate, ethylene glycol bisglycidyl (meth)acrylate, bisphenol A di(meth) acrylate, 2,2-bis(4-(meth)acryloxydiethoxyphenyl)propane, trimethylolpropane tri(meth)acrylate, glycerol di(meth)acrylate, diallyl phthalate, diallyl terephthalate, diallyl isophthalate, diallyl carbonate, diethylene glycol bis(allyl carbonate), styrene, chlorostyrene, methylstyrene, bromostyrene, dibromostyrene, 2,5-bis(2-thia-3-butenyl)-1,4-dithiane and 2,5-bis((meth)acryloylthiomethyl)-1,4-dithiane. 2,5-bis(2-thia-3-butenyl)-1,4-dithiane are especially preferred. Here, (meth)acrylate stands for both acrylate and methacrylate, and (meth)acryloxy group stands for both acryloxy group and methacryloxy group.

When the organic monomer is a radical- or cationic-polymerizable organic monomer, the polymerization reaction is carried out by adding a known radical- or cationic-polymerization initiator. When the organic monomer is an addition-polymerizable or condensation-polymerizable organic monomer, the polymerizable reaction is carried out by adding an amine compound such as triethylenediamine, hexamethylenetetraamine, N,N-dimethyloctylamine, N,N,N',N'-tetramethyl-1,6-diaminohexane, 4,4'-trimethylenebis(1-methylpiperidine) or 1,8-diazabicyclo[5.4.0]-7-undecene; or an organic metal compound such as dimethyltin dichloride, dimethyltin bis(isooctylthioglycolate), dibutyltin dichloride, dibutyltin dilaurate, dibutyltin maleate, dibutyltin maleate polymers, dibutyltin diricinolate, dibutyltin bis(dodecylmercaptide), dibutyltin bis(isooctylthioglycolate), dioctyltin dichloride, dioctyltin maleate, dioctyltin maleate polymers, dioctyltin bis(butylmaleate), dioctyltin dilaurate, dioctyltin diricinolate, dioctyltin dioleate, dioctyltin di(6-hydroxy)caproate, dioctyltin bis(isooctylthioglycolate), didodecyltin diricinolate, copper oleate, copper acetylacetonate, iron acetylacetonate, iron naphthenate, iron lactate, iron citrate, iron gluconate, potassium octanoate and 2-ethylhexyl titanate. Of the above polyaddition or polycondensation reaction catalysts, dibutyltin dichloride and dibutyltin dilaurate are preferred. These catalysts may be used singly or as combinations of two or more thereof.

When radical photopolymerization is carried out, to enhance reactivity, a known sensitizer such as benzophenone, 4,4-diethylaminobenzophenone, 1-hydroxycyclohexyl phenyl ketone, isoamyl p-dimethylaminobenzoate, methyl 4-dimethylaminobenzoate, benzoin, benzoin ethyl ether, benzoin isobutyl ether, benzoin isopropyl ether, 2,2-diethoxyacetophenone, methyl o-benzoylbenzoate, 2-hydroxy-2-methyl-1-phenylpropane-1-one or acylphosphine oxide may be added to increase the reactivity.

The above polymerization reaction can be carried out either as solution polymerization or bulk polymerization. Polymerization can be carried out by subjecting a mixture of the organic components and the inorganic components to heat or to irradiation with light.

Exemplary methods for preparing the organic-inorganic hybrid material include:
(1) mixing a organic polymer with the inventive dispersoid having metal-oxygen bonds prepared from a metal compound such as a metal alkoxide, in an organic solvent or in bulk, then shaping;
(2) preparing the inventive dispersoid having metal-oxygen bonds from a metal compound such as a metal alkoxide in an organic solvent, then adding an organic monomer, carrying out solution polymerization or bulk polymerization, and shaping;
(3) mixing a metal compound such as a metal alkoxide and an organic monomer in an organic solvent, adding water and hydrolyzing to form a mixture of the organic monomer and the inventive dispersoid having metal-oxygen bonds, then carrying out solution polymerization or bulk polymerization, and shaping;
(4) mixing an organic polymer and a metal compound such as a metal alkoxide in an organic solvent, adding water and hydrolyzing, then shaping;
(5) adding an organic solvent containing an organic polymer in a dropwise manner to, and mixing with, an organic solvent containing the inventive dispersoid having metal-oxygen bonds prepared from a metal compound such as a metal alkoxide, then shaping;
(6) preparing an oligomer from an organic monomer, mixing the oligomer with the inventive dispersoid having metal-oxygen bonds prepared beforehand from a metal compound such as a metal alkoxide, then solution polymerizing or bulk polymerizing, and shaping.

Methods (2), (3) and (6) are especially preferred.

If a polycondensation product is used as the organic polymer or a water-unstable organic monomer is used, following preparation of the dispersoid having metal-oxygen bonds, it is preferable to add an organic polymer or an organic monomer.

The organic-inorganic hybrid material of the invention has a high refractive index and a high transmittance to visible light, and so is preferably used as an optical material. To this optical material may be suitably added, if desired, ultraviolet absorbers, dyes and pigments to improve the light absorbing properties, antioxidants and discoloration inhibitors to improve weather resistance, and parting agents to improve moldability. Exemplary ultraviolet absorbers include benzotriazole, benzophenone and salicylic acid compounds. Exemplary dyes and pigments include anthraquinone and azo compounds. Exemplary antioxidants and discoloration inhibitors include monophenol, bisphenol, polymeric phenol, sulfur-bearing compounds and phosphorus-bearing compounds. Exemplary parting agents include fluorinated surfactants, silicone surfactants, acid phosphoric ester and higher fatty acids.

The method of producing the optical material of the invention typically involves preparing a uniform mixture composed of, for example, the metal-oxygen bond-bearing dispersoid, the organic monomer, a monomer copolymerizable with the organic monomer, additives and a catalyst. If the monomer is a radical-polymerizable monomer, a known cast polymerization process may be used in which the mixture is poured into a mold consisting of the combination of a mold body made of glass or resin, that has transmits ultraviolet light, and a resin gasket, then is irradiated with ultraviolet light to effect curing. If the monomer is an addition-polymerizable or condensation-polymerizable monomer, the mixture may be heated and cured. To facilitate removal of the molded resin, the mold may be treated beforehand with a parting agent or a parting agent may be included in the uniform mixture. Following exposure to ultraviolet light, it is advantageous to also carry out heating so as to bring polymerization to completion or to ease stresses that arise at the interior of the material. The heating temperature and time will vary according to such factors as the amount of ultraviolet irradiation energy, but are generally 30 to 150° C. and 0.2 to 24 hours. When cast polymerization with heating is carried out, it is preferable to set the initial temperature in a relatively low temperature range of 5 to 40° C. and gradually raise the temperature over 10 to 70 hours to a high temperature of 100 to 130° C. Optical materials obtained by production methods such as (1) and (4) above in which preparation of the organic polymer has already been finished can be shaped by, for example, casting the solution in a mold. The optical material of the invention can easily be dyed in water or an organic solvent using a conventional disperse dye. To facilitate dyeing at this time, a carrier may be added and heating carried out.

The present invention also provides optical products made of optical materials obtained as just described. Illustrative, non-limiting examples of these optical products include plastic optical lenses such as eyeglass lenses, prisms, optical fibers, substrates for recording media, filters, and drinking glasses and vases. Of these, plastic optical lenses, and particularly eyeglass lenses, are preferred.

Instead of being cast polymerized, the optical material of the invention can be coated onto the surface of a lens or drinking glass, for example, and cured if necessary by carrying out an operation such as light exposure, enabling it to be used as a starting material for a hard coating that protects the surface or for a multilayer antireflection coating that prevents reflection. Illustrative, non-limiting examples of coating methods that may be used include dip coating, spin coating, flow coating, roller coating and brush coating.

(VIII) Monomolecular Film

The method of making the monomolecular film of the invention is characterized by contacting a metallic surfactant having at least one hydrolyzable group with a metal oxide film according to the invention.

The metallic surfactant having at least one hydrolyzable group is not subject to any particular limitation, provided it has a hydrolyzable functional group, can react through the functional group with an active hydrogen on the substrate surface to form a bond, and can have on the same molecule both a hydrophilic site capable of forming the bond and a hydrophobic site. Preferred examples include compounds of formula (II).

In formula (II), $R^1$ is a monovalent hydrocarbon group, a monovalent hydrocarbon group having a substituent, a monovalent halogenated hydrocarbon group, a monovalent halogenated hydrocarbon group having a substituent, a monovalent hydrocarbon group which includes a linkage or a monovalent halogenated hydrocarbon group which includes a linkage; if the letter n is 2 or more, each $R^1$ may be like or unlike.

When $R^1$ is a monovalent hydrocarbon group, alkyl groups of 1 to 30 carbons, alkenyl groups of 1 to 30 carbons, and aryl groups are preferred. When $R^1$ is a monovalent halogenated hydrocarbon group, "group" here refers to a group in which one or more hydrogen atom on the hydrocarbon group has been substituted with a halogen atom; groups in which two or more hydrogen atoms on an alkyl group have been substituted with halogen atoms are preferred. Suitable halogen atoms include fluorine atoms, chlorine atoms and bromine atoms. Fluorine atoms are preferred.

When $R^1$ is a fluorinated alkyl group, a linear or branched structure is preferred. If the structure is branched, the branched portion preferably is a short chain of about 1 to 4 carbons. When $R^1$ is a fluorinated alkyl group, the terminal carbon atom is preferably a group having one or more fluorine atoms bonded thereto; a group having a $CF_3$ moiety composed of three fluorine atoms bonded to a terminal carbon atom is especially preferred. However, the carbon chain may instead be one which is terminated with a fluorine-unsubstituted hydrocarbon group and is substituted with fluorine at the interior thereof.

The number of fluorine atoms on the fluorinated alkyl group, expressed as [(number of fluorine atoms on fluorinated alkyl group)/(number of hydrogen atoms on alkyl group of same number of carbons as fluorinated alkyl group)×100]%, is preferably at least 60%, and more preferably at least 80%. Moreover, the fluorinated alkyl group is preferably a group terminated with a perfluoroalkyl moiety, which is an alkyl group in which all the hydrogen atoms have been substituted with fluorine atoms, and having, between the perfluoroalkyl moiety and the metal atom, a $(CH_2)_h$—(where the letter h is an integer from 1 to 6, and preferably 2 to 4) group. These preferences similarly apply when $R^1$ is a monovalent halogenated hydrocarbon group having a substituent or a linkage.

When $R^1$ is a monovalent hydrocarbon group having a substituent, this refers to a group in which a hydrogen atom on the monovalent hydrocarbon group is substituted with a substituent. When $R^1$ is a monovalent halogenated hydrocarbon group having a substituent, this refers to a group in which a hydrogen atom or halogen atom on the monovalent halogenated hydrocarbon group is substituted with a substituent. Illustrative examples of the substituent in these groups include carboxyl, amide, imide, ester and hydroxyl groups. The number of substituents on these groups is preferably from 1 to 3.

When $R^1$ is a monovalent hydrocarbon group having a linkage or a monovalent halogenated hydrocarbon group having a linkage, $R^1$ is exemplified by monovalent hydrocarbon or monovalent halogenated hydrocarbon groups having a linkage between carbon-carbon bonds, and monovalent hydrocarbon or monovalent halogenated hydrocarbon groups having a linkage bonded to the end of the group that bonds to the metal atom. Preferred linkages include —O—, —S—, —COO— and —CONR$_{21}$— (wherein $R_{21}$ is a hydrogen atom or an alkyl group).

Of these, for good water repellent and durability, $R^1$ is preferably methyl, a fluoroalkyl group, or a fluoroalkyl group having a linkage. Specific examples in which $R^1$ is a fluorinated alkyl group or a fluorinated alkyl group having a linkage include the following:

$CF_3$—,
$CF_3CF_2$—,
$(CF_3)_2CF$—,
$(CF_3)_3C$—,
$CF_3(CH_2)_2$—,
$CF_3(CF_2)_3(CH_2)_2$—,
$CF_3(CF_2)_5(CH_2)_2$—,
$CF_3(CF_2)_7(CH_2)_2$—,
$CF_3(CF_2)_3(CH_2)_3$—,
$CF_3(CF_2)_5(CH_2)_3$—,
$CF_3(CF_2)_7(CH_2)_3$—,
$CF_3(CF_2)_4O(CF_2)_2(CH_2)_2$—,
$CF_3(CF_2)_4O(CF_2)_2(CH_2)_3$—,
$CF_3(CF_2)_7O(CF_2)_2(CH_2)_2$—,
$CF_3(CF_2)_7CONH(CH_2)_2$—,
$CF_3(CF_2)_7CONH(CH_2)_3$—,
$CF_3(CF_2)_3O[CF(CF_3)CF(CF_3)O]_2CF(CF_3)CO$—,
$NH(CH_2)_3$—,
$CH_3(CF_2)_7(CH_2)_2$—,
$CH_3(CF_2)_8(CH_2)_2$—,
$CH_3(CF_2)_9(CH_2)_2$—,
$CH_3(CF_2)_{10}(CH_2)_2$—,
$CH_3(CF_2)_{11}(CH_2)_2$—,
$CH_3(CF_2)_{12}(CH_2)_2$—,
$CH_3(CF_2)_7(CH_2)_3$—,
$CH_3(CF_2)_9(CH_2)_3$—,
$CH_3(CF_2)_{11}(CH_2)_3$—,
$CH_3CH_2(CF_2)_6(CH_2)_2$—,
$CH_3CH_2(CF_2)_8(CH_2)_2$—,
$CH_3CH_2(CF_2)_{10}(CH_2)_2$—,
$CH_3(CF_2)_4O(CF_2)_2(CH_2)_2$—,
$CH_3(CF_2)_7(CF_2)_2O(CH_2)_3$—,
$CH_3(CF_2)_8(CF_2)_2O(CH_2)_3$—,
$CH_3(CF_2)_9(CF_2)_2O(CH_2)_3$—,
$CH_3CH_2(CF_2)_6(CH_2)_2O(CH_2)_3$—,
$CH_3(CF_2)_6CONH(CH_2)_3$—,
$CH_3(CF_2)_8CONH(CH_2)_3$—,
$CH_3(CF_2)_3O[CF(CF_3)CF(CF)_3O]_2CF(CF_3)CO$—,
$NH(CH_2)_m$—,

Y in formula (II) represents a hydrolyzable group, specific examples of which include alkoxy groups of 1 to 6 carbons, acyloxy groups of 1 to 6 carbons, halogen atoms, isocyanate groups, amino groups and amide groups. When (m-n) is 2 or more, each Y may be like or unlike. Alkoxy groups of 1 to 6 carbons that may be substituted, halogen atoms and isocyanate groups are especially preferred. Also, as noted earlier, given that hydrolyzable groups are functional groups which are capable of incurring hydrolysis and forming a bond with another functional group having an active hydrogen, for the sake of convenience, in this specification, the hydroxyl group is included among the hydrolyzable groups.

The letter n in formula (II) is any integer from 1 to (m-1). To produce a high-density chemisorption film, it is preferable for the letter n to be 1. M represents an atom selected from the group consisting of silicon, germanium, tin, titanium and zirconium atoms. For such reasons as the availability of starting materials and reactivity, a silicon atom is preferred.

Of the compounds of formula (II), compounds of formula (III) are preferred. In compound (II), $R^2$ represents an alkylene group, a vinylene group, an ethynylene group, an arylene group or a divalent functional group containing a silicone atom and/or an oxygen atom.

In the above formula, the letters a and b each represent any integer greater than or equal to 1.

In formula (III), Z is a hydrogen atom, an alkyl group or a fluoroalkyl group, and the letter r is 0 or any integer from 1 to (m-2). To produce a high-density adsorption film, it is preferable for the letter r to be 0.

Aside from compounds of formula (III), compounds of formula (II) also include:

$$CH_3-(CH_2)_g-MZ_rY_{m-r-1} \quad (1)$$

$$CH_3-(CH_2)_s-O-(CH_2)_t-MZ_rY_{m-r-1} \quad (2)$$

$$CH_3-(CH_2)_u-Si(CH_3)_2-(CH_2)_v-MZ_rY_{m-r-1} \quad (3)$$

$$CF_3COO-(CH_2)_w-MZ_rY_{m-r-1} \quad (4)$$

In the formulas, the letters g, s, u, v and w each represent any integer. Preferred ranges are 1 to 25 for g, 0 to 12 for s, 1 to 20 for t, 0 to 12 for u, 1 to 20 for v, and 1 to 25 for w. In addition, Z, Y, r and m have the same meanings as in formula (III).

Specific examples of the compound of formula (II) include the compounds of the following formulas in which the metal atom is a silicon atom. The hydrolyzable groups are not limited to the functional groups shown in the examples; other hydrolyzable groups may likewise be used.

$CH_3CH_2O(CH_2)_{15}Si(OCH_3)_3$,
$CF_3CH_2O(CH_2)_{15}Si(OCH_3)_3$,
$CH_3(CH_2)_2Si(CH_3)_2(CH_2)_{15}Si(OCH_3)_3$,
$CH_3(CH_2)_6Si(CH_3)_2(CH_2)_9Si(OCH_3)_3$,
$CH_3COO(CH_2)_{15}Si(OCH_3)_3$,
$CF_3(CF_2)_5(CH_2)_2Si(OCH_3)_3$,
$CF_3(CF_2)_7-(CH=CH)_3-Si(OCH_3)_3$,
$CH_3CH_2O(CH_2)_{15}Si(OC_2H_5)_3$,
$CH_3(CH_2)_2Si(CH_3)_2(CH_2)_{15}Si(OC_2H_5)_3$,
$CH_3(CH_2)_6Si(CH_3)_2(CH_2)_9Si(OC_2H_5)_3$,
$CF_3(CH_2)_6Si(CH_3)_2(CH_2)_9Si(OC_2H_5)_3$,
$CH_3COO(CH_2)_{15}Si(OC_2H_5)_3$,
$CF_3COO(CH_2)_{15}Si(OC_2H_5)_3$,
$CF_3COO(CH_2)_{15}Si(OCH_3)_3$,
$CF_3(CF_2)_9(CH_2)_2Si(OC_2H_5)_3$,
$CF_3(CF_2)_7(CH_2)_2Si(OC_2H_5)_3$,
$CF_3(CF_2)_5(CH_2)_2Si(OC_2H_5)_3$,
$CF_3(CF_2)_7(CH=CH)_3Si(OC_2H_5)_3$,
$CF_3(CF_2)_9(CH_2)_2Si(OCH_3)_3$,
$CF_3(CF_2)_5(CH_2)_2Si(OCH_3)_3$,
$CF_3(CF_2)_7(CH_2)_2Si(CH_3)(OC_2H_5)_2$,
$CF_3(CF_2)_7(CH_2)_2Si(CH_3)(OCH_3)_2$,
$CF_3(CF_2)_7(CH_2)_2Si(CH_3)_2(OC_2H_5)$,
$CF_3(CF_2)_7(CH_2)_2Si(CH_3)_2(OCH_3)$,
$CF_3(CH_2)_2SiCl_3$,
$CF_3(CF_2)_3(CH_2)_2SiCl_3$,
$CF_3(CF_2)_5(CH_2)_2SiCl_3$,
$CF_3(CF_2)_7(CH_2)_2SiCl_3$,
$CF_3(CF_2)_3(CH_2)_3SiCl_3$,
$CF_3(CF_2)_5(CH_2)_3SiCl_3$,
$CF_3(CF_2)_7(CH_2)_3SiCl_3$,
$CF_3(CF_2)_4O(CF_2)_2(CH_2)_2SiCl_3$
$CF_3(CF_2)_4O(CF_2)_2(CH_2)_3SiCl_3$
$CF_3(CF_2)_7(CH_2)_2O(CH_2)_3SiCl_3$
$CF_3(CF_2)_7CONH(CH_2)_2SiCl_3$
$CF_3(CF_2)_7CONH(CH_2)_3SiCl_3$
$CF_3(CF_2)_3O[CF(CF_3)CF(CF_3)O]_2CF(CF_3)CONH(CH_2)_3SiCl_3$
$CF_3(CF_2)_3(CH_2)_2Si(CH_3)Cl_2$
$CF_3(CF_2)_5(CH_2)_2Si(CH_3)Cl_2$
$CF_3(CH_2)_2Si(CH_3)Cl_2$
$CF_3(CF_2)_3(CH_2)_3Si(CH_3)Cl_2$
$CF_3(CF_2)_5(CH_2)_3Si(CH_3)Cl_2$
$CF_3(CF_2)_7(CH_2)_3Si(CH_3)Cl_2$
$CF_3(CF_2)_4(CF_2)_2(CH_2)_2Si(CH_3)Cl_2$
$CF_3(CF_2)_4(CF_2)_2(CH_2)_3Si(CH_3)Cl_2$
$CF_3(CF_2)_4(CH_2)_2O(CH_2)_3Si(CH_3)Cl_2$
$CF_3(CF_2)_7CONH(CH_2)_2Si(CH_3)Cl_2$
$CF_3(CF_2)_7CONH(CH_2)_3Si(CH_3)Cl_2$
$CF_3(CF_2)_3O[CF(CF_3)CF(CF_3)O]_2CF(CF_3)CONH(CH_2)_3Si(CH_3)Cl_2$
$CH_3(CH_2)_7SiCl_3$
$CH_3(CF_2)_7(CH_2)_2SiCl_3$
$CH_3(CF_2)_7(CH_2)_2Si(CH_3)Cl_2$
$CH_3(CF_2)_7(CH_2)_2Si(OCH_3)_3$
$CH_3(CF_2)_7(CH_2)_2Si(NCO)_3$
$CH_3(CF_2)_8(CH_2)_2SiCl_3$
$CH_3(CF_2)_8(CH_2)_2Si(OCH_3)_3$
$CH_3(CF_2)_8(CH_2)_2Si(NCO)_3$
$CH_3(CF_2)_9(CH_2)_2SiCl_3$
$CH_3(CF_2)_9(CH_2)_2Si(OCH_3)_3$
$CH_3(CF_2)_9(CH_2)_2Si(NCO)_3$
$CH_3CH_2(CF_2)_6(CH_2)_2SiCl_3$
$CH_3CH_2(CF_2)_6(CH_2)_2Si(OCH_3)_3$
$CH_3CH_2(CF_2)_6(CH_2)_2Si(NCO)_3$
$CH_3CH_2(CF_2)_8(CH_2)_2SiCl_3$
$CH_3CH_2(CF_2)_8(CH_2)_2Si(OCH_3)_3$
$CH_3CH_2(CF_2)_8(CH_2)_2Si(NCO)_3$
$CH_3CH_2(CF_2)_{10}(CH_2)_2SiCl_3$
$CH_3(CF_2)_{40}(CF_2)_2(CH_2)_2SiCl_3$
$CH_3(CF_2)_7(CH_2)_2O(CH_2)_3SiCl_3$
$CH_3(CF_2)_8(CH_2)_2O(CH_2)_3SiCl_3$
$CH_3(CF_2)_9(CH_2)_2O(CH_2)_3SiCl_3$
$CH_3CH_2(CF_2)_6(CH_2)_2O(CH_2)_3SiCl_3$
$CH_3(CF_2)_6CONH(CH_2)_3SiCl_3$
$CH_3(CF_2)_8CONH(CH_2)_3SiCl_3$
$CH_3(CF_2)_3O[CF(CF_3)CF(CF_3)O]_2CF(CF_3)CONH(CH_2)_3SiCl_3$

The above-described metallic surfactant may be used singly or as combinations of two or more thereof. Generally, it is used after dilution with a solvent. If necessary, it may be used together with water in an organic solvent and in the presence of a metal oxide or metal alkoxide partial hydrolysate.

In the method of producing the monomolecular film of the invention, the following steps are preferably carried out in order:

(i) coating or spraying a solution containing the dispersoid onto a substrate, and drying to form a metal oxide film; and (ii) bringing a solution of the metallic surfactant into contact with the substrate on which the metal oxide film has been formed, and drying.

In above step (i), the method of coating or spraying the metal oxide-containing solution onto the substrate is not subject to any particular limitation, so long as it can smoothly apply the solution to the surface. Examples of suitable methods include dipping, spin coating, Meyer bar coating and brush coating.

In above step (ii), any method of bringing the metallic surfactant into contact with the substrate may be used without particular limitation, although dipping is preferred for forming a uniform monomolecular film.

In the practice of the invention, the content of the metallic surfactant within the solution is not subject to any particular limitation, although a silane compound solution in a range of 0.1 to 30 wt % is preferable for producing a dense monomolecular film.

Plastic substrates that may be used in the invention include sheet, plate-like substrates and films, with films being especially preferred. Specific examples include cellulose triacetate, cellulose diacetate, nitrocellulose, polystyrene, polyethylene terephthalate, polyethylene naphthalate, syndiotactic polystyrene, polyethylene-coated paper, polyether sulfone, polyarylate, polyvinylidene fluoride and Teflon (registered trademark).

No particular limitation is imposed on the size or shape of the substrate; for example, the substrate may be a flat plate, a three-dimensional object or a film. Even a painted object may be used. These substrates may be provided with a polyvinylidene chloride-type polymer-containing waterproofing layer so as to enhance dimensional stability; i.e., the stability to dimensional changes from changes in temperature and humidity. In addition, an organic and/or inorganic compound thin film may be provided as a gas barrier. Illustrative examples of organic thin films include polyvinyl alcohol, and poly(ethylene-co-vinyl alcohol). Illustrative examples of inorganic compounds include silica, alumina, talc, vermiculite, kaolinite, mica and synthetic mica. Various organic and/or inorganic additives may also included in the substrate to confer other capabilities as well.

BRIEF DESCRIPTION OF THE DIAGRAMS

FIG. 12 shows the particle size distribution of the sol solution obtained in Example 45.

FIG. 13 shows the particle size distribution of the sol solution obtained in Example 47.

BEST MODE FOR CARRYING OUT THE INVENTION

The invention is described more fully below by way of examples, although the examples are not intended to limit the invention.

Measurements of particle size distribution and light transmittance were carried out using the following equipment.

Particle size distribution: dynamic light scattering photometer (DLS-7000: dynamic light scattering measurement; argon laser, 75 mW; manufactured by Otsuka Electric Co., Ltd.)

Light transmittance: self-recording spectrophotometer (U-4000; manufactured by Hitachi, Ltd.)

EXAMPLE 1

First, 7.87 g (27.7 mmol) of titanium tetraisopropoxide (A-1, produced by Nippon Soda Co., Ltd.; 99.9% purity; titanium oxide equivalent concentration, 28 wt %) was dissolved in tetrahydrofuran within a four-neck flask. The flask was flushed with nitrogen, then cooled in a dry ice-containing methanol bath (approx. —74° C.). After about 20 minutes of cooling, 0.8 g (44.4 mmol) of distilled water diluted with tetrahydrofuran was added under stirring. The total weight of the tetrahydrofuran solution at this time was 32.12 g. The amount of water added at this time, expressed as a molar ratio with the titanium, was $H_2O/Ti=1.6$. The system was then gradually returned to room temperature, yielding a clear, light yellow tetrahydrofuran solution of titanium isopropoxide hydrolysate. The appearance at this time of the tetrahydrofuran solution obtained is indicated in Table 1. This solution had a visible light transmittance (550 nm) of 87%.

Figure 1:
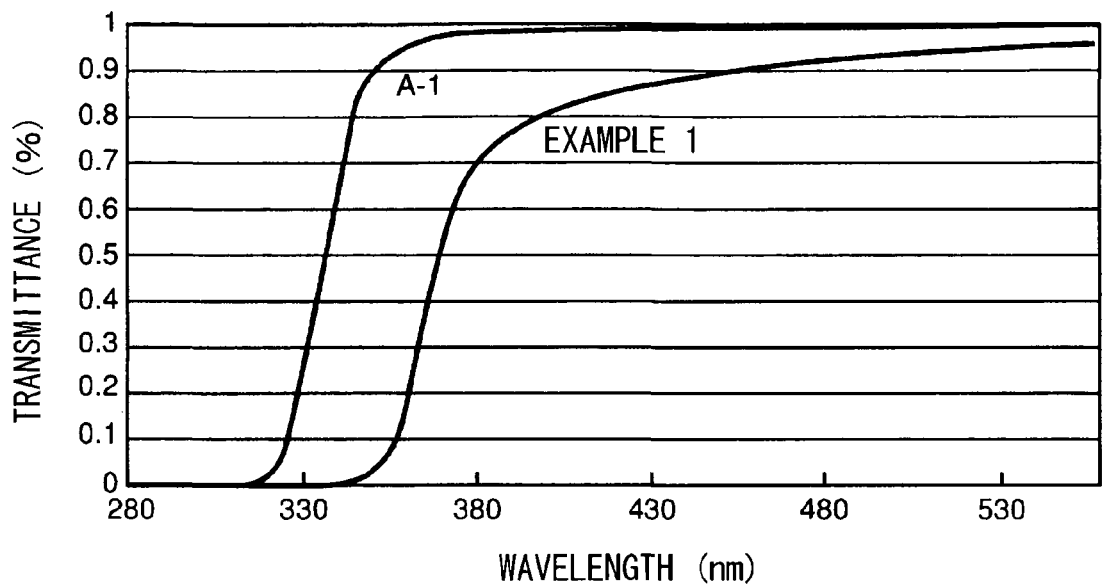
FIG. 1 is shows the UV properties of the titanium alkoxide low-temperature hydrolysate prepared in Example 1.

The UV properties of the solution prepared as described above are shown in FIG. 1. FIG. 1 also shows the UV properties of the titanium tetraisopropoxide. On comparing both results, the low-temperature hydrolysate had a better ability to block UV radiation than the titanium tetraisopropoxide, indicating the growth of Ti—O—Ti bonds.

COMPARATIVE EXAMPLE 1

Aside from changing the weight of the distilled water added to 1.0 g (55.6 mmol), the same procedure was carried out as in Example 1. The appearance at this time of the resulting tetrahydrofuran solution is indicated in Table 1.

COMPARATIVE EXAMPLE 2

Aside from changing the weight of the distilled water added to 1.2 g (66.7 mmol), the same procedure was carried out as in Example 1. The appearance at this time of the resulting tetrahydrofuran solution is indicated in Table 1.

EXAMPLE 2

The tetrahydrofuran solution obtained in Example 1 was vacuum concentrated with a rotary evaporator at a bath temperature of 50° C., giving a clear, light yellow viscous liquid having a titanium oxide equivalent concentration of 40.2 wt %. When tetrahydrofuran solvent was added to this liquid, it re-dissolved.

TABLE 1

| | (Distilled water)/ (Titanium tetraisopropoxide) (molar ratio) | $TiO_2$ equivalent concentration (wt %) | Appearance at time of water mixture | Appearance of sol obtained |
|---|---|---|---|---|
| EX 1 | 1.6 | 5.4 | clear, light yellow | clear, light yellow |
| EX 2 | 1.6 | 40.2 | — | clear, light yellow |
| CE 1 | 2.0 | 5.4 | clear, light yellow | cloudy gel |
| CE 2 | 2.4 | 5.4 | clear, light yellow | cloudy gel |

EXAMPLE 3

First, 12.4 g of titanium tetraisopropoxide (A-1, produced by Nippon Soda Co., Ltd.; 99% purity; titanium oxide equivalent concentration, 28.2 wt %) was dissolved in 45.0 g of toluene within a four-neck flask. The flask was flushed with nitrogen, then cooled to −80° C. in an ethanol/liquid nitrogen bath. In a separate procedure, 1.26 g of ion-exchanged water (molar ratio $H_2O/Ti=1.6$) was mixed into 11.3 g of isopropanol, following which the mixture was cooled to −80 to −70° C. and added dropwise in this cooled state to the four-neck flask under stirring, thereby carrying out hydrolysis. During dropwise addition, the liquid temperature within the flask was maintained at −80 to −70° C. After the end of dropwise addition, mixing was continued for 30 minutes under cooling, then the temperature was raised to room temperature under stirring and hydrolysis was carried out, yielding a clear, colorless sol having a titanium oxide equivalent concentration of 5 wt %. The appearance at this time of the toluene/isopropanol mixed solution obtained is indicated in Table 2. This solution had a visible light transmittance (550 nm) of 85%.

Figure 2:
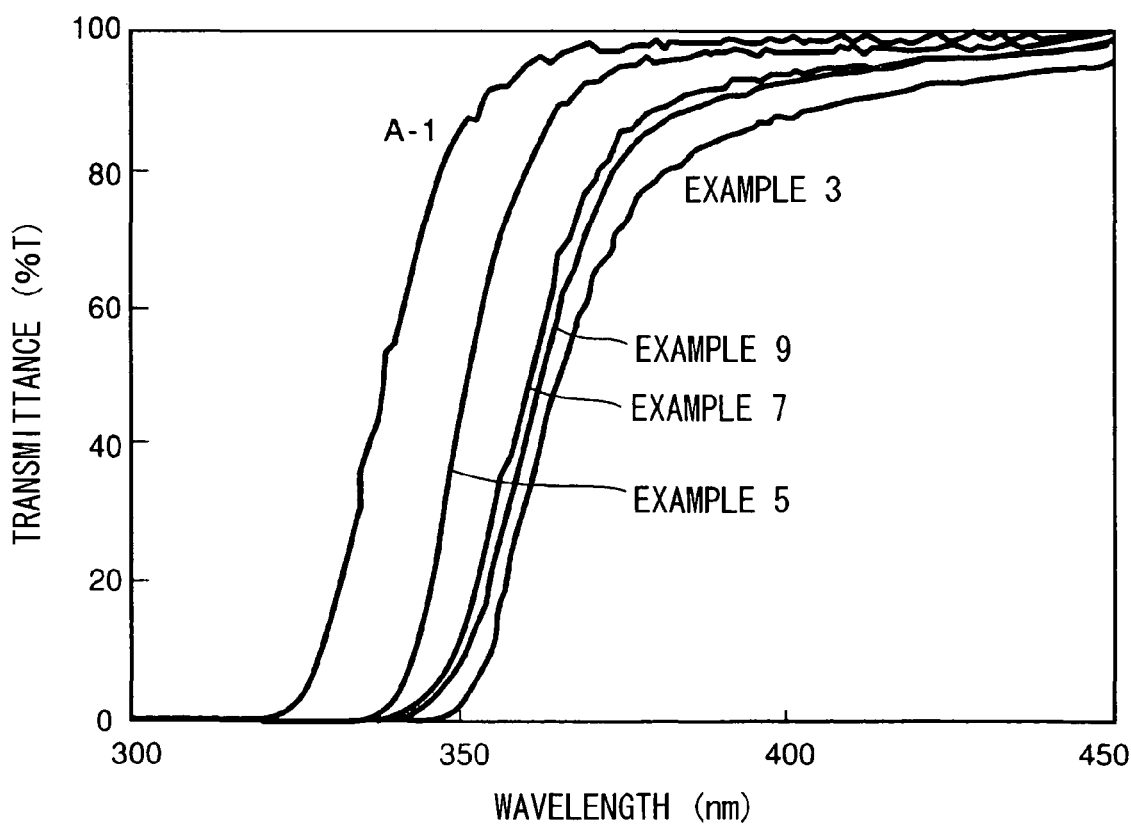
FIG. 2 is shows the UV properties of the titanium alkoxide low-temperature hydrolysates prepared in Examples 3, 5, 7 and 9.

The UV properties of the solution prepared as described above are shown in FIG. 2.

EXAMPLE 4

Figure 3:
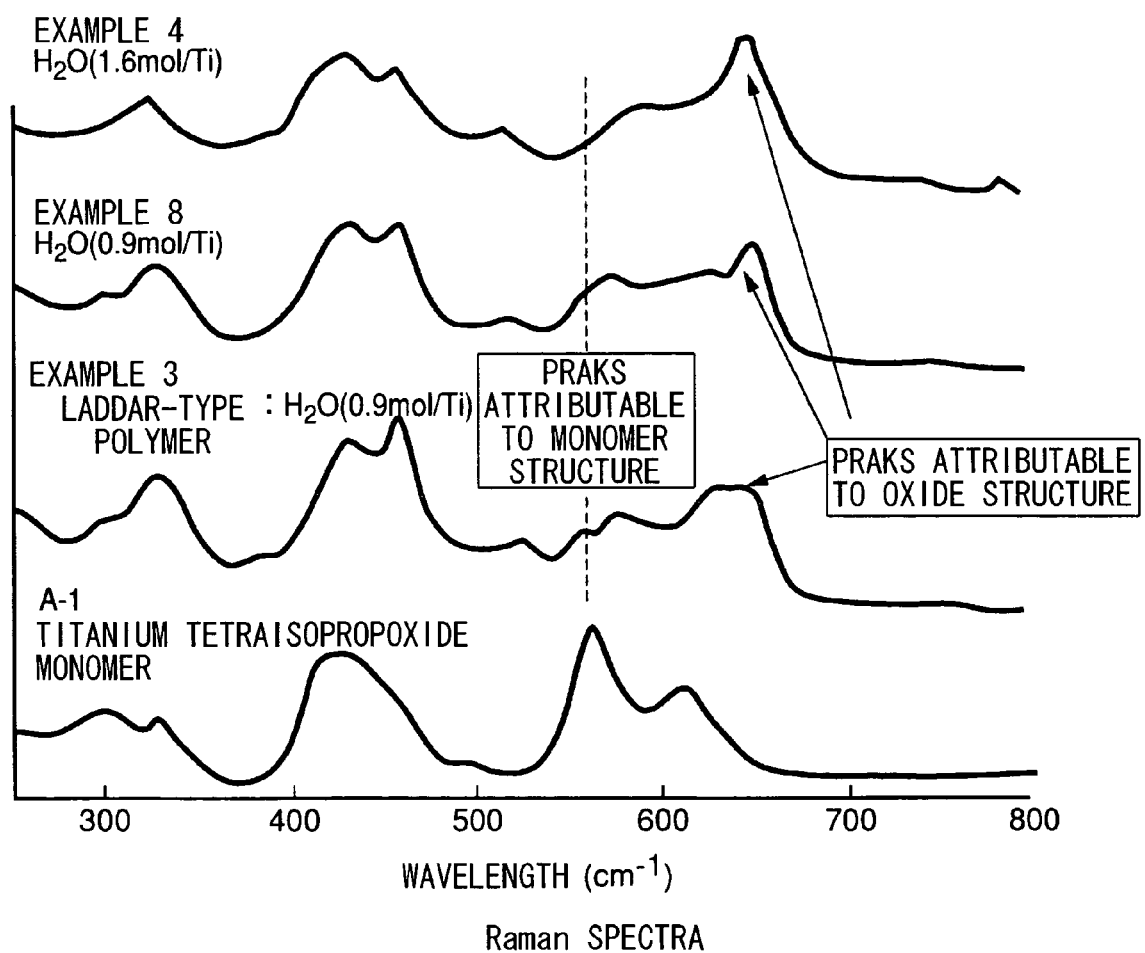
FIG. 3 shows the Raman spectra for the solutions prepared in Examples 4 and 8 and Comparative 3.

The solution obtained in Example 3 was concentrated with a rotary evaporator at a bath temperature of 50° C., giving a viscous liquid having a titanium oxide equivalent concentration of 54.3 wt %. The Raman spectrum of the solution thus obtained is shown in FIG. 3. When toluene solvent was added to this liquid, re-dissolution occurred. The appearance at this time of the toluene-isopropanol mixed solution obtained at this time is indicated in Table 2.

EXAMPLE 5

First, 35.4 g of titanium tetraisopropoxide (A-1, produced by Nippon Soda Co., Ltd.; 99% purity; titanium oxide equivalent concentration, 28.2 wt %) was dissolved in 152.2 g of toluene within a four-neck flask. The flask was flushed with nitrogen, then cooled to −25° C. in an ethanol/liquid nitrogen bath. In a separate procedure, 1.24 g of ion-exchanged water (molar ratio $H_2O/Ti=0.55$) was mixed into 11.2 g of isopropanol, following which the mixture was cooled to −25° C. and added dropwise in this cooled state to the four-neck flask under stirring. After the end of dropwise addition, the temperature was held at the same level for 30 minutes, then raised to room temperature under stirring and hydrolysis was carried out, yielding a clear, colorless sol having a titanium oxide equivalent concentration of 5 wt %. This solution had a visible light transmittance (550 nm) of 95%. The UV properties of the solution prepared as described above are shown in FIG. 2.

EXAMPLE 6

The solution obtained in Example 5 was concentrated with a rotary evaporator at a bath temperature of 50° C., giving a viscous liquid having a titanium oxide equivalent concentration of 41.1 wt %. Toluene solvent was added to this liquid, whereupon re-dissolution occurred. The appearance at this time of the toluene-isopropanol mixed solution obtained is indicated in Table 2.

EXAMPLE 7

First, 35.4 g of titanium tetraisopropoxide (A-1, produced by Nippon Soda Co., Ltd.; 99% purity; titanium oxide equivalent concentration, 28.2 wt %) was dissolved in 144 g of toluene within a four-neck flask. The flask was flushed with nitrogen, then cooled to −25° C. in an ethanol/liquid nitrogen bath. In a separate procedure, 2.04 g of ion-exchanged water (molar ratio $H_2O/Ti=0.9$) was mixed into 18.3 g of isopropanol, following which the mixture was cooled to −25° C. and added dropwise in this cooled state to the four-neck flask under stirring. After the end of dropwise addition, the temperature was held at the same level for 30 minutes, then raised to room temperature under stirring and hydrolysis was carried out, yielding a clear, colorless sol having a titanium oxide equivalent concentration of 5 wt %. This solution had a visible light transmittance (550 nm) of 92%. The UV properties of the solution prepared as described above are shown in FIG. 2.

EXAMPLE 8

The solution obtained in Example 7 was concentrated with a rotary evaporator at a bath temperature of 50° C., giving a viscous liquid having a titanium oxide equivalent concentration of 45.7 wt %. Toluene solvent was added to this liquid, whereupon re-dissolution occurred. The appearance at this time of the toluene-isopropanol mixed solution obtained is indicated in Table 2.

EXAMPLE 9

First, 17.7 g of titanium tetraisopropoxide (A-1, produced by Nippon Soda Co., Ltd.; 99% purity; titanium oxide equivalent concentration, 28.2 wt %) was dissolved in 68.7 g of toluene within a four-neck flask. The flask was flushed with nitrogen, then cooled to −70° C. in an ethanol/liquid nitrogen bath. In a separate procedure, 1.36 g of ion-exchanged water (molar ratio $H_2O/Ti=1.2$) was mixed into 12.2 g of isopropanol, following which the mixture was cooled to −70° C. and added dropwise in this cooled state to the four-neck flask under stirring. After the end of dropwise addition, the temperature was held at the same level for 30 minutes, then raised to room temperature under stirring and hydrolysis was carried out, yielding a clear, colorless sol having a titanium oxide equivalent concentration of 5 wt %. This solution had a visible light transmittance (550 nm) of 93%. The Raman spectrum of the liquid thus obtained is shown in FIG. 3. The UV properties of the solution prepared as described above are shown in FIG. 2.

EXAMPLE 10

The solution obtained in Example 9 was concentrated with a rotary evaporator at a bath temperature of 50° C., giving a viscous liquid having a titanium oxide equivalent concentration of 50.8 wt %. Toluene solvent was added to this liquid, whereupon re-dissolution occurred. The appearance at this time of the toluene-isopropanol mixed solution obtained is indicated in Table 2.

COMPARATIVE EXAMPLE 3

First, 35.4 g of titanium tetraisopropoxide (A-1, produced by Nippon Soda Co., Ltd.; 99% purity; titanium oxide equivalent concentration, 28.2 wt %) was dissolved in 144 g of toluene within a four-neck flask. The flask was flushed with nitrogen, then warmed to and held at 80 to 90° C. in an oil bath. In a separate procedure, 2.04 g of ion-exchanged water (molar ratio $H_2O/Ti=0.9$) was mixed into 18.3 g of isopropanol, following which the mixture was added dropwise to the four-neck flask under stirring, thereby carrying out hydrolysis. Following the completion of dropwise addition, heating and refluxing was carried out at 90 to 100° C. for 30 minutes. Next, the flask contents were cooled to room temperature under stirring, yielding a clear, light yellow sol having a titanium oxide equivalent concentration of 5 wt %. This solution had a visible light transmittance (550 nm) of 75%.

TABLE 2

| | (Distilled water)/ (Titanium tetraisopropoxide) (molar ratio) | $TiO_2$ equivalent concentration (wt %) | Appearance at time of water mixture | Appearance of sol obtained |
| --- | --- | --- | --- | --- |
| EX 3 | 1.6 | 5.01 | clear, light yellow | clear, light yellow |
| EX 4 | 1.6 | 54.3 | — | clear, light yellow |
| EX 5 | 0.55 | 5.00 | clear, colorless | clear, colorless |
| EX 6 | 0.55 | 41.1 | — | clear, colorless |
| EX 7 | 0.9 | 4.98 | clear, colorless | clear, colorless |
| EX 8 | 0.9 | 45.7 | — | clear, colorless |
| EX 9 | 1.2 | 5.01 | clear, colorless | clear, colorless |
| EX 10 | 1.2 | 50.8 | — | clear, colorless |
| CE 3 | 0.9 | 4.95 | clear, light yellow | clear, light yellow |

EXAMPLE 11

First, 10.8 g of zirconium tetra-n-butoxide (TBZR, produced by Nippon Soda Co., Ltd.; 87% purity; zirconium oxide equivalent concentration, 32.2 wt %) was dissolved in 46.9 g of toluene within a four-neck flask. The flask was flushed with nitrogen, then cooled to −80° C. in an ethanol/liquid nitrogen bath. In a separate procedure, 0.812 g of ion-exchanged water (molar ratio $H_2O/Zr=1.6$) was mixed into 7.30 g of 2-butanol, following which the mixture was cooled to −80 to −70° C. and added dropwise in this cooled state to the four-neck flask under stirring. During dropwise addition, the liquid temperature within the flask was maintained at −80 to −70° C. Following the end of dropwise addition, mixing was continued for 30 minutes under cooling, then the temperature was raised to room temperature under stirring and hydrolysis was carried out, yielding a clear, colorless sol having a zirconium oxide equivalent concentration of 5 wt %. This solution had a visible light transmittance (550 nm) of 88%.

EXAMPLE 12

The solution obtained in Example 11 was concentrated with a rotary evaporator at a bath temperature of 50° C., giving a viscous liquid having a zirconium oxide equivalent concentration of 43 wt %. When toluene solvent was added to this liquid, re-dissolution occurred.

EXAMPLE 13

First, 9.12 g of tantalum pentaethoxide (produced by Kojundo Chemical Laboratory Co., Ltd.; 99% purity; tantalum oxide equivalent concentration, 54.4 wt %) was dissolved in a mixed solution of 42.1 g toluene and 42.1 g ethanol within a four-neck flask. The flask was flushed with nitrogen, then cooled to −80° C. in an ethanol/liquid nitrogen bath. In a separate procedure, 0.652 g of ion-exchanged water (molar ratio $H_2O/Ta=1.6$) was mixed into a mixed solution of 2.96 g toluene and 2.96 g ethanol, following which the mixture was cooled to −80 to −70° C. and added dropwise in this cooled state to the four-neck flask under stirring. During dropwise addition, the liquid temperature within the flask was maintained at −80 to −70° C. Following the end of dropwise addition, mixing was continued for 30 minutes under cooling, then the temperature was raised to room temperature under stirring and hydrolysis was carried out, yielding a clear, colorless sol having a tantalum oxide equivalent concentration of 5 wt %. This solution had a visible light transmittance (550 nm) of 88%.

EXAMPLE 14

The solution obtained in Example 13 was concentrated with a rotary evaporator at a bath temperature of 50° C., giving a viscous liquid having a tantalum oxide equivalent concentration of 64.5 wt %. When toluene solvent was added to this liquid, re-dissolution occurred.

EXAMPLE 15

First, 5.00 g of indium triisopropoxide (produced by Kojundo Chemical Laboratory Co., Ltd.; 99% purity; indium oxide equivalent concentration, 47.4 wt %) and 0.79 g of tin tetraisopropoxide-isopropanol adduct (produced by AZmax Co., Ltd.; 99% purity; tin dioxide equivalent concentration, 42.6 wt %) were dissolved in 44.5 g of toluene within a four-neck flask. The flask was flushed with nitrogen, then cooled to −80° C. in an ethanol/liquid nitrogen bath. In a separate procedure, 0.370 g of ion-exchanged water (molar ratio $H_2O/(In+Sn)=1.08$) was mixed into 3.33 g of isopropanol, following which the mixture was cooled to −80 to −70° C. and added dropwise in this cooled state to the four-neck flask under stirring. During dropwise addition, the liquid temperature within the flask was maintained at −80 to −70° C. Following the end of dropwise addition, mixing was continued for 30 minutes under cooling, then the temperature was raised to room temperature under stirring and hydrolysis was carried out, yielding a clear, light yellow mixed sol of indium oxide and tin oxide having a metal oxide ($In_2O_3$, $SnO_2$) equivalent concentration of 5 wt %. This solution had a visible light transmittance (550 nm) of 75%.

EXAMPLE 16

The solution obtained in Example 15 was concentrated with a rotary evaporator at a bath temperature of 50° C., giving a concentrate having a metal oxide equivalent concentration of 70 wt %. When toluene solvent was added to this liquid, re-dissolution occurred.

EXAMPLE 17

First, 66.84 g of a partial hydrolysate of titanium tetraisopropoxide (the product obtained by adding 0.9 mole of water per mole of titanium isopropoxide and hydrolyzing) was dissolved in 402.74 g of toluene within a four-neck flask. The flask was flushed with nitrogen, then cooled to −80° C. in an ethanol/liquid nitrogen bath. In a separate procedure, 3.38 g of ion-exchanged water was mixed into 30.42 g of isopropanol, following which the mixture was cooled to −80 to −70° C. and added dropwise in this cooled state to the four-neck flask under stirring. During dropwise addition, the liquid temperature within the flask was maintained at −80 to −70° C. After the completion of dropwise addition, mixing was continued for 30 minutes under cooling, then the temperature was raised to room temperature under stirring and hydrolysis was carried out, yielding a clear, colorless sol having a titanium oxide equivalent concentration of 5 wt %. This solution had a visible light transmittance (550 nm) of 92%.

EXAMPLE 18

The solution obtained in Example 17 was concentrated with a rotary evaporator at a bath temperature of 50° C., giving a viscous liquid having a titanium oxide equivalent concentration of 52.3 wt %. When toluene solvent was added to this liquid, re-dissolution occurred.

EXAMPLE 19

First, 3.0 g of a tetrahydrofuran solution containing the titanium isopropoxide hydrolysate prepared in Example 1 was cooled in a dry ice-containing methanol bath (approx. —74° C.), and a tetrahydrofuran solution containing 4.2 g of 2,5-bis(mercaptomethyl)-1,4-dithiane (DMMD) and 4.6 g of 2,5-bis(isocyanatomethyl)-1,4-dithiane (BIMD) was added dropwise and mixed under stirring. Following addition, the temperature was gradually returned to room temperature, then 0.06 g of dibutyltin dilaurate (available from Nakalai Tesque, Inc.) was added and the mixture was stirred. The solvent was then removed by distillation, and the mixture was degassed. Next, the mixture was poured into a glass mold and the mold was tightly closed, following which the temperature was gradually raised from room temperature to 120° C. and polymerization was carried out for 24 hours under heating. The contents were then cooled to room temperature and removed from the mold, giving a transparent mass. The refractive index of the resulting mass was measured with an Abbe refractometer. The refractive index is shown in Table 3.

EXAMPLE 20

Aside from using 1.5 g of the titanium isopropoxide hydrolysate-containing tetrahydrofuran solution prepared in Example 1, the same procedure was carried out as in Example 19. The results are presented in Table 3.

COMPARATIVE EXAMPLE 4

Aside from not using the titanium isopropoxide hydrolysate-containing tetrahydrofuran solution, the same procedure was carried out as in Example 19. The refractive index of the body thus obtained is shown in Table 3.

TABLE 3

|  | Hydrolysate solution (g) | DMMD (g) | BIMD (g) | Refractive index |
|---|---|---|---|---|
| Example 19 | 3.0 | 4.2 | 4.6 | 1.656 |
| Example 20 | 1.5 | 4.2 | 4.6 | 1.640 |
| Comparative Example 4 | 0.0 | 4.2 | 4.6 | 1.633 |

EXAMPLE 21

First, 3.56 g (12.5 mmol) of titanium tetraisopropoxide (A-1, produced by Nippon Soda Co., Ltd.; 99.9% purity; titanium oxide equivalent concentration, 28 wt %) was dissolved in 12 g of tetrahydrofuran within a four-neck flask. The flask was flushed with nitrogen, then cooled in a dry ice-containing methanol bath (approx. −74° C.). After about 20 minutes of cooling, 0.36 g (20 mmol) of distilled water diluted with 4 g of tetrahydrofuran was added under stirring. The amount of water added at this time, expressed as a molar ratio with the titanium, was $H_2O/Ti=1.6$. The system was then gradually returned to room temperature, yielding a clear, light yellow tetrahydrofuran solution containing titanium isopropoxide hydrolysate. While still in the nitrogen-flushed state, this solution was again cooled with dry ice-containing methanol. In a separate procedure, 5.0 g of tetrahydrofuran to which had been added 1.0 g of 2,5-bis(mercaptomethyl)-1,4-dithiane (DMMD), 1.0 g of 2,5-bis(isocyanatomethyl)-1,4-dithiane (BIMD) and 0.025 g of dibutyltin dilaurate was shake-stirred in a 60° C. bath for 1 hour, giving a viscous tetrahydrofuran solution containing a polymer of DMMD and BIMD. This polymer-containing viscous tetrahydrofuran solution was added dropwise over 10 minutes to the titanium tetraisopropoxide hydrolysate-containing tetrahydrofuran solution. The resulting mixture was stirred for 30 minutes under cooling, following which the dry ice-containing methanol bath was removed and the temperature was gradually returned to room temperature, giving a clear, light yellow tetrahydrofuran solution. The solids concentration in the solution was 11.1 wt %, and the titanium oxide equivalent concentration based on the total solids was 58.2 mol %.

A 30×15 mm silicon wafer was dipped in this clear solution and pulled out vertically at a rate of 0.1 mm per second, thereby forming a clear thin-film on the wafer. The reflectance spectrum of this thin-film was measured using a Filmetrics F series, model F20 film thickness measurement system (manufactured by Litho Tech Japan). This spectrum was superimposed with a simulation spectrum obtained by changing the optical constant, and the thickness and refractive index at 633 nm of this thin film were measured. The film thickness and refractive index at this time are shown in Table 4.

EXAMPLE 22

Aside from preparing a titanium tetraisopropoxide hydrolysate-containing toluene solution by the same method as in Example 21, but in toluene rather than tetrahydrofuran, the same procedure was carried out as in Example 21, giving a clear colorless solution.

This clear solution was used as in Example 21 to form a thin film, and the film thickness and refractive index were measured. The results are given in Table 4.

TABLE 4

|  | Film thickness (nm) | Refractive index |
|---|---|---|
| Example 21 | 130 | 1.87 |
| Example 22 | 250 | 1.88 |

EXAMPLE 23

Aside from preparing a titanium tetraisopropoxide hydrolysate-containing solution by the same method as in Example 21, but using isopropanol instead of tetrahydrofuran to dilute the distilled water, the same procedure was carried out as in Example 21, giving a clear solution.

This clear solution was used as in Example 21 to form a thin film, and the film thickness and refractive index were measured. The film thickness was 134 nm and the refractive index was 1.87.

EXAMPLE 24

A tetrahydrofuran solution prepared in the same way as in Example 1 was applied to a glass substrate with a bar coater (No. 5), then dried at 150° C. for 30 minutes, giving a 0.1 μm thick titanium oxide film. This film had a contact angle with water of 42°. When this film was irradiated with near-ultraviolet light from a 15 W black light for 1 hour, the contact angle decreased to 12°, indicating good hydrophilicity. This change was probably due to the elimination of residual isopropoxy groups due to UV exposure.

EXAMPLE 25

The solution obtained in Example 17 was coated onto a glass substrate with a bar coater (No. 5), then dried at 150° C. for 30 minutes, thereby giving a 0.1μ thick titanium oxide film. This film had a contact angle with water of 28°. When the film was irradiated with 2 mW/cm² of near-ultraviolet light from a 15 W black light for 1 hour, the contact angle decreased to 3°, indicating good hydrophilicity. Elemental analysis of the thin film using an XPS spectrometer (Quantum 2000, manufactured by Ulvac Phi, Inc.) showed that the elemental concentration of carbon (formula I) in the film following UV irradiation was less than 5%.

Elemental concentration of carbon=[(elemental concentration of carbon)/(elemental concentration of carbon+elemental concentration of titanium+elemental concentration of oxygen)]×100    Formula (I)

EXAMPLE 26

A solution was prepared by mixing 270 g of the solution obtained in Example 17 with 30 g of a solution obtained by diluting a photocatalyst titania sol (TKS-251, produced by Tayca Corporation) with toluene to a solids content of 5 wt %. The resulting solution was applied to a glass substrate and an aluminum metal substrate by dipping, then dried at 100° C. to give a 0.3 μm thick film in each case.

To determine the photocatalytic activity of the film, about 0.1 mg/cm² of salad oil was applied to the film, following which ultraviolet light was applied at an intensity of 2 mW/cm² with a black light. The results are shown in Table 5. The salad oil decomposed in a short time, indicating a high photocatalytic activity.

TABLE 5

| Specimen | Substrate | Appearance | Adhesion | Salad oil decomposition* |
|---|---|---|---|---|
| 26-1 | glass | clear | good | 70% |
| 26-2 | aluminum metal | clear | good | 80% |

*BLB irradiation time, 72 hours

EXAMPLE 27

A toluene solution prepared in the same way as in Example 13 was applied with a bar coater (No. 5) onto a gold electrode-coated glass substrate and dried at 150° C. for 30 minutes to give a tantalum oxide film having a thickness of 0.1 μm. A gold electrode was applied by sputtering on top of the film, and the permittivity of the film was measured. The film had a permittivity of 18.

EXAMPLE 28

Fine particles of ITO (produced by Sumitomo Metal Mining) were added in an amount of 5 wt % (ITO basis) to the solution obtained in Example 15, following which the mixture was applied with a bar coater (No. 7) to a PET substrate, and dried at 120° C. for 30 minutes, giving a film having a thickness of 0.2 μm. This film was UV irradiated for 10 minutes using a high-pressure mercury vapor lamp. The resulting film had a surface resistivity of 350 Ω/sq.

EXAMPLES 29 to 34

An acrylic-silicon resin (Gemlac YC3918, produced by Kaneka Corporation) and a titania sol prepared in the same way as in Example 3 were mixed in the proportions shown in Table 6 so as to prepare a toluene solution having a solids content of 10 wt % (sum of resin solids weight and titanium oxide equivalent weight). This solution was coated with a bar coater (No. 12) onto various substrates, giving hybrid films. The properties of the resulting films are shown in Table 6. Clear hybrid films were obtained in each case.

COMPARATIVE EXAMPLE 5

Aside from using titanium tetraisopropoxide in place of titanium oxide, a film was formed in the same way as in Example 30. The results are shown in Table 6. The film turned white, and so a clear film was not obtained.

TABLE 6

|  | Substrate | Resin solids weight/titanium oxide equivalent weight | Appearance | Adhesion |
|---|---|---|---|---|
| Example 29 | glass substrate | 80/20 | clear | good |
| Example 30 | glass substrate | 50/50 | clear | good |
| Example 31 | glass substrate | 30/70 | clear | good |
| Example 32 | PET substrate | 80/20 | clear | good |
| Example 33 | PET substrate | 50/50 | clear | good |
| Example 34 | PET substrate | 30/70 | clear | good |
| Comparative Example 5 | glass substrate | 50/50 | cloudy | separated |

EXAMPLE 35

First, 130 g (0.46 mol) of titanium tetraisopropoxide (A-1, produced by Nippon Soda Co., Ltd.; 99.9% purity; titanium oxide equivalent concentration, 28 wt %) was dissolved in 481 g of toluene (Nakalai Tesque, Inc.) in a 1-liter, 4-neck flask. The interior of the flask was flushed with nitrogen, following which the entire contents were cooled in a dry ice-containing methanol bath (approx. −40° C.). In a separate procedure, a dropping funnel capable of being cooled was charged with a solution of 12.4 g (0.69 mol) of distilled water (collected with Advantec GS-200 system) dissolved in 122 g of anhydrous isopropanol (water content, 3.6 ppm), then cooled with dry ice-containing methanol to about −40 to −35° C. Next, this cooled water-isopropanol solution was added in a dropwise manner over a period of 1.5 hours to the toluene solution of titanium tetraisopropoxide, during which time the reaction mixture was held at about −40 to −35° C. Following the end of dropwise addition, the flask contents were stirred at the same temperature for 1 hour, then stirred for another 2 hours at room temperature and subsequently refluxed for 2 hours at 80 to 82° C., yielding a clear titanium tetraisopropoxide hydrolysate solution (a sol having a titanium oxide equivalent concentration of 5 wt %, referred to below as "Sol Solution 1"). The wavelength of light having a transmittance through this solution of 50% was 358 nm. The sol had an average particle size of 4.5 nm and a sharp, monodispersed particle size distribution.

Figure 4:
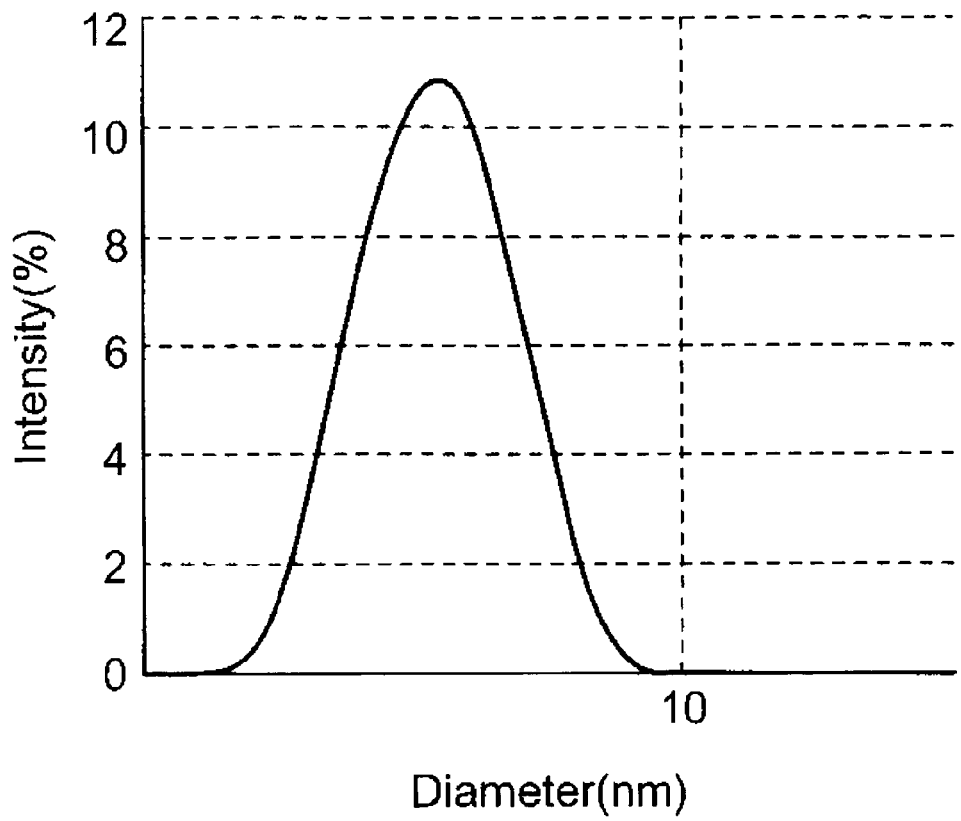
FIG. 4 shows the particle size distribution for Sol Solution 1 in Example 35.

FIG. 4 shows the particle size distribution of the sol in the resulting Sol Solution 1. In FIG. 4, the abscissa represents the particle size (nm) and the ordinate represents the peak intensity (%).

EXAMPLE 36

Figure 5:
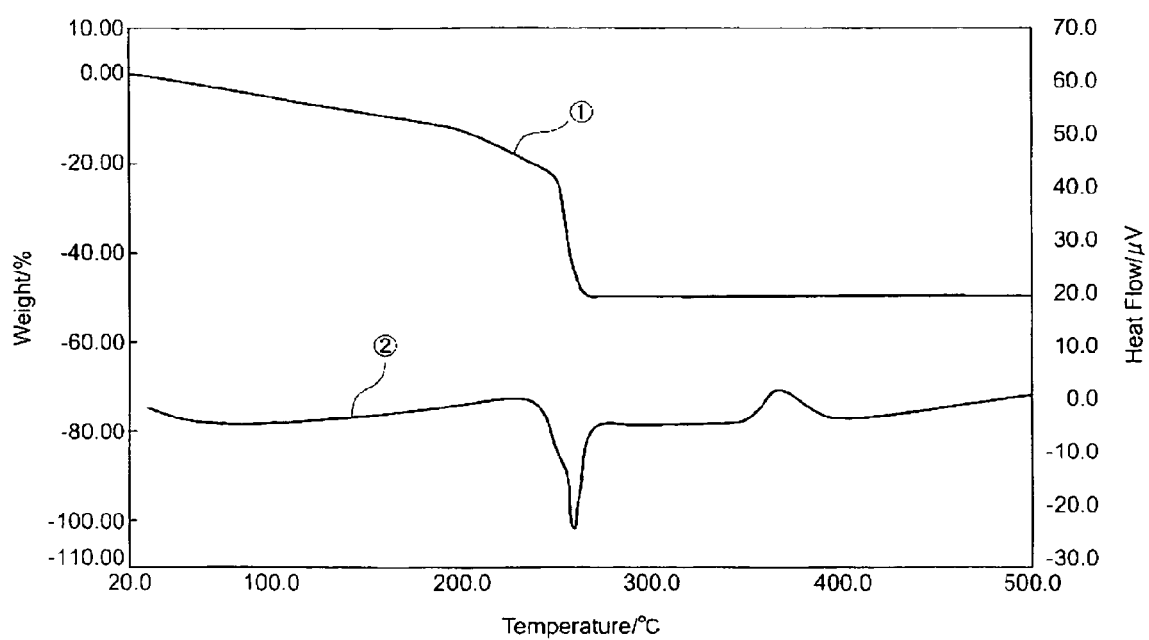
FIG. 5 is a graph showing the results of thermogravimetry on the powder in Example 36.

Sol Solution 1 obtained in Example 1 was completely concentrated on a rotary evaporator, giving a powder having a titanium oxide equivalent concentration of 50 wt %. Upon submitting 3.45 mg of this powder to thermogravimetric analysis, an endothermic peak temperature was observed at 255° C. and an exothermic peak temperature was observed at 355° C. The thermogravimetric results are shown in FIG. 5. In FIG. 5, the abscissa represents the measurement temperature (Temperature/° C.), the left-hand ordinate represents the percent weight loss (Weight/%), and the right-hand ordinate represents heat flow (Heat Flow/μV). Plot (1) is the weight change versus temperature, and Plot (2) is the heat flow versus temperature.

EXAMPLE 37

The solution obtained in Example 1 was applied with a No. 3 bar coater onto a polyethylene terephthalate (PET) substrate having an ozone treated surface, then dried at 100° C. for 10 minutes to form a titanium oxide film on the substrate, thereby giving a PET substrate bearing a titanium oxide film. Measurement of the titanium oxide film surface shape using an SPM system (SPA-400 (SII), manufactured by Seiko Instruments, Inc.) showed that the surface had an average roughness of less than 5 nm, indicating excellent smoothness.

EXAMPLE 38

Figure 6:
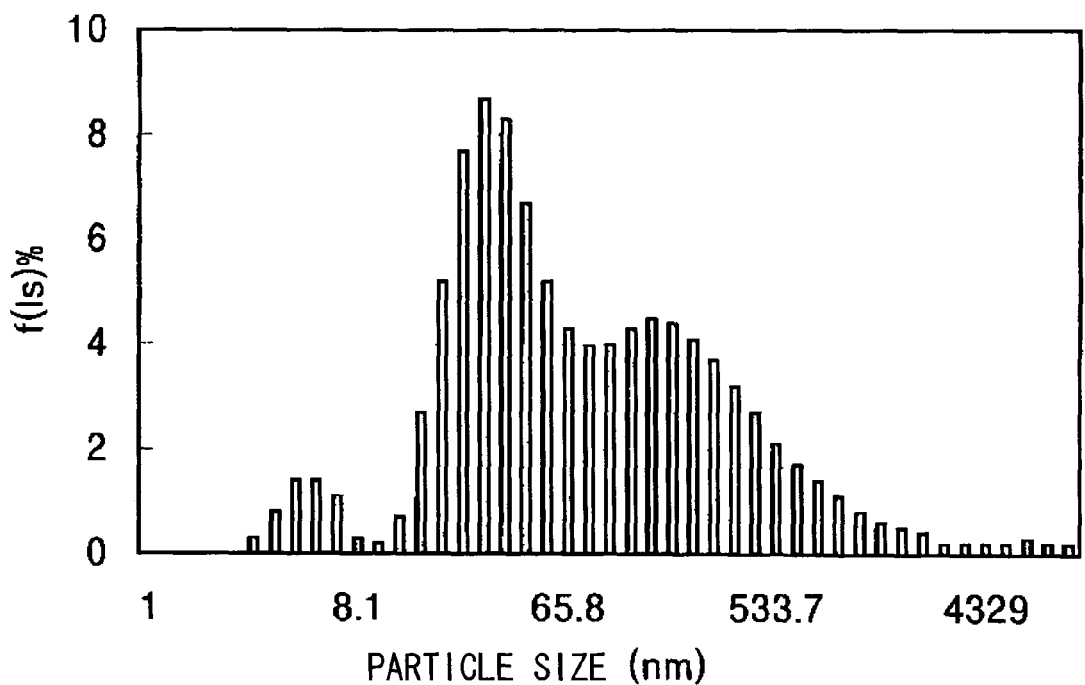
FIG. 6 shows the particle size distribution for Sol Solution 2 in Example 38.

First, 88.3 g (0.31 mol) of titanium tetraisopropoxide (A-1, produced by Nippon Soda Co., Ltd.; 99.9% purity; titanium oxide equivalent concentration, 28 wt %) was dissolved in 327 g of toluene (Nakalai Tesque, Inc.) in a 2-liter, 4-neck flask. The interior of the flask was flushed with nitrogen, following which the entire contents were cooled in a dry ice-containing methanol bath (approx. −75° C.). To this was added in a dropwise manner over a period of 90 minutes, and under stirring, a separately prepared mixed solution of 8.5 g ($H_2O$/Ti=1.5 mol/mol) of ion-exchanged water diluted with 76 g of isopropanol. The liquid temperature of the flask during dropwise addition was held at −75 to −70° C. Following the completion of dropwise addition, the flask contents were stirred for 30 minutes at −70° C., following which the temperature was raised to room temperature over a period of 3 hours and the mixture was stirred for another 1 hour, giving a clear, colorless liquid. This liquid (reaction mixture) was refluxed at 90 to 100° C. for 2 hours, giving a color, colorless sol having a titanium oxide equivalent concentration of 5 wt % (referred to hereinafter as "Sol Solution 2"). Sol Solution 2 was a composite of particles having a broad particle size distribution in which the average particle size of primary particles was 5.3 nm, the average particle size of secondary particles was 28.5 nm, and the average particle size of tertiary particles was 187 nm. FIG. 6 shows the particle size distribution of the sol within Sol Solution 2. In FIG. 6, the abscissa represents particle size (nm), and the ordinate represents f(Is) (%).

EXAMPLE 39

First, 17.79 g (62.6 mmol) of titanium tetraisopropoxide (A-1, produced by Nippon Soda Co., Ltd.; 99.9% purity; titanium oxide equivalent concentration, 28 wt %) and 65.31 g of anhydrous toluene were dissolved by mixing and stirring in a flask under a nitrogen atmosphere (liquid temperature, 18° C.). To this was added, over a period of 2 hours and under stirring, a mixture of 1.69 g (93.9 mmol) of water, 30.42 g of anhydrous isopropanol and 30.42 g of anhydrous toluene (the water concentration of the mixture was 22% the saturation concentration of water in a mixed solvent of isopropanol and toluene) at a liquid temperature of 18 to 20° C., thereby giving a clear, light yellow titanium isopropoxide hydrolysate-containing isopropanol-toluene solution. The amount of water added at this time, expressed as a molar ratio, was $H_2O$/Ti=1.5. An additional 1.5 hours of stirring at a liquid temperature of 18° C. resulted in a somewhat stronger yellow color, and 2.5 hours of refluxing thereafter produced a clear, colorless solution.

Figure 7:
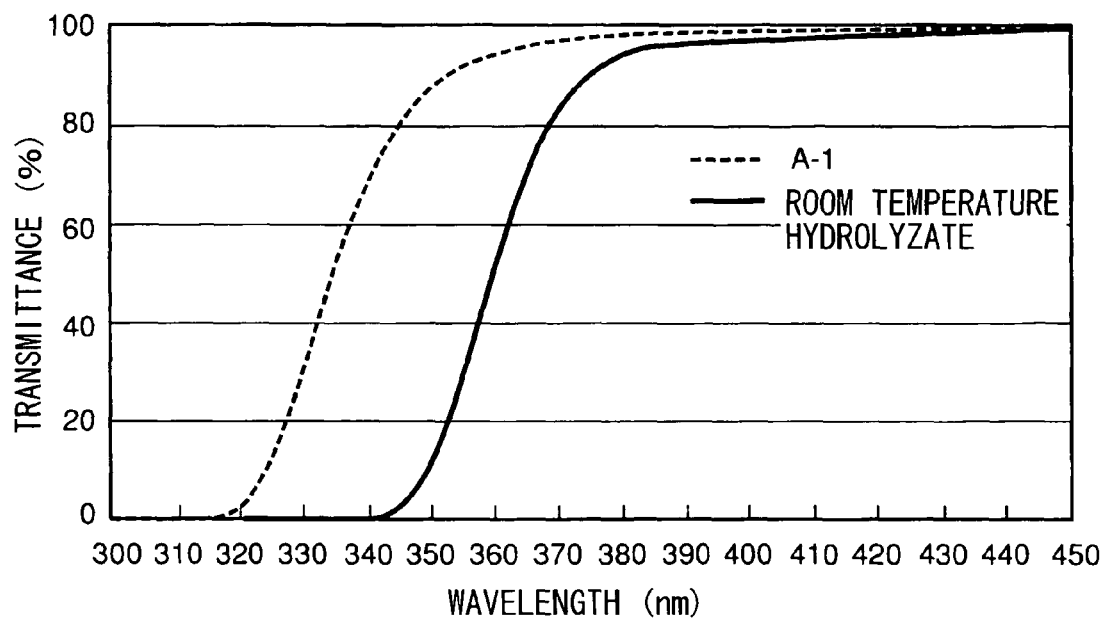
FIG. 7 shows the UV properties of the titanium alkoxide hydrolysate prepared in Example 39.

The UV properties of the solution thus prepared were measured using a mixture of 95.73 g of anhydrous toluene and 30.42 g of anhydrous IPA as the baseline. Measurement was carried out at an oxide concentration in each solution of about 3.4%. The results are shown in FIG. 7. FIG. 7 also shows the UV properties for titanium tetraisopropoxide. It is apparent from a comparison of the results obtained for the two solutions that the low-temperature hydrolysate had a much better ability to block UV radiation than the titanium tetraisopropoxide, indicating the growth of Ti—O—Ti bonds.

EXAMPLE 40

The clear, colorless liquid obtained in Example 1 was vacuum concentrated with a rotary evaporator at a bath temperature of 50° C., thereby giving a viscous liquid that was crusty on top. This liquid easily re-dissolved in anhydrous toluene, anhydrous tetrahydrofuran or anhydrous diethyl ether. It dissolved less readily in anhydrous isopropanol, although dissolution was possible.

EXAMPLE 41

Figure 8:
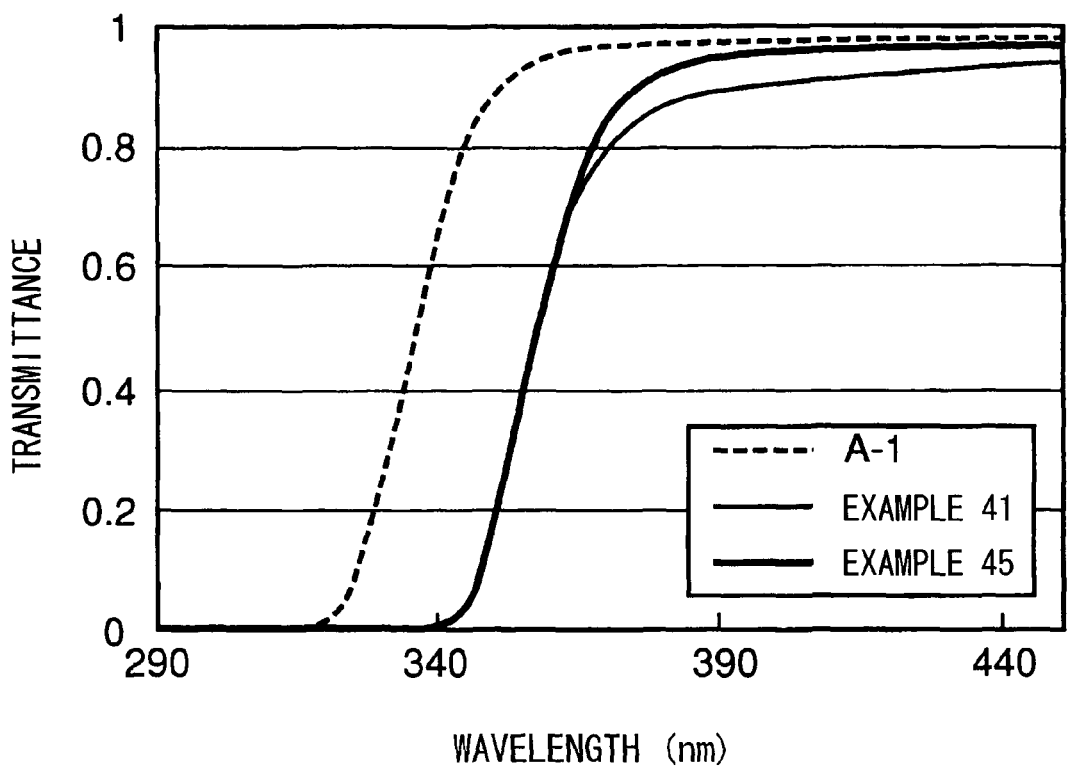
FIG. 8 shows the light transmittances of the sol solutions in Examples 41 and 45.
Figure 9:
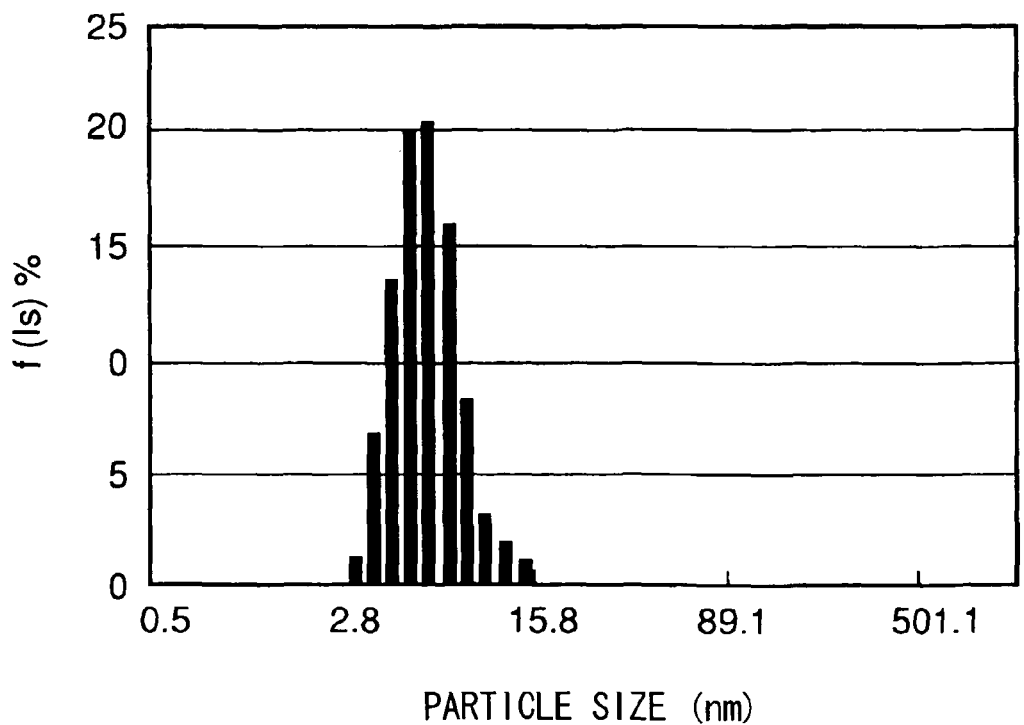
FIG. 9 shows the particle size distribution for the sol solution in Example 41.

First, 178 g (0.63 mol) of titanium tetraisopropoxide (A-1, produced by Nippon Soda Co., Ltd.; 99.9% purity; titanium oxide equivalent concentration, 28 wt %) was dissolved in 654 g of tetrahydrofuran in a 4-neck flask. The flask was flushed with nitrogen, then cooled in a dry ice-containing methanol bath (approx. —15° C.). A separately prepared mixed solution of 10.1 g of ion-exchanged water ($H_2O$/Ti=0.9 mol/mol) diluted in 91 g of tetrahydrofuran was added dropwise over a period of 90 minutes under stirring. The liquid temperature of the flask during dropwise addition was held at −15 to −10° C. Following the completion of dropwise addition, the flask contents were held at −10° C. for 30 minutes, then the temperature was raised to room temperature and stirring was continued for 1 hour, giving a clear, colorless liquid. The liquid was then cooled to about −80° C. in a dry-ice-containing methanol bath, and a mixed solution of 6.8 g of ion-exchanged water ($H_2O$/Ti=0.6 mol/mol) diluted with 61 g of tetrahydrofuran was added dropwise over 90 minutes under stirring. Following the completion of dropwise addition, the temperature was raised to room temperature over a period of 3 hours. This solution was refluxed for 2 hours at 90 to 100° C., giving a clear, colorless sol having a titanium oxide equivalent concentration of 5 wt %. The wavelength of light having a transmittance of 50% through this solution was 358 nm (FIG. 8). Moreover, the sol had an average particle size of 6.5 nm and a sharp, monodispersed particle size distribution (FIG. 9).

EXAMPLE 42

The solution obtained in Example 41 was vacuum concentrated on a rotary evaporator at a bath temperature of 50° C., yielding a white solid having a titanium oxide equivalent concentration of 56.2 wt %. This re-dissolved when toluene solvent was added. The clear solution obtained after re-dissolution was a monodisperse sol having an average particle size of 7.0 nm.

EXAMPLE 43

Figure 10:
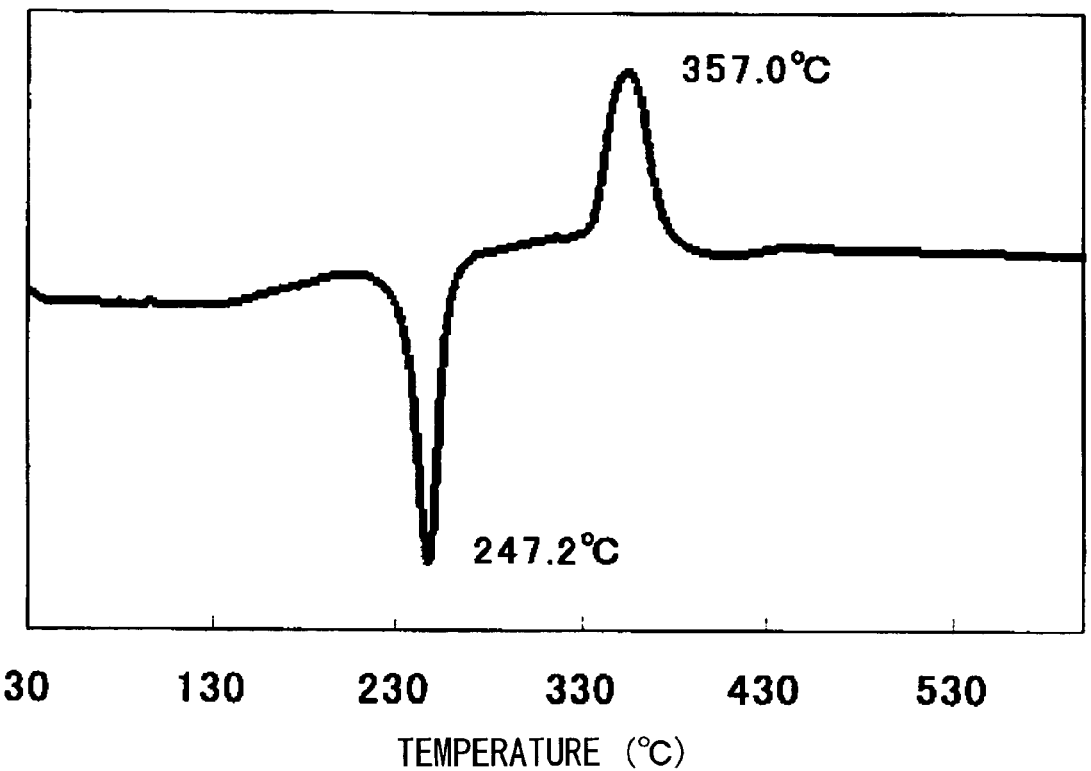
FIG. 10 shows the results of thermogravimetry on the sol solution in Example 43.

The solution obtained in Example 41 was concentrated on a rotary evaporator to a solution having a titanium oxide equivalent concentration of 30 wt %. Upon submitting a 3.45 mg sample of this yellow viscous liquid to thermogravimetric analysis, an endothermic peak was observed at 247° C. and an exothermic peak was observed at 357° C. (FIG. 10).

EXAMPLE 44

Figure 11:
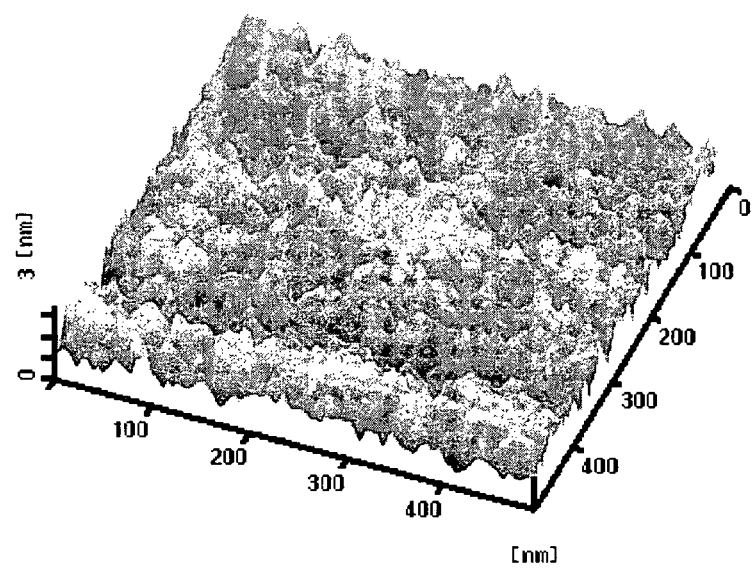
FIG. 11 shows the surface shape of the metal oxide film formed in Example 44.

The solution obtained in Example 41 was applied with a No. 3 bar coater onto a polyethylene terephthalate (PET) substrate having an ozone treated surface, then dried at 100° C. for 10 minutes to form a metal oxide film on the substrate. Measurement of the metal oxide film surface shape using an SPM system (SPA-400 (SII), manufactured by Seiko Instruments, Inc.) indicated that the surface had an average roughness of less than 5 nm. Hence, the metal oxide film of the invention had an excellent surface smoothness (FIG. 11).

EXAMPLE 45

First, 530 g (1.86 mol) of titanium tetraisopropoxide (A-1, produced by Nippon Soda Co., Ltd.; 99.9% purity; titanium oxide equivalent concentration, 28 wt %) was dissolved in 1,960 g of toluene in a 4-neck flask. The flask was flushed with nitrogen, then cooled in a dry ice-containing methanol bath (approx. —15° C.). A separately prepared mixed solution of 30.4 g of ion-exchanged water ($H_2O$/Ti=0.9 mol/mol) diluted in 274 g of isopropanol was added dropwise over a period of 90 minutes under stirring. The liquid temperature of the flask during dropwise addition was held at −15 to −10° C. Following the completion of dropwise addition, the flask contents were held at −10° C. for 30 minutes, then the temperature was raised to room temperature and stirring was continued for 1 hour, giving a clear, colorless liquid. The liquid was then cooled to about −80° C. in a dry-ice-containing methanol bath, and a mixed solution of 20.3 g of ion-exchanged water ($H_2O$/Ti=0.6 mol/mol) diluted in 183 g of isopropanol was added dropwise over 90 minutes under stirring. Following the completion of dropwise addition, the temperature was raised to room temperature over a period of 3 hours. This solution was refluxed for 2 hours at 90 to 100° C., giving a clear, colorless sol having a titanium oxide equivalent concentration of 5 wt %. The wavelength of light having a transmittance of 50% through this solution was 358 nm (FIG. 8). Moreover, the sol had an average particle size of 5.6 nm and a sharp, monodispersed particle size distribution (FIG. 12).

EXAMPLE 46

The solution obtained in Example 45 was vacuum concentrated on a rotary evaporator at a bath temperature of 50° C., yielding a white solid having a titanium oxide equivalent concentration of 54.8 wt %. This re-dissolved when toluene solvent was added. The clear solution obtained after re-dissolution was a monodisperse sol having an average particle size of 6.1 nm.

EXAMPLE 47

First, 88.3 g (0.31 mol) of titanium tetraisopropoxide (A-1, produced by Nippon Soda Co., Ltd.; 99.9% purity; titanium oxide equivalent concentration, 28 wt %) was dissolved in 327 g of toluene in a 4-neck flask. The flask was flushed with nitrogen, then cooled in a dry ice-containing methanol bath (approx. —75° C.). A separately prepared mixed solution of 8.5 g of ion-exchanged water ($H_2O$/Ti=1.5 mol/mol) diluted in 76 g of isopropanol was added dropwise over a period of 90 minutes under stirring. The liquid temperature of the flask during dropwise addition was held at −75 to −70° C. Following the completion of dropwise addition, the flask contents were held at −70° C. for 30 minutes, then the temperature was raised to room temperature over a period of 3 hours, following which stirring was continued for 1 hour, giving a clear, colorless liquid. This solution was refluxed at 90 to 100° C. for 2 hours, giving a clear, colorless sol having a titanium oxide equivalent concentration of 5 wt %. The sol was a composite of particles having a broad particle size distribution in which the average particle size of primary particles was 5.3 nm, the average particle size of secondary particles was 28.5 nm, and the average particle size of tertiary particles was 187 nm (FIG. 13).

EXAMPLE 48

(1) Preparation of Metal Oxide Film-Forming Solution
(i) First, 530 g of titanium tetraisopropoxide (A-1, produced by Nippon Soda Co., Ltd.) was dissolved in 1,960 g of toluene within a nitrogen-flushed 4-neck flask, then cooled to −15° C. in an ethanol/dry ice bath. In a separate procedure, 30.4 g of ion-exchanged water (molar ratio, $H_2O$/Ti=0.9) was mixed in 274 g of isopropanol and added dropwise to the four-neck flask over a period of 90 minutes under stirring, thereby carrying out hydrolysis. During stirring, the liquid temperature within the flask was held at −15 to −10° C. Following the completion of dropwise addition, the temperature was held at −10° C. for 30 minutes, then raised to room temperature, after which stirring was continued for 1 hour, giving a clear, colorless liquid. Next, this solution was cooled to −80° C. in an ethanol/dry ice bath, and a mixed solution of 20.3 g of ion-exchanged water (molar ratio $H_2O/Ti=0.6$) and 183 g of isopropanol was added dropwise over 90 minutes under stirring. Following the completion of dropwise addition, the temperature was returned to room temperature over 3 hours. This solution was refluxed at 90 to 100° C. for 2 hours, giving a clear, colorless solution (C-1). The solution had a solids concentration (titanium oxide basis) of 5 wt %. The sol had an average particle size of 5.6 nm and exhibited monodisperse properties with a sharp particle size distribution.

(ii) First, 12.4 g of titanium tetraisopropoxide (A-1, produced by Nippon Soda Co., Ltd.; 99% purity; titanium oxide equivalent concentration, 28.2 wt %) was dissolved in 45.0 g of toluene within a four-neck flask. The flask was flushed with nitrogen, then cooled to −80° C. in an ethanol/liquid nitrogen bath. In a separate procedure, 1.26 g of ion-exchanged water (molar ratio $H_2O/Ti=1.6$) was mixed into 11.3 g of isopropanol, following which the mixture was cooled to −80 to −70° C. and added dropwise in this cooled state to the four-neck flask under stirring. During dropwise addition, the liquid temperature within the flask was maintained at −80 to −70° C. After the end of dropwise addition, mixing was continued for 30 minutes under cooling, then the temperature was raised to room temperature under stirring, yielding a clear, colorless solution (C-2). The solution had a solids concentration (titanium oxide basis) of 5 wt %. The solution was diluted with anhydrous toluene, giving a clear, colorless solution (C-3). The solution had a solids concentration (titanium oxide basis) of 1 wt %.

(iii) First, 10.8 g of zirconium tetra-n-butoxide (TBZR, produced by Nippon Soda Co., Ltd.; 87% purity; zirconium oxide equivalent concentration, 32.2 wt %) was dissolved in 46.9 g of toluene within a four-neck flask. The flask was flushed with nitrogen, then cooled to −80° C. in an ethanol/liquid nitrogen bath. In a separate procedure, 0.812 g of ion-exchanged water (molar ratio, $H_2O/Zr=1.6$) was mixed into 7.30 g of 2-butanol, following which the mixture was cooled to −80 to −70° C. and added dropwise in this cooled state to the four-neck flask under stirring, thereby carrying out hydrolysis. During dropwise addition, the liquid temperature within the flask was maintained at −80 to −70° C. Following the completion of dropwise addition, mixing was continued for 30 minutes under cooling, then the temperature was raised to room temperature under stirring, yielding a clear, colorless solution (C-4) having a solids concentration (zirconium oxide basis) of 5 wt %. The solution was diluted with anhydrous toluene, giving a clear, colorless solution (C-5). The resulting solution had a solids concentration (zirconium oxide basis) of 1 wt %.

(2) Preparation of Monomolecular Film-Forming Solution (i) Heptadecatrifluorodecyl trimethoxysilane (FAS-17, produced by Shin-Etsu Chemical Co., Ltd.) was diluted with anhydrous toluene to form a solution (C-6) having a solids concentration of 0.5 wt %.

(ii) First, 3.36 g of solution (C-1) was mixed into 100 g of a 5 wt % heptadecatrifluorodecyl trimethoxysilane (FAS-17, Shin-Etsu Chemical) solution obtained by diluting FAS-17 with anhydrous toluene, then the mixture was stirred for 30 minutes. To this solution was added in a dropwise manner 900 g of a toluene solution saturated with ion-exchanged water. Following the completion of dropwise addition, the mixture was stirred for 2 hours, thereby carrying out hydrolysis. This solution was filtered, giving a solution (C-7).

(3) Production of Monomolecular Film

Figure 14:
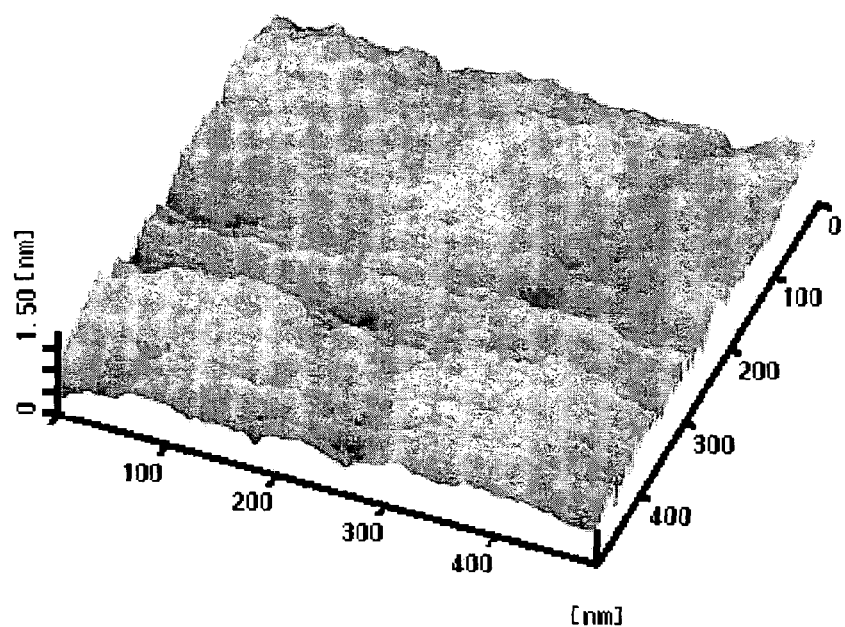
FIG. 14 shows the surface shape of the film obtained from solution C-1 in Example 48.

Solution (C-1) was coated with a No. 3 bar coater onto an ultrasonically cleaned soda lime glass substrate having an average surface roughness of 2 nm, then dried at 150° C. for 30 minutes, thereby forming a thin film on the glass substrate. Measurement of the thin-film surface shape using an SPM system (SPA-400 (SII), manufactured by Seiko Instruments, Inc.) indicated that the surface had an average roughness of 2.5 nm. Hence, the metal oxide film of the invention had a smooth surface and was clearly well-suited for the efficient formation of a monomolecular film (FIG. 14).

The metal oxide film-bearing substrate obtained as described above was cleaned with ozone gas for 2 minutes then immersed in solution (C-6) for 10 minutes and dried at 60° C. for 10 minutes, thereby forming a chemisorption film composed of FAS-17. Using a microsyringe, 5 μl amounts of water, toluene (Tol) and isopropyl alcohol (IPA) were placed on the surface of the FAS-17 film and the contact angles, 60 seconds later, were measured using a contact angle goniometer (model 360S, manufactured by Erma, Inc.). The values obtained were 106° (water), 62° (toluene) and 40° (IPA), indicating adequate water repellency. In addition, because the surface had an average roughness of 2.3 nm, it was apparent that the FAS-17 film had formed to a high density on the surface of the substrate.

Figure 15:
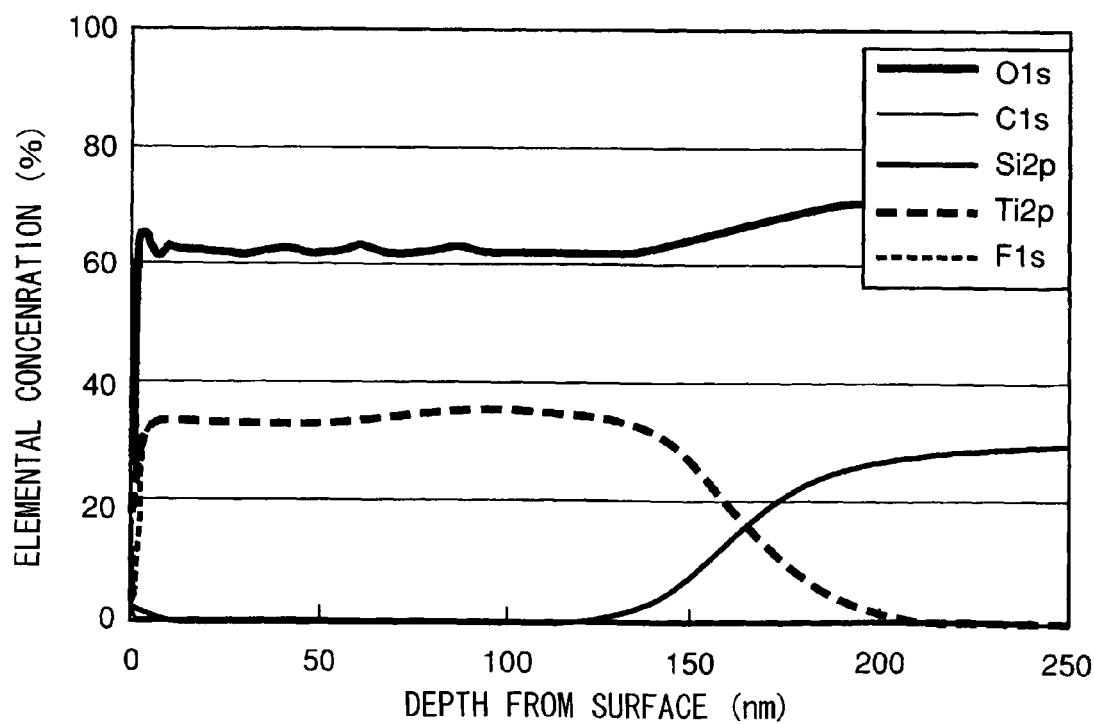
FIG. 15 shows the elemental composition in the depth direction of the film formed in Example 48.
Figure 16:
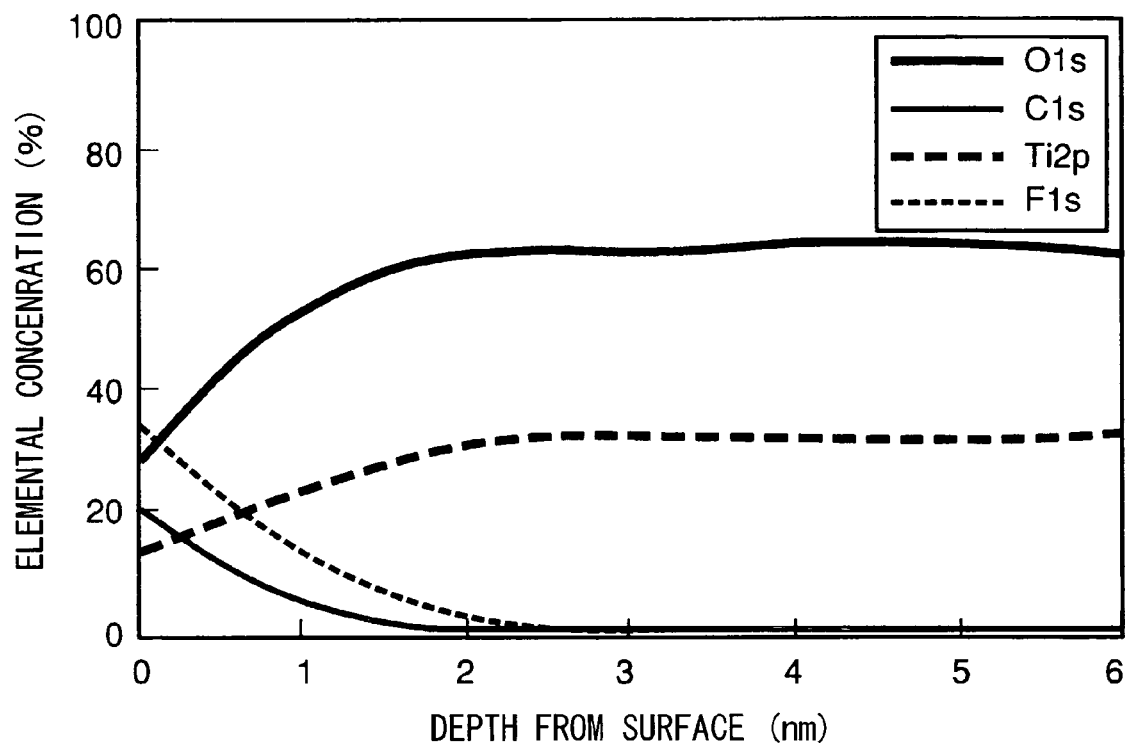
FIG. 16 shows the elemental composition in the depth direction near the surface of the film formed in Example 48.

Analysis of the elements in the chemisorption film made of FAS-17 using an XPS system (Quantum 2000, manufactured by Ulvac Phi, Inc.) gave a molar ratio of fluorine atoms to carbon atoms (F/C) of 1.72, which agreed well with the theoretical value of 1.70 when hydrolysis proceeds to completion. Also, the results of an elemental composition analysis in the depth direction of this self-organizing film indicate that the chemisorption film made of FAS-17 formed a thin monomolecular film having a thickness of 2 nm (FIGS. 15 and 16). Moreover, because substantially no carbon remains in the metal oxide film, it was possible to obtain a film free of organic matter even with low-temperature treatment at 200° C. or below.

The changes in the contact angles on the above chemisorption film made of FAS-17 following 3 hours of exposure to 245 nm UV light at an intensity of 2 mW/cm$^2$ were measured. After three hours, these contact angles were respectively 3.5° (water), 0° (toluene) and 0° (IPA). This means that UV exposure removed the FAS-17 on the substrate, exposing the titanium oxide film. This suggests that a specific pattern can easily be formed by exposing specific positions to energy such as ultraviolet light.

EXAMPLES 49 to 56

As in Example 48, solutions were coated with bar coaters of the indicated No. onto the substrates shown in Table 7 that had been administered surface ozone treatment if necessary, then were dried at a specific drying temperature, giving metal oxide films. In addition, aside from using the solutions prepared by the specific methods indicated in Table 7 and immersing the above metal oxide film-bearing substrates for given lengths of time in the specific metallic surfactant solutions indicated in Table 7, monomolecular films made of a self-organizing film was formed on the metal oxide films in the same way as in Example 48. The results for these examples are presented in Table 7, along with the results for Example 48. Monomolecular films made of self-organizing films having a good adhesion and contact angle were obtained on polyester (PET) substrates and acrylic substrates.

COMPARATIVE EXAMPLES 6 to 8

Aside from forming a metal oxide film on the specific substrates indicated in Table 7 using a solution (C-8) of titanium tetraisopropoxide (A-1, produced by Nippon Soda Co., Ltd.; 99% purity; titanium oxide equivalent concentration, 28.2 wt %) diluted with ethanol (titanium oxide concentration of solution, 0.5 wt %), monomolecular films were produced in the same way as in Example 48. The results are presented in Table 7. The metal oxide films had a poor adhesion to the polyester (PET) substrate and the acrylic substrate, resulting in film separation. On a glass substrate, formation of a monomolecular film made of a self-organizing film was inadequate, making it impossible to achieve a sufficient water repellency.

COMPARATIVE EXAMPLES 9 and 10

Figure 17:
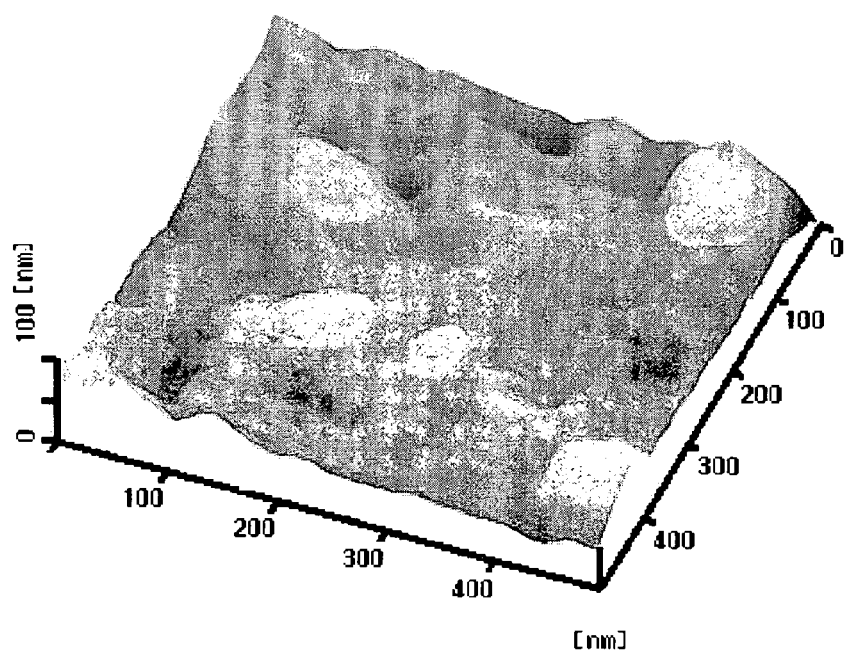
FIG. 17 shows the surface shape of the STS-01 film in Comparative Example 10.

A solution prepared by diluting a titanium oxide fine particle sol solution (Ishihara Sangyo Kaisha, Ltd.; particle size, 7 nm; referred below as "solution C-9") with ethanol to 1 wt % was coated, as in Example 48, with a No. 3 bar coater onto an acrylic substrate or a soda lime glass substrate having an ultrasonically cleaned surface with an average roughness of 2 nm, then dried at 150° C. for 30 minutes, thereby forming a thin film on the substrate. The results are shown in Table 7. Measurement of the thin-film surface shape using an SPM system (SPA-400 (SII), manufactured by Seiko Instruments, Inc.) indicated that each of these metal oxide films had an average surface roughness of 45 nm. These films had a poor adhesion and poor wear resistance (FIG. 17).

The invention claimed is:

1. A dispersoid having metal-oxygen bonds obtained by:
   mixing a metal compound having at least three hydrolyzable groups with a given amount of water in the absence of all members selected from the group consisting of an acid, a base, and a dispersion stabilizer and at a given temperature,
   wherein:
   the given amount of water is at least 1.0 mole but less than 2.0 moles per mole of the metal compound, and
   no acid, no base, and no dispersion stabilizer is added to the dispersoid,
   the given temperature is a temperature below 0° C., and
   a transmittance, expressed as a spectral transmittance measured at a dispersoid concentration of 0.5 wt % of oxide basis, at a quartz cell light path length of 1 cm, using the organic solvent as a control, and at a light wavelength of 550 nm, is 80% to 100%.

2. A dispersoid having metal-oxygen bonds obtained by:
   mixing a metal compound having at least three hydrolyzable groups with a given amount of water in the absence of all members selected from the group consisting of an acid, a base, and a dispersion stabilizer and at a given temperature,
   wherein:
   the given amount of water is at least 0.5 mole but less than 1.0 mole per mole of the metal compound, and
   no acid, no base, and no dispersion stabilizer is added to the dispersoid,
   the given temperature is a temperature below 0° C., and
   a transmittance, expressed as a spectral transmittance measured at a dispersoid concentration of 0.5 wt % of oxide basis, at a quartz cell light path length of 1 cm, using the organic solvent as a control, and at a light wavelength of 550 nm, is 80% to 100%.

TABLE 7

| | | Substrate | | Metal oxide film | | | Monomolecular film | | Contact angle (°) | | |
|---|---|---|---|---|---|---|---|---|---|---|---|
| | Type[a] | Ozone treatment[b] | Solution | Bar coater (No.) | Drying temp. (° C.) | Solution | Immersion time (min) | Water | Toluene | IPA |
| EX 48 | G | yes | C-1 | 3 | 150 | C-6 | 10 | 106 | 62 | 40 |
| EX 49 | P | yes | C-1 | 3 | 100 | C-7 | 10 | 103 | 62 | 38 |
| EX 50 | A | yes | C-1 | 3 | 60 | C-7 | 10 | 105 | 62 | 40 |
| EX 51 | G | yes | C-2 | 3 | 150 | C-7 | 10 | 107 | 63 | 41 |
| EX 52 | A | yes | C-3 | 5 | 60 | C-7 | 10 | 102 | 61 | 38 |
| EX 53 | G | yes | C-4 | 3 | 150 | C-6 | 10 | 105 | 62 | 42 |
| EX 54 | G | no | C-5 | 3 | 150 | C-7 | 10 | 102 | 59 | 39 |
| EX 55 | P | yes | C-5 | 5 | 100 | C-7 | 20 | 100 | 58 | 38 |
| EX 56 | A | yes | C-5 | 3 | 60 | C-7 | 20 | 100 | 58 | 38 |
| CE 6 | A | no | C-8 | 3 | 60 | | | *1 | | |
| CE 7 | P | no | C-8 | 3 | 100 | | | *1 | | |
| CE 8 | G | yes | C-8 | 3 | 150 | C-7 | 60 | 75 | 31 | 25 |
| CE 9 | A | no | C-9 | 5 | 60 | | | *1 | | |
| CE 10 | G | yes | C-9 | 3 | 150 | | | *2 | | |

[a]G: glass; P: PET; A: acrylic
[b]Yes: ozone-treated; No: not ozone-treated
*1: The metal oxide films all peeled off, making it impossible to form a monomolecular film.
*2: Monomolecular film formation was not carried out because it was apparent from visual examination that the surface of the metal oxide film was uneven.

INDUSTRIAL APPLICABILITY

As explained above, by using the dispersoid having metal-oxygen bonds of the invention, uniform and transparent organic-inorganic hybrid materials and metal oxide films can be produced. Because such substances have a broad range of possible uses, including as optical materials, this invention has a high industrial applicability.

3. A dispersoid having metal-oxygen bonds obtained by:
   mixing, in the absence of all members selected from the group consisting of an acid, a base, and a dispersion stabilizer and at a given temperature, a partial hydrolysate that is prepared by hydrolyzing a metal compound having at least three hydrolyzable groups in the absence of all members selected from the group consisting of an acid, a base, and a dispersion stabilizer and that can be stably dispersed without aggregation in an organic solvent with an amount of water equal to at least 0.5 mole but less than 2 moles per mole of the metal compound minus the amount of water used to prepare the partial hydrolysate, wherein:

no acid, no base, and no dispersion stabilizer is added to the dispersoid, the given temperature is a temperature below 0° C, and a transmittance, expressed as a spectral transmittance measured at a dispersoid concentration of 0.5 wt % of oxide basis, at a quartz cell light path length of 1 cm, using the organic solvent as a control, and at a light wavelength of 550 nm, is 80% to 100%.

4. The dispersoid having metal-oxygen bonds of claim 3 which is characterized in that the given temperature is a temperature of −20° C. or below.

5. The dispersoid having metal-oxygen bonds of claim 3 which is characterized in that the given temperature is at or below the temperature at which the metal compound begins to hydrolyze.

6. The dispersoid having metal-oxygen bonds of claim 3 which is characterized by being obtained by, following mixture of the partial hydrolysate and the water at the given temperature, raising the temperature to the given temperature or above.

7. A dispersoid having metal-oxygen bonds obtained by:

mixing a metal compound having at least three hydrolyzable groups with a given amount of water in the absence of all members selected from the group consisting of an acid, a base, and a dispersion stabilizer and at a given temperature, wherein:

the given amount of water is a solution diluted with a hydrocarbon solvent other than an alcohol solvent, and an alcohol solvent, the diluted solution is added to the metal compound, no acid, no base, and no dispersion stabilizer is added to the dispersoid, the given temperature is room temperature, and a transmittance, expressed as a spectral transmittance measured at a dispersoid concentration of 0.5 wt % of oxide basis, at a quartz cell light path length of 1 cm, using the organic solvent as a control, and at a light wavelength of 550 nm, is 80% to 100%.

8. The dispersoid having metal-oxygen bonds of claim 7 which is characterized in that the given amount of water is at least 0.5 mole but less than 2.0 moles per mole of the metal compound.

9. The dispersoid having metal-oxygen bonds of claim 7 which is characterized in that the water in the diluted solution has a concentration that is from 40% to 1% of the saturation solubility of water in a mixed solvent of the hydrocarbon solvent and the alcohol solvent.

10. A dispersoid having metal-oxygen bonds obtained by the addition, in the absence of all members selected from the group consisting of an acid, a base, and a dispersion stabilizer, to a metal compound having at least three hydrolyzable groups, of at least 0.5 mole but less than 2 moles of water per mole of the metal compound, wherein:

no acid, no base, and no dispersion stabilizer is added to the dispersoid, the water is added in divided portions at a given temperature, wherein at least one of the of the divided portions of water is added at a given temperature that is a temperature below 0° C., and a transmittance, expressed as a spectral transmittance measured at a dispersoid concentration of 0.5 wt % of oxide basis, at a quartz cell light path length of 1 cm, using the organic solvent as a control, and at a light wavelength of 550 nm, is 80% to 100%.

11. A dispersoid having metal-oxygen bonds obtained by the addition, in the absence of all members selected from the group consisting of an acid, a base, and a dispersion stabilizer, to a metal compound having at least three hydrolyzable groups, of at least 0.5 mole but less than 2 moles of water per mole of the metal compound, wherein:

the water is added in divided portions, at least 0.5 mole but less than 1 mole of the water per mole of the metal compound is added in a first water addition step, no acid, no base, and no dispersion stabilizer is added to the dispersoid, and a transmittance, expressed as a spectral transmittance measured at a dispersoid concentration of 0.5 wt % of oxide basis, at a quartz cell light path length of 1 cm, using the organic solvent as a control, and at a light wavelength of 550 nm, is 80% to 100%.

12. The dispersoid having metal-oxygen bonds of claim 11 which is characterized by having, after the first water addition step, a step in which the rest of the required amount of water is added at a given temperature, the given temperature being a temperature below 0° C.

13. A dispersoid having metal-oxygen bonds obtained by:

mixing a metal compound having at least three hydrolyzable groups with at least 0.5 moles but less that 2.0 moles of water per mole of the metal compound in the absence of all members selected from the group consisting of an acid, a base, and a dispersion stabilizer, wherein:

the dispersoid has an average particle size in a range of 1 to 20 nm, the dispersoid disperses stably without aggregation in an organic solvent, no acid, no base, and no dispersion stabilizer is added to the dispersoid, and a transmittance, expressed as a spectral transmittance measured at a dispersoid concentration of 0.5 wt % of oxide basis, at a quartz cell light path length of 1 cm, using the organic solvent as a control, and at a light wavelength of 550 nm, is 80% to 100%.

14. The dispersoid having metal-oxygen bonds of claim 13 which is characterized by being monodisperse with a particle size distribution in a range of 0 to 50 nm.

* * * * *